(12) United States Patent
Park et al.

(10) Patent No.: US 12,439,157 B2
(45) Date of Patent: Oct. 7, 2025

(54) CAMERA DEVICE AND OPTICAL INSTRUMENT

(71) Applicant: LG INNOTEK CO., LTD., Seoul (KR)

(72) Inventors: Sang Ok Park, Seoul (KR); Sang Jun Min, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/028,161

(22) PCT Filed: Oct. 5, 2021

(86) PCT No.: PCT/KR2021/013577
§ 371 (c)(1),
(2) Date: Mar. 23, 2023

(87) PCT Pub. No.: WO2022/075680
PCT Pub. Date: Apr. 14, 2022

(65) Prior Publication Data
US 2024/0334057 A1   Oct. 3, 2024

(30) Foreign Application Priority Data

Oct. 5, 2020   (KR) ........................ 10-2020-0128377
Oct. 8, 2020   (KR) ........................ 10-2020-0130136
May 3, 2021   (KR) ........................ 10-2021-0057093

(51) Int. Cl.
*H04N 23/68*   (2023.01)
*G01R 33/07*   (2006.01)
(Continued)

(52) U.S. Cl.
CPC ....... *H04N 23/6812* (2023.01); *G01R 33/072* (2013.01); *G01R 33/091* (2013.01);
(Continued)

(58) Field of Classification Search
CPC .... G03B 2205/0007; G03B 2205/0015; G03B 2205/0023; G03B 2205/0038;
(Continued)

(56) References Cited

U.S. PATENT DOCUMENTS

2015/0015729 A1   1/2015   Kasamatsu
2015/0135703 A1   5/2015   Eddington et al.
(Continued)

FOREIGN PATENT DOCUMENTS

CN   107688245 A   *   2/2018   ........... G02B 27/646
KR   10-2011-0097555 A       8/2011
(Continued)

*Primary Examiner* — Christopher E Mahoney
(74) *Attorney, Agent, or Firm* — Birch, Stewart, Kolasch & Birch, LLP

(57) ABSTRACT

One embodiment comprises: a fixing part; a moving part including a substrate part arranged to be spaced from the fixing part, and an image sensor arranged on the substrate part; a shape memory alloy member which is coupled to the fixing part and the moving part, and which is electrically connected to the substrate part; a location sensing unit including first, second and third sensors arranged on the substrate part; and a control unit which supplies a driving signal to the shape memory alloy member, and which moves the moving part in the direction that is perpendicular to the optical axis or rotates the moving part around the optical axis by means of the shape memory alloy member.

20 Claims, 55 Drawing Sheets

(51) Int. Cl.
*G01R 33/09* (2006.01)
*G03B 5/00* (2021.01)

(52) U.S. Cl.
CPC ............. *G03B 5/00* (2013.01); *H04N 23/687* (2023.01); *G01R 33/098* (2013.01); *G03B 2205/0076* (2013.01)

(58) Field of Classification Search
CPC ............. G03B 2205/0076; G03B 5/00; H04N 23/687; H04N 23/6812; G01R 33/072; G01R 33/091
See application file for complete search history.

(56) References Cited

U.S. PATENT DOCUMENTS

| | | |
|---|---|---|
| 2017/0017056 A1 | 1/2017 | Park et al. |
| 2017/0108705 A1 | 4/2017 | Yu et al. |
| 2018/0100985 A1 | 4/2018 | Maede et al. |
| 2019/0349523 A1* | 11/2019 | Song ..................... G03B 5/04 |
| 2020/0177815 A1 | 6/2020 | Kim et al. |
| 2020/0341291 A1 | 10/2020 | Lim |
| 2020/0404183 A1* | 12/2020 | Kimura ................ H04N 25/61 |
| 2022/0091397 A1* | 3/2022 | Brodie ............. G02B 13/0065 |
| 2022/0103753 A1* | 3/2022 | Kojima ................ H04N 25/61 |
| 2024/0040256 A1* | 2/2024 | Jang ..................... H04N 23/54 |

FOREIGN PATENT DOCUMENTS

| | | |
|---|---|---|
| KR | 10-2017-0056387 A | 5/2017 |
| KR | 10-2017-0063970 A | 6/2017 |
| KR | 10-2018-0024145 A | 3/2018 |
| KR | 10-1886362 B1 | 8/2018 |
| KR | 10-1932795 B1 | 12/2018 |
| KR | 10-2020-0058815 A | 5/2020 |
| KR | 10-2020-0066994 A | 6/2020 |
| WO | WO 2015/133759 A1 | 9/2015 |
| WO | WO-2021002654 A1 * | 1/2021 ............. G03B 13/32 |

* cited by examiner

CAMERA DEVICE AND OPTICAL INSTRUMENT

CROSS REFERENCE TO RELATED APPLICATIONS

This application is the National Phase of PCT International Application No. PCT/KR2021/013577, filed on Oct. 5, 2021, which claims priority under 35 U.S.C. 119 (a) to Patent Application No. 10-2020-0128377, filed in the Republic of Korea on Oct. 5, 2020, Patent Application No. 10-2020-0130136, filed in the Republic of Korea on Oct. 8, 2020 and Patent Application No. 10-2021-0057093, filed in the Republic of Korea on May 3, 2021, all of which are hereby expressly incorporated by reference into the present application.

TECHNICAL FIELD

Embodiments relate to a lens moving apparatus, a camera device, and an optical instrument including the same.

BACKGROUND ART

Voice coil motor (VCM) technology, which is used in conventional general camera devices, is difficult to apply to a micro-scale camera device, which is intended to exhibit low power consumption, and study related thereto has been actively conducted.

There is increasing demand for, and production of, electronic products such as smartphones and cellular phones equipped with cameras. Cameras for cellular phones have been increasing in resolution and decreasing in size, and accordingly, actuators therefor are also becoming smaller, larger in diameter, and more multifunctional. In order to realize a high-resolution cellular phone camera, improvement in the performance of the cellular phone camera and additional functions, such as autofocus, shutter shaking prevention, and zooming in and out, are required.

DISCLOSURE

Technical Problem

Embodiments provide a camera device, which has a simple structure and is capable of reducing power consumption and accurately detecting the amounts of movement of an OIS moving unit in an X-axis direction and a Y-axis direction and a rolling angle thereof, and an optical instrument including the same.

In addition, embodiments provide a lens moving apparatus, which is capable of improving accuracy of temperature compensation in accordance with change in ambient temperature and improving reliability in conductive connection between a shape memory alloy member and a circuit board, a camera module including the same, and an optical instrument.

Technical Solution

A camera device according to an embodiment includes a fixed unit, a moving unit including a board unit disposed so as to be spaced apart from the fixed unit and an image sensor disposed on the board unit, a shape memory alloy member coupled to the fixed unit and the moving unit and conductively connected to the board unit, a position sensing unit including a first sensor, a second sensor, and a third sensor, the first sensor, the second sensor, and the third sensor being disposed on the board unit, and a controller configured to supply a driving signal to the shape memory alloy member and to move the moving unit in a direction perpendicular to an optical axis or rotate the moving unit about the optical axis using the shape memory alloy member. The controller may control movement of the moving unit and rotation of the moving unit using first sensing voltage of the first sensor, second sensing voltage of the second sensor, and third sensing voltage of the third sensor.

The controller may generate a first data value corresponding to the first sensing voltage, a second data value corresponding to the second sensing voltage, and a third data value corresponding to the third sensing voltage, and may control movement of the moving unit and rotation of the moving unit using the first to third data values.

Each of the first sensor and the third sensor may detect movement of the moving unit in an x-axis direction in a plane perpendicular to the optical axis, and the second sensor may detect movement of the moving unit in a y-axis direction in the plane perpendicular to the optical axis.

The fixed unit may include a first magnet facing the first sensor in a direction parallel to the optical axis, a second magnet facing the second sensor in the direction parallel to the optical axis, and a third magnet facing the third sensor in the direction parallel to the optical axis. The magnetization direction of the first magnet and the magnetization direction of the third magnet may be identical to each other, and the magnetization direction of the second magnet may be perpendicular to the magnetization direction of the first magnet.

Each of the first to third sensors may be a Hall sensor.

Each of the first and second sensors may be a Hall sensor, and the third sensor may be a tunnel magnetoresistance (TMR) sensor.

The controller may generate an x-axis target code value for the x-axis movement amount, a y-axis target code value for the y-axis movement amount, and a rotation target code value for the rotation amount in order to implement handshake compensation for an optical image stabilization upon movement of the camera device, and may convert the rotation target code value using the first and third sensing voltages.

The controller may convert the x-axis target code value and the y-axis target code value using the first to third sensing voltages.

The controller may receive position information about the x-axis movement amount, the y-axis movement amount, and the rotation amount according to movement of the camera device, and may generate the x-axis target code value, the y-axis target code value, and the rotation target code value based on the position information.

The controller may control the driving signal supplied to the shape memory alloy member based on the converted rotation target code value, the converted x-axis target code value, and the converted y-axis target code value.

A camera device according to another embodiment includes a fixed unit, a moving unit including a board unit disposed so as to be spaced apart from the fixed unit and an image sensor disposed on the board unit, a shape memory alloy member coupled to the fixed unit and the moving unit and conductively connected to the board unit, a position sensing unit disposed on the board unit and including a first sensor, a second sensor, and a third sensor, and a controller configured to supply a driving signal to the shape memory alloy member and to move the moving unit in a direction perpendicular to an optical axis or rotate the moving unit about the optical axis using the shape memory alloy member, wherein the controller generates a first data value corresponding to sensing voltage of the first sensor, a second data value corresponding to sensing voltage of the second sensor, and a third data value corresponding to sensing voltage of the third sensor, generates an x-axis target code value for the x-axis movement amount, a y-axis target code value for the y-axis movement amount, and a rotation target code value for the rotation amount in order to implement hand-shake compensation for optical image stabilization upon movement of the camera device, and converts the rotation target code value using the first data value and the third data value.

Each of the first and third sensors may detect movement of the moving unit in an x-axis direction in a plane perpendicular to the optical axis, and the second sensor may detect movement of the moving unit in a y-axis direction in the plane perpendicular to the optical axis.

The x-axis target code value and the y-axis target code value may be converted using the first data value, the second data value, and the third data value.

The controller may control the driving signal supplied to the shape memory alloy member based on the converted rotation target code value, the converted x-axis target code value, and the converted y-axis target code value.

Advantageous Effects

The embodiments may accurately detect the amounts of movement of an OIS moving unit in an X-axis direction and a Y-axis direction and a rolling angle thereof using first to third sensing voltages of first to third sensors.

In the embodiments, since an image sensor is moved in a direction perpendicular to an optical axis using a shape memory alloy member, the structure thereof may be simple, a cost of manufacturing the same may be reduced, reduction in the size and the height of a product may be facilitated, and the design and the design freedom of an optical instrument such as a mobile phone may be improved.

In addition, in the embodiments, since a fixed unit (e.g. a base) is disposed at an upper position and an OIS moving unit is disposed below the base, the length of a camera device in an optical-axis direction may be reduced.

In addition, in the embodiments, since OIS operation is performed using a shape memory alloy member, rather than using a magnet, magnetic field interference with peripheral elements and peripheral products may be minimized, and manufacture of a dual or triple camera device may be facilitated.

In addition, since driving force generated by expansion or contraction of a shape memory alloy member is about eight times greater than electromagnetic force between a magnet and a coil, current consumption may be reduced, and accordingly, a battery runtime of an optical instrument may increase.

In addition, the embodiments may improve accuracy of temperature compensation in accordance with change in ambient temperature, and may improve reliability in conductive connection between a shape memory alloy member and a circuit board.

BEST MODE

Figure 1:
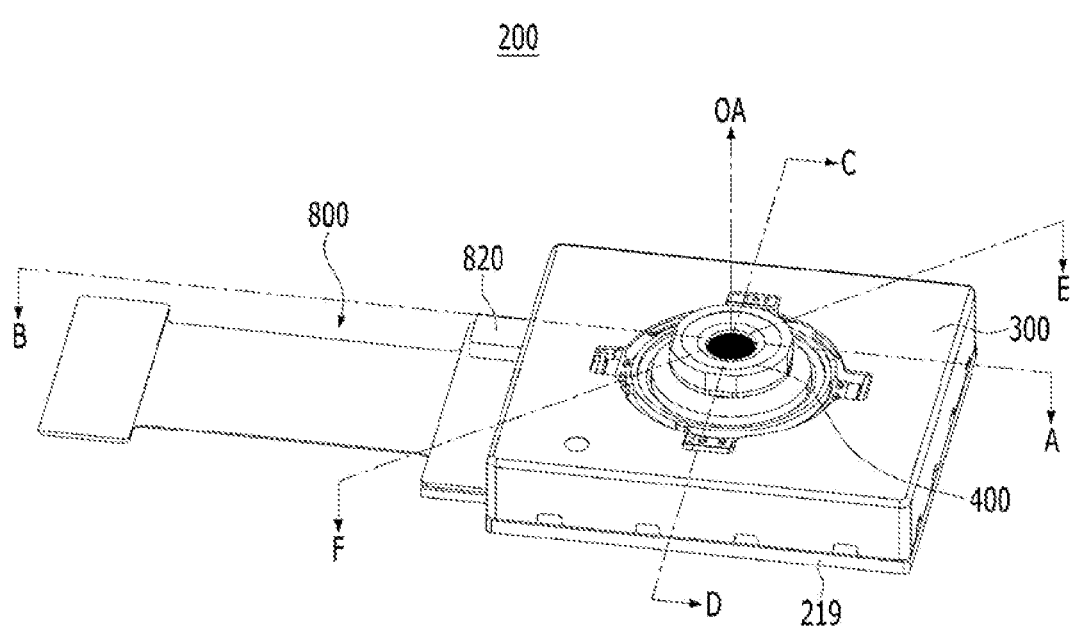
FIG. 1 is a perspective view of a camera device according to an embodiment.

Hereinafter, exemplary embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first," "second," "A," "B," "(a)," and "(b)" can be used. Such terms are only for distinguishing one component from another component, and do not determine the nature, sequence, or procedure of the corresponding constituent elements.

In addition, when it is described that a component is "connected," "coupled" or "joined" to another component, the description may include not only being directly "connected," "coupled" or "joined" to the other component but also being "connected," "coupled" or "joined" by another component between the component and the other component. In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)," it may refer to a downward direction as well as an upward direction with respect to one element.

Hereinafter, an AF moving unit may alternatively be referred to as a lens moving apparatus, a lens moving unit, a voice coil motor (VCM), an actuator, or a lens moving device. Hereinafter, a "coil" may alternatively be referred to as a coil unit, and an "elastic member" may alternatively be referred to as an elastic unit or a spring.

In addition, a camera device may alternatively be referred to as a camera, a camera module, or a camera instrument.

In addition, in the following description, a "terminal" may alternatively be referred to as a pad, an electrode, a conductive layer, or a bonding unit, and the pad may alternatively be referred to as a terminal, an electrode, or a conductive layer.

For convenience of description, a camera device according to an embodiment will be described using the Cartesian coordinate system (x,y,z), but the embodiments are not limited thereto, and may be described using other coordinate systems. In the respective drawings, the x-axis and the y-axis may be directions perpendicular to the z-axis, which is an optical-axis direction, the z-axis direction, which is the optical-axis (OA) direction, may be referred to as a "first direction," the x-axis direction may be referred to as a "second direction," and the y-axis direction may be referred to as a "third direction."

The camera device according to the embodiment may perform an "autofocus function." Here, the autofocus function is a function of automatically focusing an image of a subject on the surface of an image sensor.

In addition, the camera device according to the embodiment may perform an "optical image stabilization function." Here, the optical image stabilization function is a function of inhibiting the contour of a captured still image from being blurred due to vibration caused by shaking of a hand of a user when capturing the still image.

Figure 2:
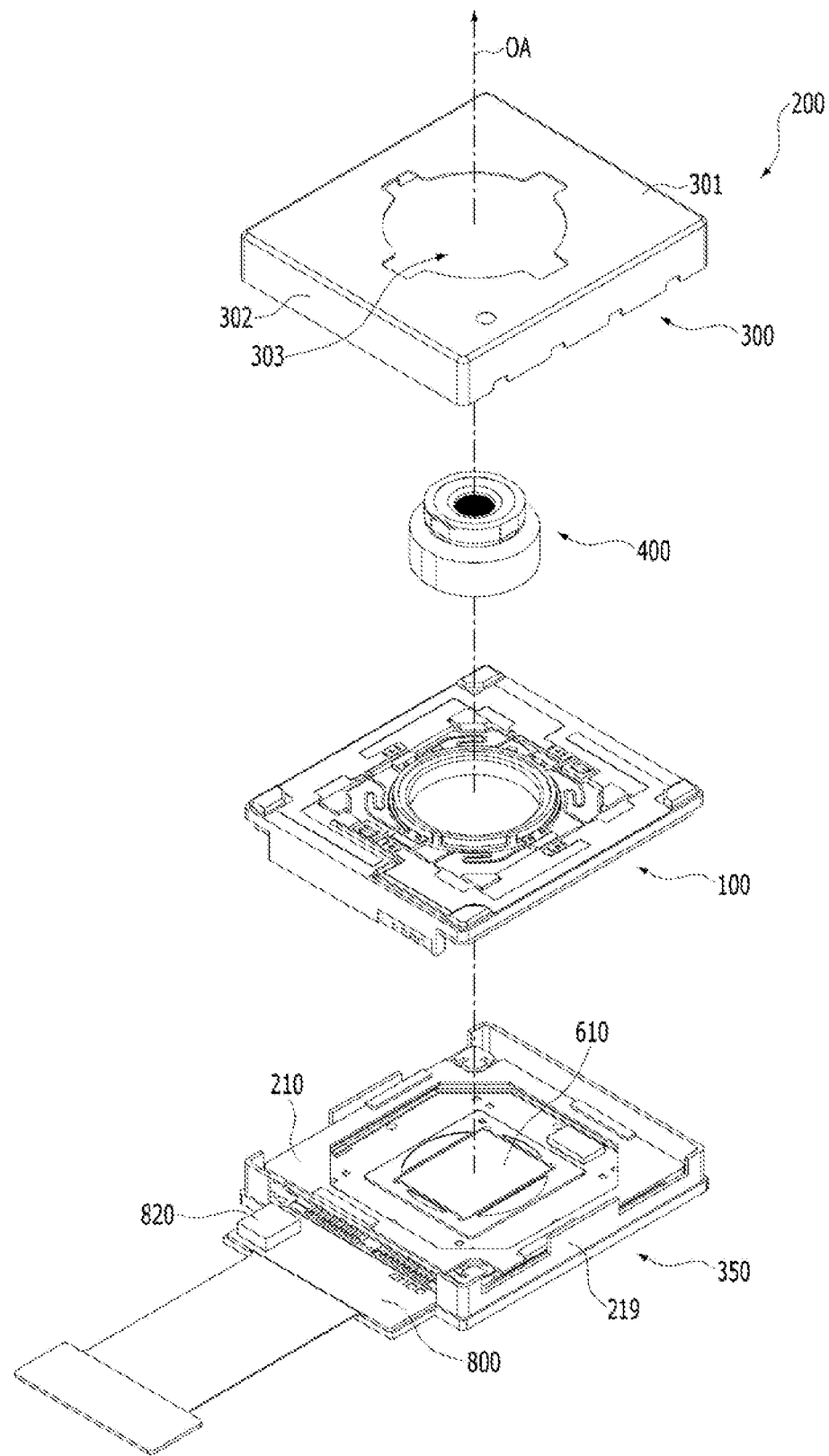
FIG. 2 is an exploded perspective view of the camera device in FIG. 1.
Figure 3A:
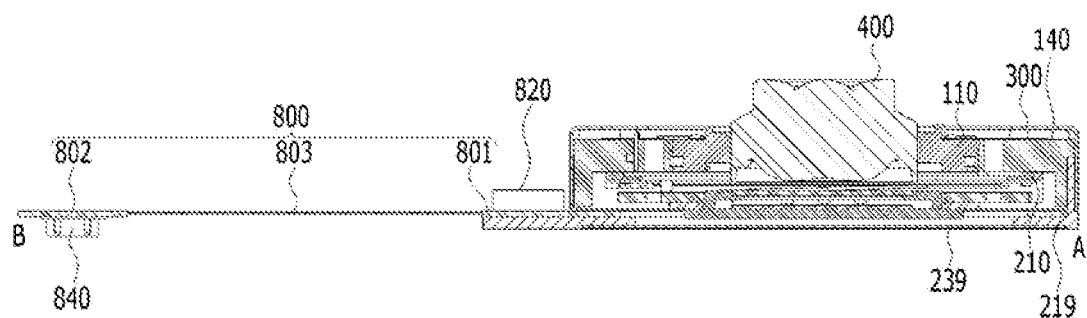
FIG. 3A is a cross-sectional view taken along line AB in FIG. 1.
Figure 3B:
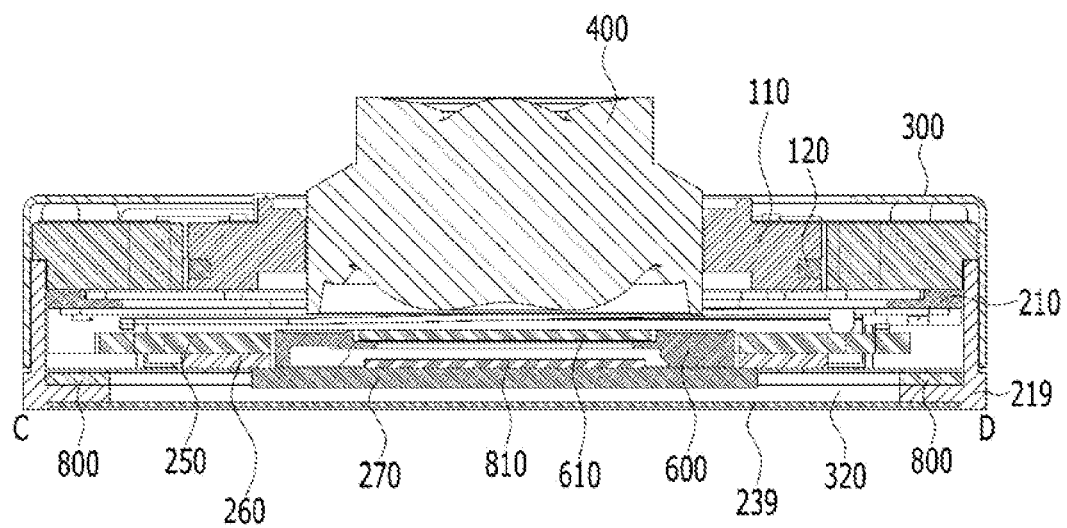
FIG. 3B is a cross-sectional view taken along line CD in FIG. 1.
Figure 3C:
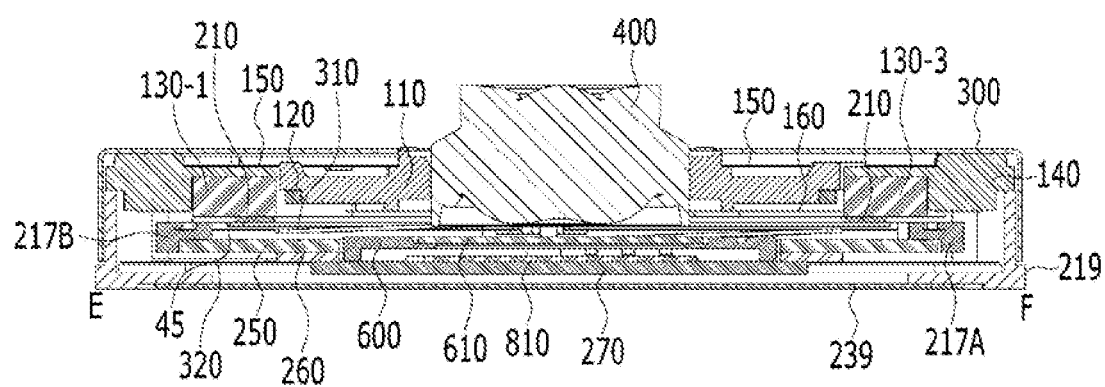
FIG. 3C is a cross-sectional view taken along line EF in FIG. 1.
Figure 4:
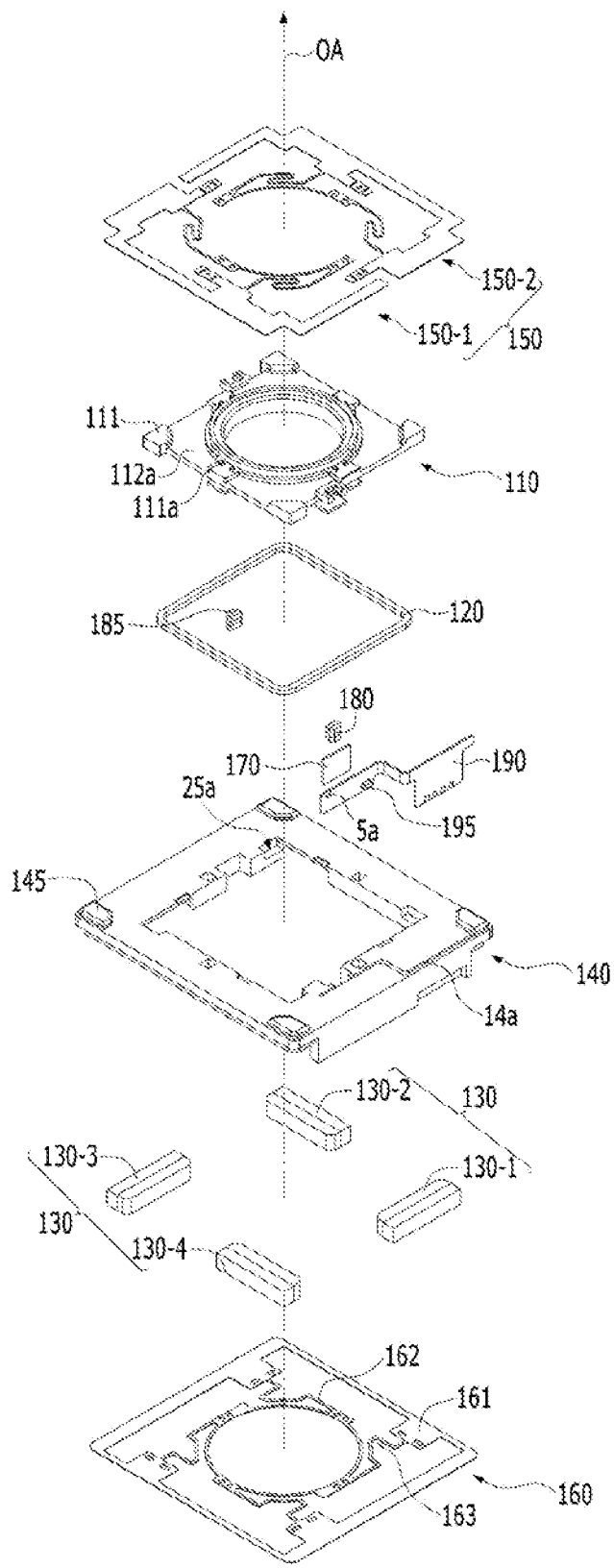
FIG. 4 is an exploded perspective view of an AF moving unit in FIG. 2.
Figure 5:
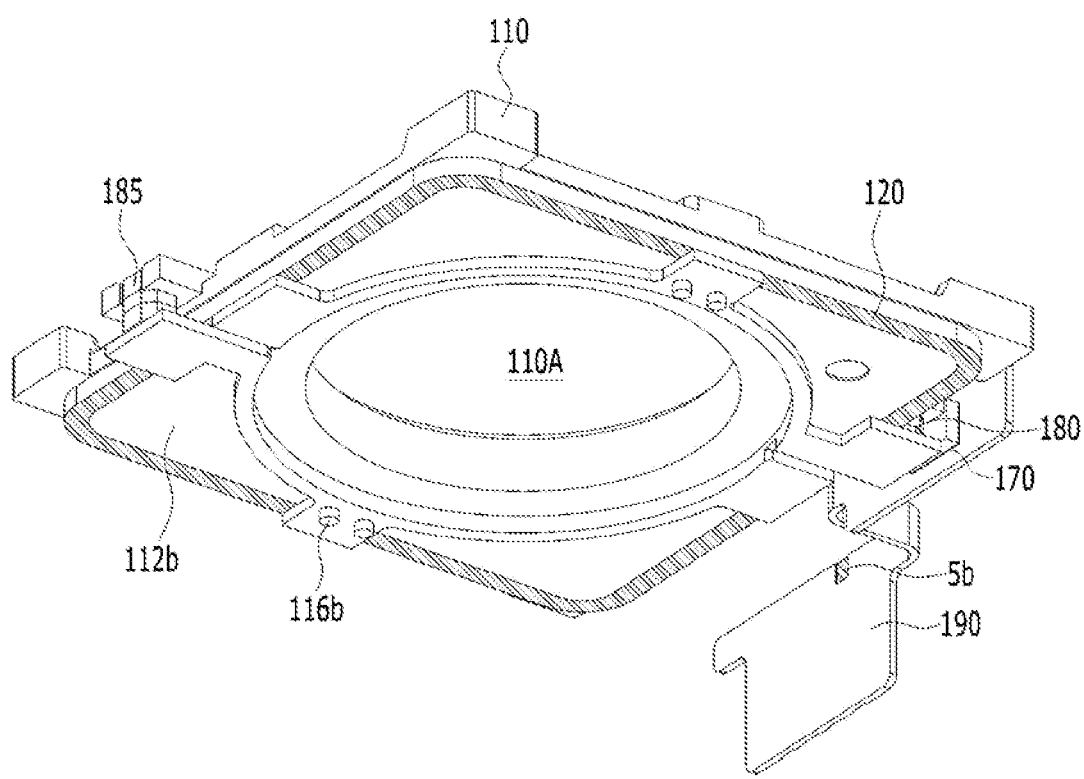
FIG. 5 is a perspective view of a bobbin, a sensing magnet, a balancing magnet, a coil, a circuit board, and a first position sensor in FIG. 4.
Figure 6:
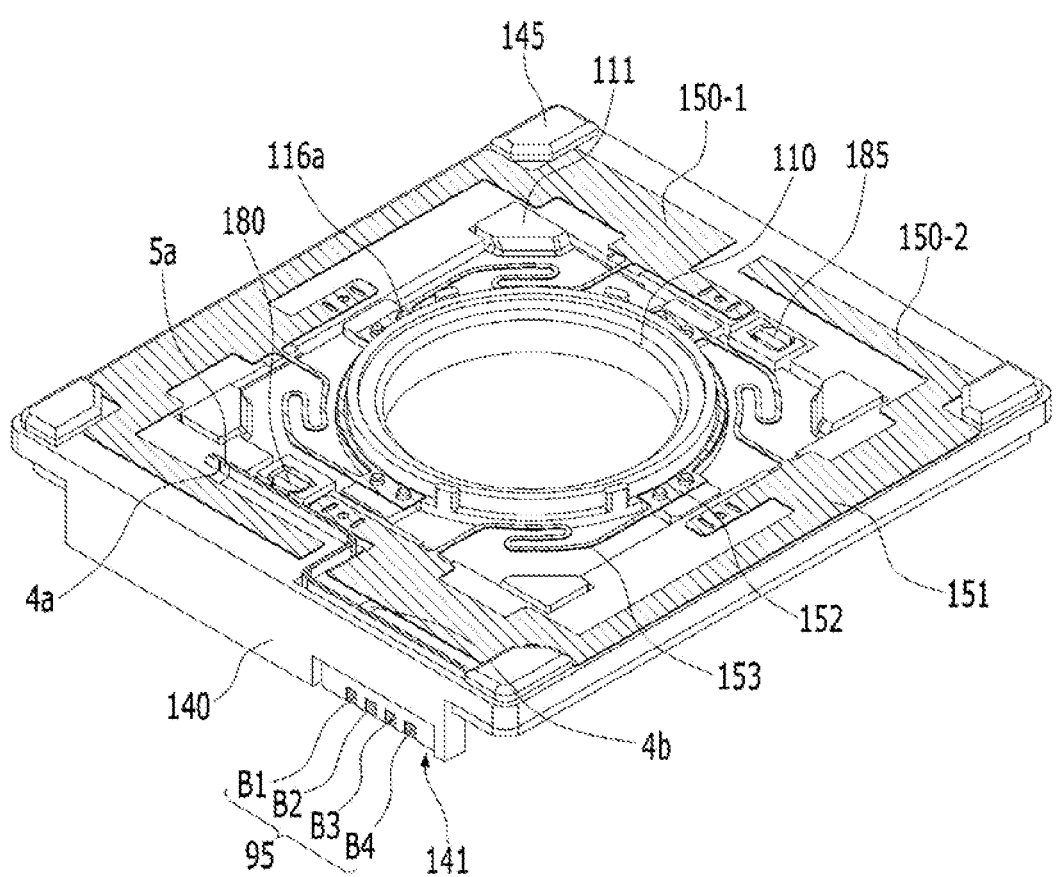
FIG. 6 is a perspective view of the bobbin, a housing, the circuit board, and an upper elastic member.
Figure 7:
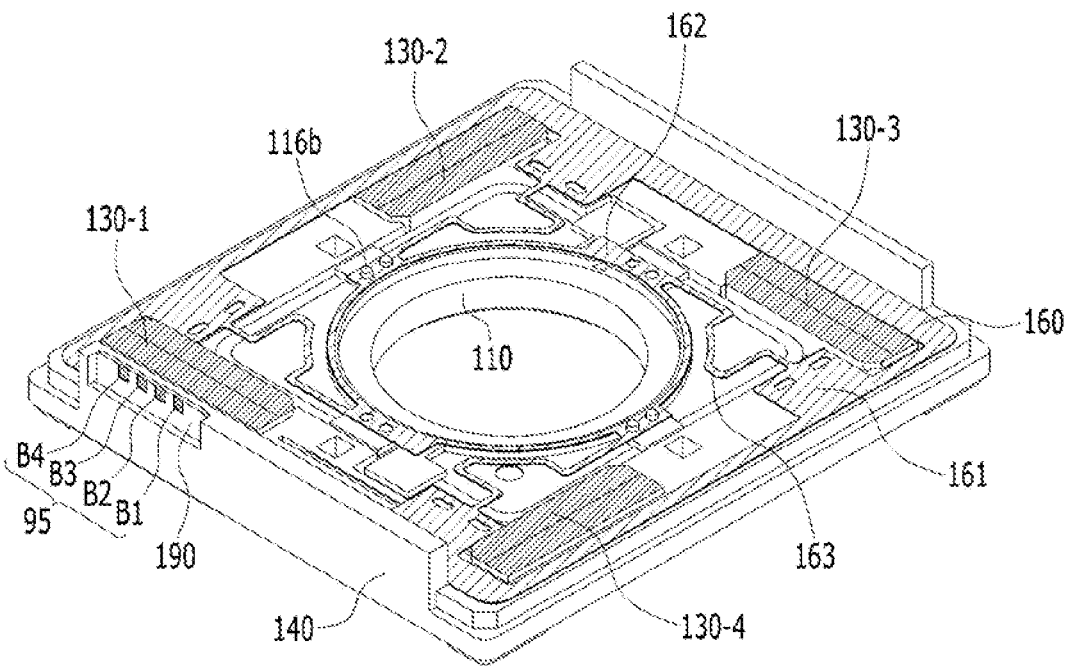
FIG. 7 is a bottom perspective view of the housing, the bobbin, a lower elastic member, a magnet, and the circuit board.

FIG. 1 is a perspective view of a camera device 200 according to an embodiment, FIG. 2 is an exploded perspective view of the camera device 200 shown in FIG. 1, FIG. 3A is a cross-sectional view taken along line AB in FIG. 1, FIG. 3B is a cross-sectional view taken along line CD in FIG. 1, FIG. 3C is a cross-sectional view taken along line EF in FIG. 1, FIG. 4 is an exploded perspective view of an AF moving unit 100 shown in FIG. 2, FIG. 5 is a perspective view of a bobbin 110, a sensing magnet 180, a balancing magnet 185, a coil 120, a circuit board 190, and a first position sensor 170 shown in FIG. 4, FIG. 6 is a perspective view of the bobbin 110, a housing 140, the circuit board 190, and an upper elastic member 150, and FIG. 7 is a bottom perspective view of the housing 140, the bobbin 110, a lower elastic member 160, a magnet 130, and the circuit board 190.

Referring to FIGS. 1 to 7, the camera device 200 may include an AF moving unit 100 and an image sensor unit 350.

The camera device 200 may further include at least one of a cover member 300, a lens module 400, or a lower base 219. The cover member 300 and the lower base 219 may constitute a case.

The AF moving unit 100 may be coupled to the lens module 400, and may move the lens module in the optical-axis (OA) direction or a direction parallel to the optical axis. The autofocus function of the camera device 200 may be performed by the AF moving unit 100.

The image sensor unit 350 may include an image sensor 810. The image sensor unit 350 may move the image sensor 810 in a direction perpendicular to the optical axis, or may tilt or rotate the image sensor 810 to a predetermined angle with respect to the optical axis. To this end, the image sensor unit 350 may include a shape memory alloy member 45, which interconnects an OIS moving unit and a fixed unit.

The optical image stabilization function of the camera device 200 may be performed by the image sensor unit 350.

For example, the image sensor 810 may be rotated about at least one of the x-axis, the y-axis, or the z-axis. For example, the image sensor 810 may be moved in at least one of the x-axis direction, the y-axis direction, or the z-axis direction. For example, the image sensor 810 may be tilted about at least one of the x-axis, the y-axis, or the z-axis. The AF moving unit 100 may alternatively be referred to as a "lens moving unit" or a "lens driving apparatus." Alternatively, the AF moving unit 100 may be referred to as a "first actuator" or an "AF driving unit."

In order to perform optical image stabilization (OIS) operation, the lens module 400 is not moved in a direction perpendicular to the optical axis, but the image sensor 810 may be moved in a direction perpendicular to the optical axis by the image sensor unit 350.

In addition, the image sensor unit 350 may alternatively be referred to as an "image sensor moving unit," an "image sensor shift unit," a "sensor driving unit," or a "sensor shift unit." Alternatively, the image sensor unit 350 may be referred to as a "second actuator" or an "OIS driving unit."

Referring to FIG. 4, the AF moving unit 100 may include a bobbin 110, a coil 120, a magnet 130, and a housing 140.

The AF moving unit 100 may further include an upper elastic member 150 and a lower elastic member 160.

In addition, the AF moving unit 100 may include a first position sensor 170, a circuit board 190, and a sensing magnet 180 in order to implement AF feedback. In addition, the AF moving unit 100 may further include a balancing magnet 185.

The bobbin 110 may be disposed in the housing 140, and may be moved in the optical-axis (OA) direction or the first direction (e.g. the Z-axis direction) by electromagnetic interaction between the coil 120 and the magnet 130.

The bobbin 110 may have a bore 110A formed therein in order to be coupled to the lens module 400 or to mount the lens module 400 therein. In an example, the bore 110A in the bobbin 110 may be a through-hole formed through the bobbin 110 in the optical-axis direction, and may have a circular shape, an elliptical shape, or a polygonal shape, without being limited thereto.

The lens module 400 may include at least one lens and/or a lens barrel.

For example, the lens module 400 may include one or more lenses and a lens barrel accommodating the one or more lenses. However, the disclosure is not limited thereto. Any of various holding structures may be used in place of the lens barrel, so long as the same is capable of supporting one or more lenses.

In an example, the lens module 400 may be screwed to the bobbin 110. Alternatively, in another example, the lens module 400 may be coupled to the bobbin 110 by means of an adhesive (not shown). The light that has passed through the lens module 400 may pass through a filter 610, and may be introduced into the image sensor 810.

The bobbin 110 may include a protruding portion 111 formed on the outer surface thereof.

In an example, the protruding portion 111 may protrude in a direction parallel to a line perpendicular to the optical axis OA. However, the disclosure is not limited thereto.

The protruding portion 111 of the bobbin 110 may correspond to a recess portion 25a in the housing 140, and may be inserted into or disposed in the recess portion 25a in the housing 140. The protruding portion 111 may suppress or prevent the bobbin 110 from rotating beyond a predetermined range about the optical axis. In addition, the protruding portion 111 may serve as a stopper for preventing the bobbin 110 from moving beyond a predetermined range in the optical-axis direction (e.g. a direction from the upper elastic member 150 toward the lower elastic member 160) due to external impact or the like.

The bobbin 110 may have a first escape recess 112a formed in the upper surface thereof to avoid spatial interference with a first frame connection portion 153 of the upper elastic member 150. In addition, the bobbin 110 may have a second escape recess 112b formed in the lower surface thereof to avoid spatial interference with a second frame connection portion 163 of the lower elastic member 160.

The bobbin 110 may include a first coupling portion 116a in order to be coupled or secured to the upper elastic member 150. In an example, the first coupling portion of the bobbin 110 may take the form of a flat surface, but the disclosure is not limited thereto. In another embodiment, the first coupling portion may take the form of a protrusion or a recess.

In addition, the bobbin 110 may include a second coupling portion 116b in order to be coupled or secured to the lower elastic member 160. In an example, the second coupling portion 116b may take the form of a flat surface, but the disclosure is not limited thereto. In another embodiment, the second coupling portion 116b may take the form of a protrusion or a recess.

Referring to FIG. 5, the bobbin 110 may have a recess formed in the outer surface thereof to allow the coil 120 to be seated therein, inserted thereinto, or disposed therein. The recess in the bobbin 110 may have a closed curve shape (e.g. a ring shape), which coincides with the shape of the coil 120.

In addition, the bobbin 110 may have a first seating recess formed therein to allow the sensing magnet 180 to be seated therein, inserted thereinto, secured thereto, or disposed therein. In addition, the bobbin 110 may have a second seating recess formed in the outer surface thereof to allow the balancing magnet 185 to be seated therein, inserted thereinto, secured thereto, or disposed therein. In an example, the first and second seating recesses in the bobbin 110 may be formed in the outer surfaces of the bobbin 110 that face each other.

The coil 120 is disposed on the bobbin 110, or is coupled to the bobbin 110. In an example, the coil 120 may be disposed on the outer surface of the bobbin 110. In an example, the coil 120 may surround the outer surface of the bobbin 110 in the direction of rotation about the optical axis OA, but the disclosure is not limited thereto.

The coil 120 may be directly wound around the outer surface of the bobbin 110, but the disclosure is not limited thereto. In another embodiment, the coil 120 may be wound around the bobbin 110 using a coil ring, or may be embodied as a coil block having an angled ring shape.

Power or a driving signal may be supplied to the coil 120.

The power or the driving signal supplied to the coil 120 may be a DC signal, an AC signal, or a signal containing both DC and AC components, and may be of a voltage type or a current type.

When a driving signal (e.g. a driving current) is supplied to the coil 120, electromagnetic force may be generated by electromagnetic interaction with the magnet 130, and the bobbin 110 may be moved in the optical-axis (OA) direction by the generated electromagnetic force.

At the initial position of the AF driving unit, the bobbin 110 may be movable upwards or downwards, which is referred to as bidirectional driving of the AF driving unit. Alternatively, at the initial position of the AF driving unit, the bobbin 110 may be movable upwards (or forwards), which is referred to as unidirectional driving of the AF driving unit.

At the initial position of the AF driving unit, the coil 120 may be disposed so as to correspond to or overlap the magnet 130, which is disposed in the housing 140, in a direction parallel to a line that is perpendicular to the optical axis OA and extends through the optical axis.

In an example, the AF driving unit may include the bobbin 110 and components coupled to the bobbin 110 (e.g. the coil 120, the sensing magnet 180, and the balancing magnet 185). In addition, the AF driving unit may further include the lens module 400.

The initial position of the AF driving unit may be the original position of the AF driving unit in the state in which no electric power is supplied to the coil 120 or the position at which the AF driving unit is located as the result of the upper and lower elastic members 150 and 160 being elastically deformed due only to the weight of the AF driving unit.

In addition, the initial position of the bobbin 110 may be the position at which the AF driving unit is located when gravity acts in a direction from the bobbin 110 toward a base 210 or when gravity acts in a direction from the base 210 toward the bobbin 110.

The sensing magnet 180 may provide a magnetic field, which is detected by the first position sensor 170, and the balancing magnet 185 may cancel out the influence of the magnetic field of the sensing magnet 180 and may establish weight equilibrium with the sensing magnet 180.

The sensing magnet 180 may alternatively be referred to as a "sensor magnet." The sensing magnet 180 may be disposed on the bobbin 110, or may be coupled to the bobbin 110.

The sensing magnet 180 may be disposed so as to face the first position sensor 170.

The balancing magnet 185 may be disposed on the bobbin 110, or may be coupled to the bobbin 110. In an example, the balancing magnet 185 may be disposed opposite the sensing magnet 180.

In an example, each of the sensing magnet 180 and the balancing magnet 185 may be a monopolar-magnetized magnet, which has one N pole and one S pole, but the disclosure is not limited thereto. In another embodiment, each of the sensing magnet 180 and the balancing magnet 185 may be a bipolar-magnetized magnet or a 4-pole magnet, which includes two N poles and two S poles.

The sensing magnet 180 may be moved together with the bobbin 110 in the optical-axis direction, and the first position sensor 170 may detect the intensity of the magnetic field or the magnetic force of the sensing magnet 180, which is moved in the optical-axis direction, and may output an output signal corresponding to the result of the detection.

In an example, the intensity of the magnetic field or the magnetic force detected by the first position sensor 170 may vary depending on displacement of the bobbin 110 in the optical-axis direction. The first position sensor 170 may output an output signal proportional to the detected intensity of the magnetic field, and the displacement of the bobbin 110 in the optical-axis direction may be detected using the output signal from the first position sensor 170.

The housing 140 accommodates therein the bobbin 110, and supports the magnet 130, the first position sensor 170, and the circuit board 190.

Referring to FIGS. 4, 6, and 7, the housing 140 may be formed so as to take the overall shape of a hollow column. In an example, the housing 140 may have a polygonal (e.g. quadrangular or octagonal) or circular bore formed therein, and the bore in the housing 140 may take the form of a through-hole formed through the housing 140 in the optical-axis direction.

The housing 140 may include side portions, which correspond to or face side plates 302 of the cover member 300, and corners, which correspond to or face the corners of the cover member 300.

The housing 140 may include a stopper 145 formed on the upper portion, the upper surface, or the upper end thereof in order to be prevented from directly colliding with the inner surface of the upper plate 301 of the cover member 300.

In order to prevent the lower surface of the housing 140 from colliding with the circuit board 800 of the image sensor unit 350, the housing 140 may further include a stopper protruding from the lower surface thereof. Here, the stopper 145 may alternatively be referred to as a "boss" or a "protrusion."

Referring to FIG. 4, the housing 140 may have a mounting groove (or a seating groove) 14a formed therein to accommodate the circuit board 190. The mounting groove 14a may have a shape coinciding with the shape of the circuit board 190.

Referring to FIG. 6, the housing 140 may have an opening 141 formed therein to expose terminals B1 to B4 of a terminal unit 95 of the circuit board 190 therethrough. The opening 141 may be formed in the side portion of the housing 140.

The housing 140 may be provided on the upper portion, the upper end, or the upper surface thereof with at least one first coupling portion for coupling to a first outer frame 152 of the upper elastic member 150.

The housing 140 may be provided on the lower portion, the lower end, or the lower surface thereof with a second coupling portion for coupling and securing to a second outer frame 162 of the lower elastic member 160. For example, each of the first and second coupling portions of the housing 140 may be formed in the shape of a protrusion, a recess, or a flat surface.

The housing 140 may be coupled to a lower base 219 to be described later. In an example, the lower portion, the lower end, or the lower surface of the housing 140 may be coupled to the upper portion, the upper end, or the upper surface of the lower base 219.

The magnet 130 may be disposed in the housing 140. In an example, the magnet 130 may be disposed on the side portion of the housing 140. The magnet 130 may be an AF driving magnet for implementing AF operation.

The magnet 130 may include two or more magnets that correspond to or face the coil 120.

In an example, the magnet 130 may include magnets 130-1 to 130-4, which are disposed on the side portions of the housing 140. In another embodiment, the magnet 130 may include two magnets disposed on two opposite side portions of the housing 140. In still another embodiment, the magnet 130 may be disposed on a corner of the housing 140.

At the initial position of the AF driving unit, the magnet 130 may be disposed in the housing 140 such that at least a portion thereof overlaps the coil 120 in a direction parallel to a line that is perpendicular to the optical axis OA and extends through the optical axis OA.

Each of the first to fourth magnets 130-1 to 130-4 may be a monopolar-magnetized magnet, but the disclosure is not limited thereto. In another embodiment, each of the first to fourth magnets 130-1 to 130-4 may be a bipolar-magnetized magnet or a 4-pole magnet, which includes two N poles and two S poles.

Referring to FIG. 4, the coil 120 is disposed on the bobbin, and the magnet 130 is disposed in the housing. In another embodiment, the coil may be disposed in the housing 140, and the magnet may be disposed on the bobbin.

The circuit board 190 may be disposed in the housing 140, and the first position sensor 170 may be disposed or mounted on the circuit board 190. In an example, the circuit board 190 may be disposed in the mounting groove 14a in the housing 140, and the terminals of the circuit board 190 may be exposed to the outside of the housing 140 through the opening 141 in the housing 140.

The circuit board 190 may include a terminal part (or a terminal unit) 95 including a plurality of terminals B1 to B4 in order to be conductively connected to an external terminal or an external device, and the plurality of terminals B1 to B4 may be conductively connected to the first position sensor 170.

The first position sensor 170 may be disposed on a first surface of the circuit board 190, and the plurality of terminals B1 to B4 may be disposed on a second surface of the circuit board 190. Here, the second surface of the circuit board 190 may be a surface opposite the first surface of the circuit board 190. For example, the first surface of the circuit board 190 may be a surface of the circuit board 190, which faces the bobbin 110 or the sensing magnet 180.

For example, the circuit board 190 may be a printed circuit board or an FPCB.

The circuit board 190 may include a circuit pattern or a wiring (not shown) for conductively connecting the first to fourth terminals B1 to B4 to the first position sensor 170.

When the bobbin 110 is moved, the first position sensor 170 may detect the magnetic field or the intensity of the magnetic field of the sensing magnet 180 mounted to the bobbin 110, and may output an output signal corresponding to the result of the detection.

In an embodiment, the first position sensor 170 may take the form of a driver IC including a Hall sensor. For example, the first position sensor 170 may include a Hall sensor and a driver. In this case, the first position sensor 170 may include first to fourth terminals for transmitting and receiving data to and from the outside through data communication using a protocol, for example, I2C communication, and fifth and sixth terminals for directly providing a driving signal to the coil 120. In this case, the first to fourth terminals of the first position sensor 170 may be conductively connected to the first to fourth terminals B1 to B4 of the circuit board 190. In addition, the fifth and sixth terminals of the first position sensor 170 may be conductively connected to the coil 120 through at least one of the upper elastic member 150 or the lower elastic member 160, and may provide a driving signal to the coil 120. For example, the fifth and sixth terminals of the first position sensor 170 may be conductively connected to the first and second elastic members 150-1 and 150-2, may be conductively connected to the coil 120, and may provide a driving signal to the coil 120.

In another embodiment, the first position sensor 170 may be implemented as a Hall sensor alone. The first position sensor 170 may include two input terminals for receiving a driving signal or power and two output terminals for outputting a sensing voltage (or an output voltage).

In the embodiment in which the first position sensor 170 is implemented as a Hall sensor alone, the circuit board 190 may include first to fourth terminals B1 to B4 conductively connected to the first position sensor 170 and fifth and sixth terminals (not shown) conductively connected to the coil 120. In this case, for example, driving power may be provided to the first position sensor 170 through the first and second terminals B1 and B2 of the circuit board 190, and the output of the first position sensor 170 may be output to the outside through the third and fourth terminals B3 and B4. In addition, the fifth and sixth terminals of the circuit board 190 may be conductively connected to at least one of the upper elastic member 150 or the lower elastic member 160, and may provide a driving signal to the coil 120.

For example, the fifth and sixth terminals of the circuit board 190 may be conductively connected to the first and second elastic members 150-1 and 150-2 of the upper elastic member 150, and may provide a driving signal to the coil 120 through the first and second elastic members 150-1 and 150-2. The camera device according to the embodiment may further include a capacitor 195, which is disposed on the circuit board 190. The capacitor may be of a chip type. The capacitor 195 may be conductively connected in parallel to the first and second terminals B1 and B2 of the circuit board 190 for providing power (or a driving signal) to the position sensor 170 from the outside. Alternatively, the capacitor 195 may be conductively connected in parallel to the terminals of the first position sensor 170 conductively connected to the first and second terminals B1 and B2 of the circuit board 190.

Since the capacitor 195 is conductively connected in parallel to the first and second terminals B1 and B2 of the circuit board 190, the capacitor 195 may serve as a smoothing circuit for removing ripple components included in power signals GND and VDD provided to the first position sensor 170 from the outside, and thus may provide stable and consistent power signals to the first position sensor 170.

The upper elastic member 150 may be coupled to the upper portion, the upper end, or the upper surface of the bobbin 110 and to the upper portion, the upper end, or the upper surface of the housing 140, and the lower elastic member 160 may be coupled to the lower portion, the lower end, or the lower surface of the bobbin 110 and to the lower portion, the lower end, or the lower surface of the housing 140.

The upper elastic member 150 and the lower elastic member 160 may elastically support the bobbin 110 with respect to the housing 140.

For example, the upper elastic member 150 may include first and second elastic members 150-1 and 150-2. In addition, although the lower elastic member 160 is illustrated in FIG. 7 as being formed as a single unit or a single component, the disclosure is not limited thereto.

In another embodiment, at least one of the upper elastic member or the lower elastic member may include a plurality of elastic units or springs, which are conductively isolated or spaced apart from each other.

The upper elastic member 150 may further include a first inner frame 151, which is coupled or secured to the upper portion, the upper surface, or the upper end of the bobbin 110, a first outer frame 152, which is coupled or secured to the upper portion, the upper surface, or the upper end of the housing 140, and a first frame connection portion 153, which connects the first inner frame 151 to the first outer frame 152.

The lower elastic member 160 may include a second inner frame 161, which is coupled or secured to the lower portion, the lower surface, or the lower end of the bobbin 110, second outer frames 162-1 to 162-3, which are coupled or secured to the lower portion, the lower surface, or the lower end of the housing 140, and a second frame connection portion 163, which connects the second inner frame 161 to the second outer frames 162-1 to 162-3.

Each of the first and second frame connection portions 153 and 163 may be bent or curved at least once so as to form a pattern having a predetermined shape.

Each of the upper elastic member 150 and the lower elastic member 160 may be formed of a conductive material.

Referring to FIGS. 4 and 5, the circuit board 190 may include two pads 5a and 5b. In an example, the first pad 5a may be located on the second surface of the circuit board 190, and the second pad 5b may be located on the first surface of the circuit board 190, but the disclosure is not limited thereto. In another embodiment, the first and second pads may be formed on any one of the first surface and the second surface of the circuit board 190.

The first and second pads 5a and 5b may be conductively connected to the fifth and sixth terminals of the position sensor 170. In an example, the first pad 5a may be coupled to the first elastic member 150-1, and the second pad 5b may be coupled to the second elastic member 150-2.

In an example, the first outer frame of the first elastic member 150-1 may include a first coupling portion 4a coupled to the first pad 5a, and the first outer frame of the second elastic member 150-2 may include a second coupling portion 4b coupled to the second pad 5b.

In an example, one end of the coil 120 may be coupled to the first elastic member 150-1, and the other end of the coil 120 may be coupled to the second elastic member 150-2.

In another embodiment, the upper elastic member may be coupled to the first pad of the circuit board 190 so as to be conductively connected thereto, and the lower elastic member may be coupled to the second pad of the circuit board 190 so as to be conductively connected thereto. In still another embodiment, the lower elastic member may include two lower elastic members. Each of the two lower elastic members may be coupled or conductively connected to a corresponding one of the first and second pads of the circuit board 190, and the coil 120 may be conductively connected to the two lower elastic members.

In the embodiment in which the position sensor 170 is implemented as a Hall sensor alone, the first and second pads 5a and 5b may be conductively connected to the fifth and sixth terminals of the circuit board 190, rather than being conductively connected to the position sensor 170.

In the embodiment shown in FIG. 4, the sensing magnet is disposed on the bobbin, and the position sensor is disposed in the housing. However, the disclosure is not limited thereto. In another embodiment, the sensing magnet may be disposed in the housing, and the position sensor may be disposed on the bobbin so as to correspond to or face the sensing magnet. In still another embodiment, the sensing magnet may be disposed on the bobbin, and the position sensor may be disposed on the base 210 so as to correspond to or face the sensing magnet in the optical-axis direction.

Figure 8:
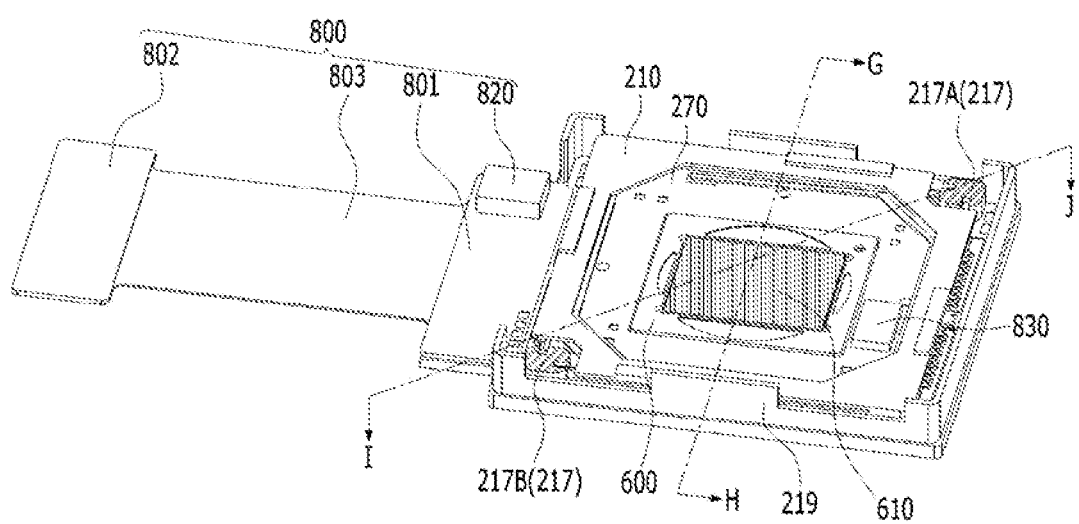
FIG. 8 is a perspective view of an image sensor unit.
Figure 9A:
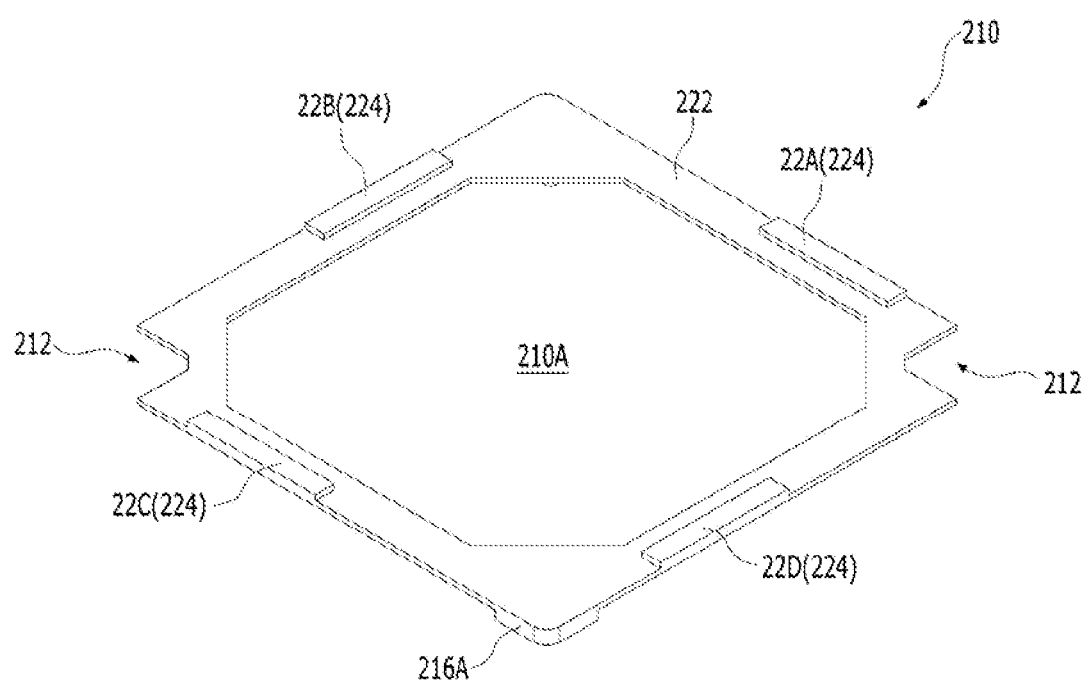
FIG. 9A is an upper perspective view of a base.
Figure 9B:
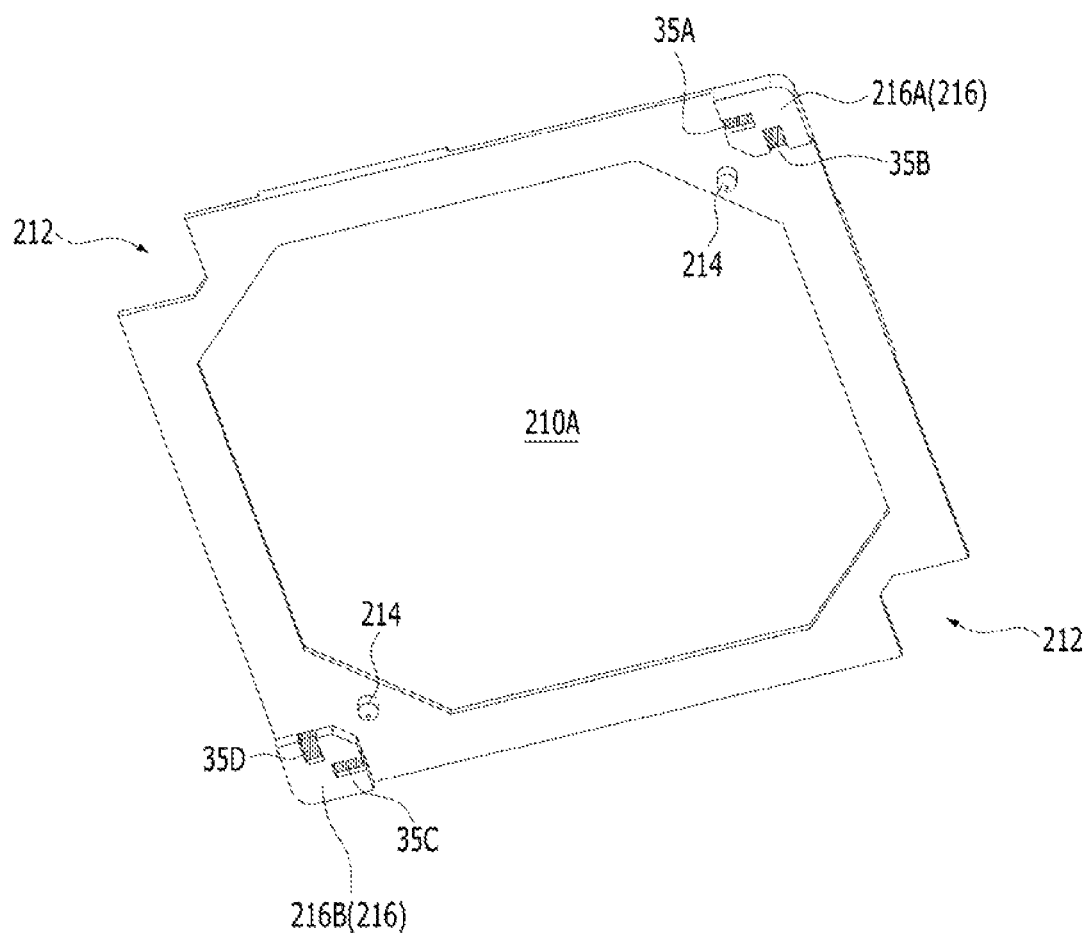
FIG. 9B is a lower perspective view of the base.
Figure 10:
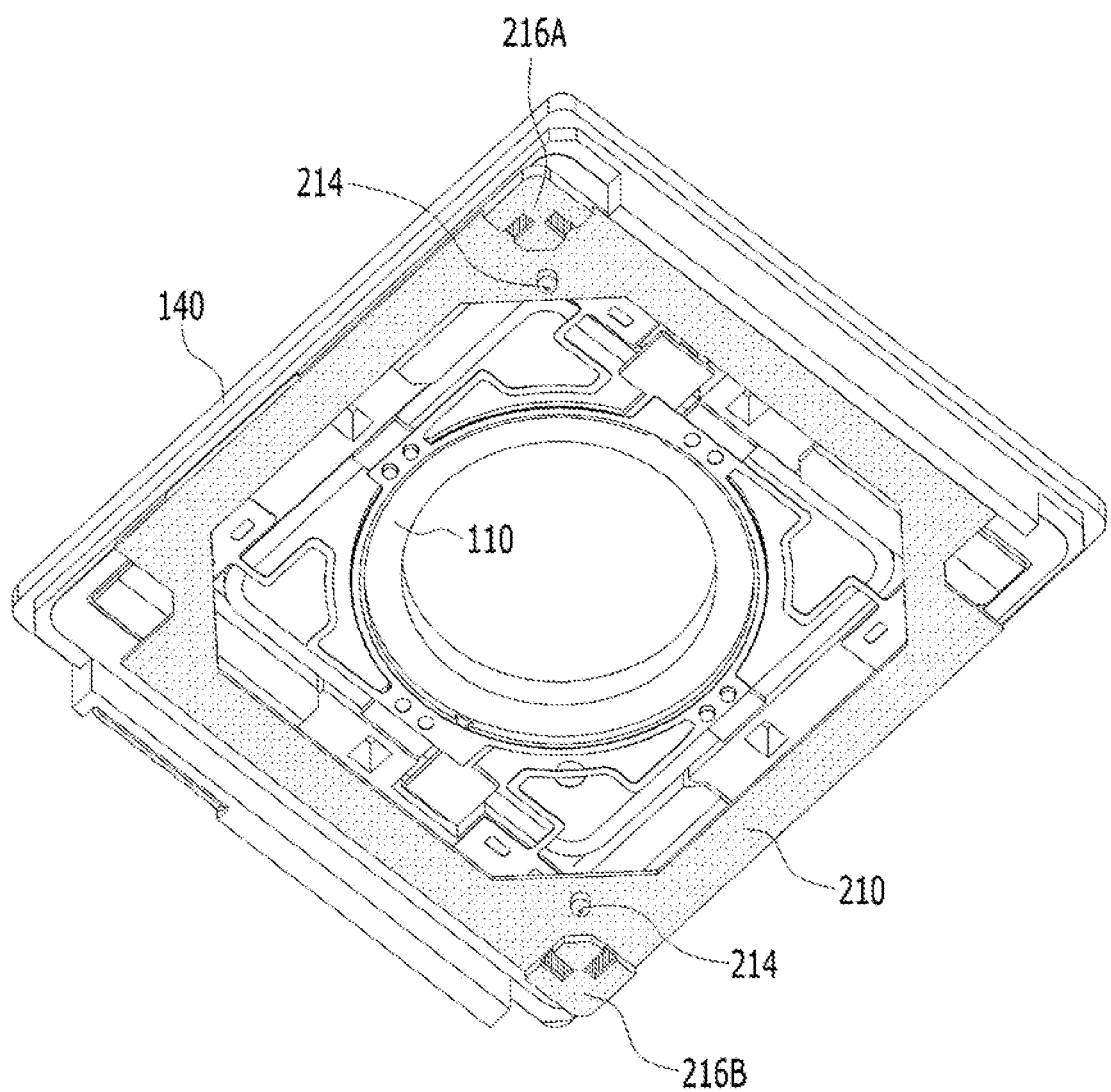
FIG. 10 is a view showing coupling of an AF moving unit and the base.
Figure 11:
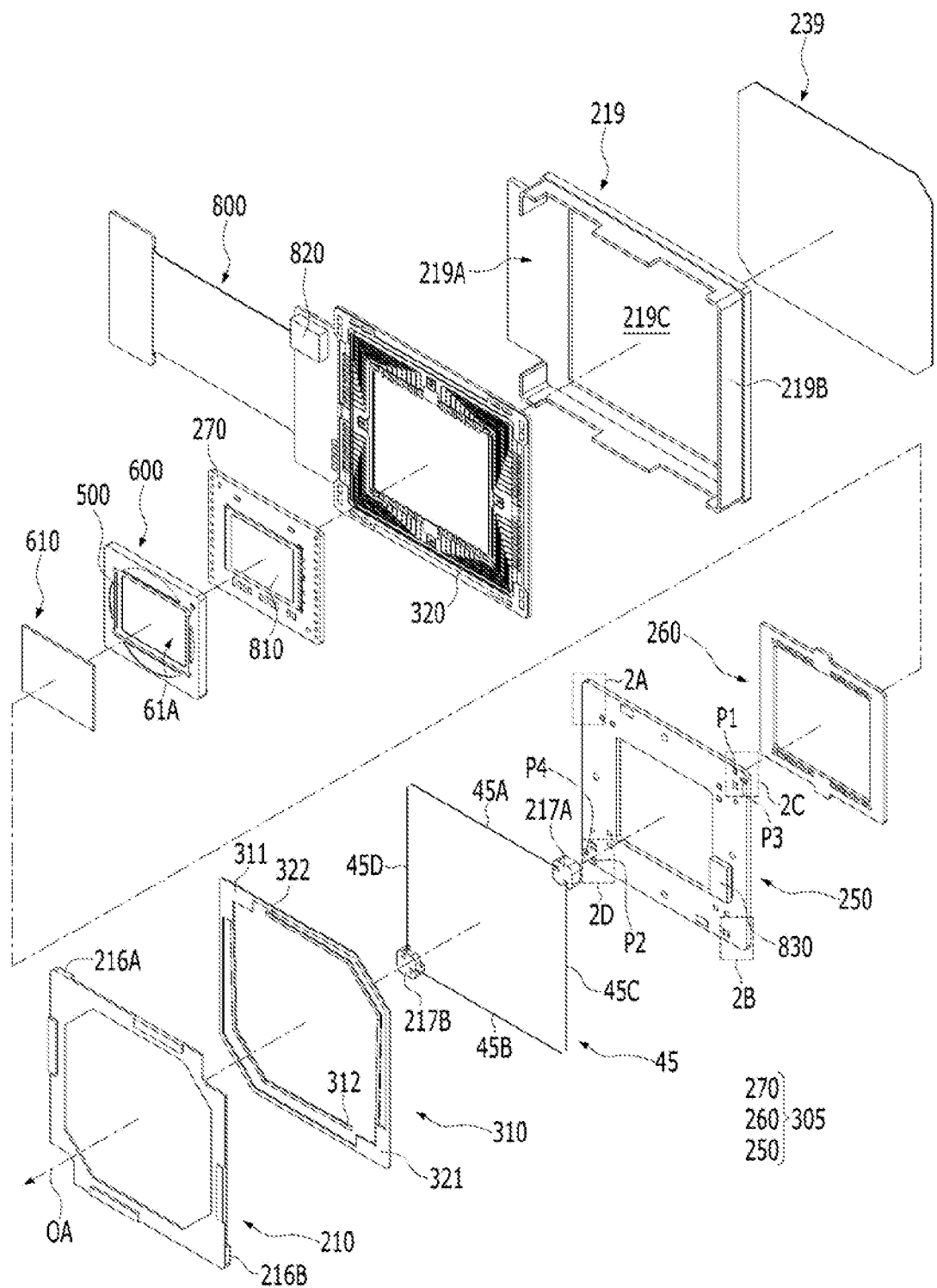
FIG. 11 is an exploded perspective view of the image sensor unit in FIG. 8.
Figure 12:
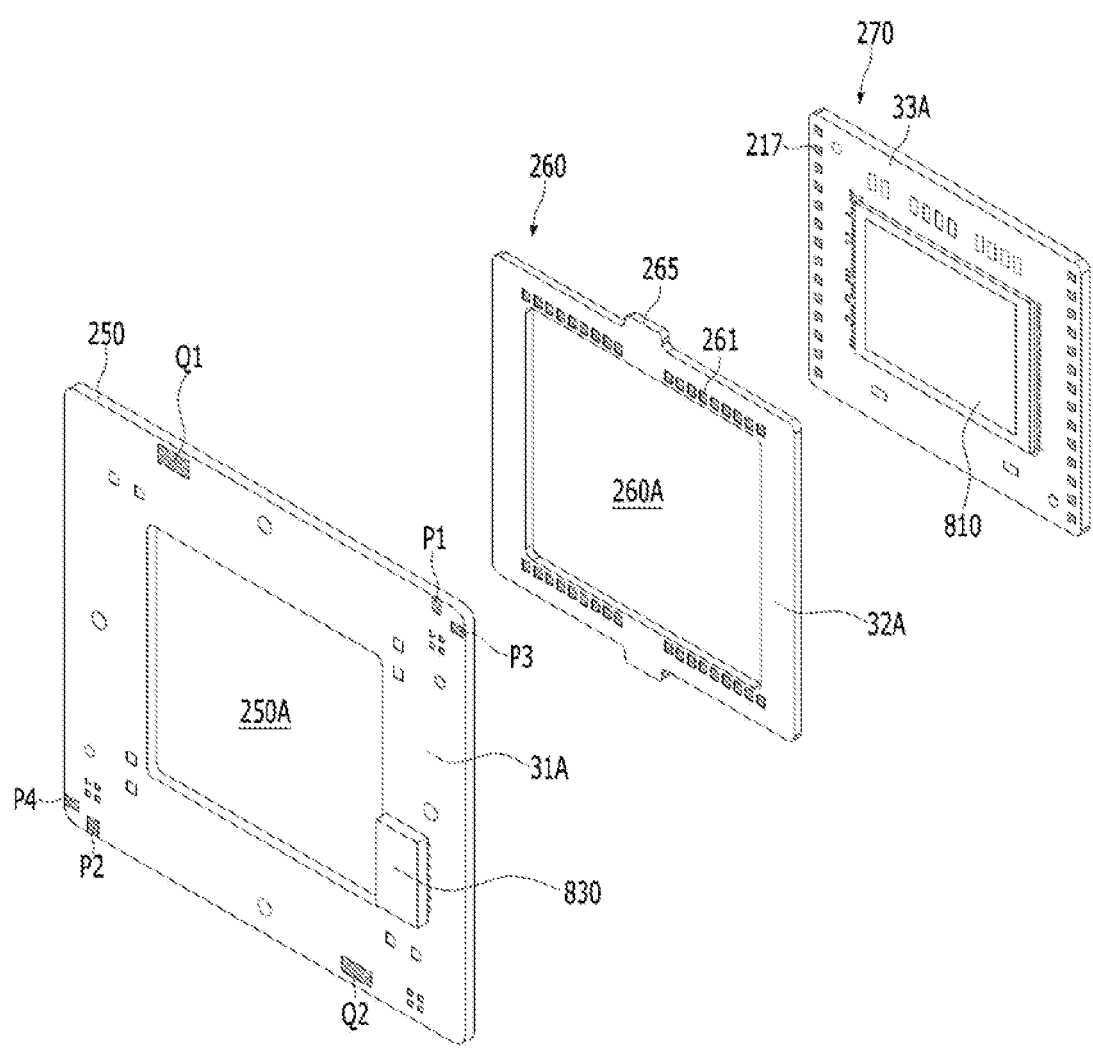
FIG. 12 is a first exploded perspective view of a first board unit.
Figure 13:
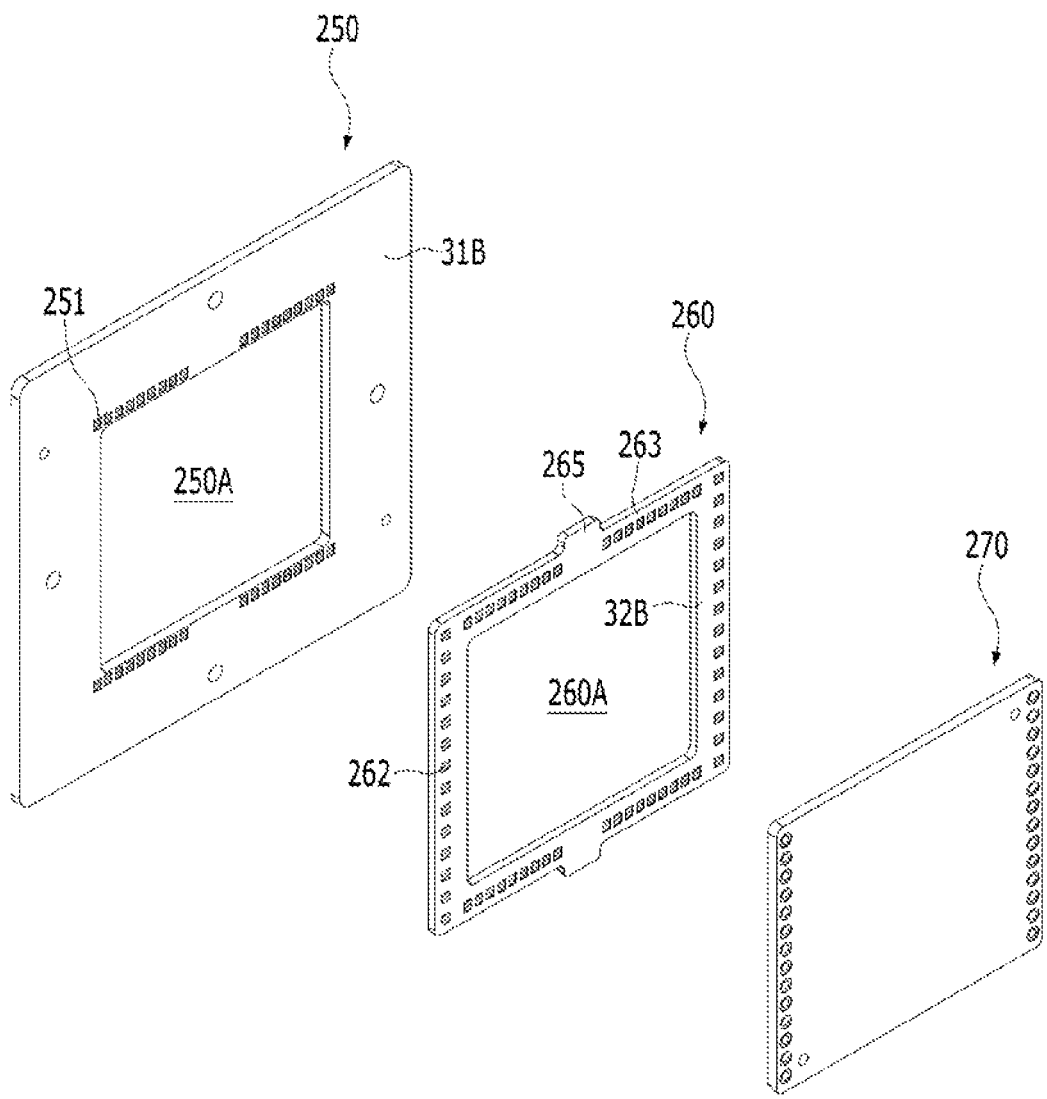
FIG. 13 is a second exploded perspective view of the first board unit.

FIG. 8 is a perspective view of the image sensor unit 350, FIG. 9A is an upper perspective view of the base 210, FIG. 9B is a lower perspective view of the base 210, FIG. 10 is a view showing coupling of the AF moving unit 100 and the base 210, FIG. 11 is an exploded perspective view of the image sensor unit 350 shown in FIG. 8, FIG. 12 is a first exploded perspective view of a first board unit 305, and FIG. 13 is a second exploded perspective view of the first board unit 305.

Referring to FIGS. 8 to 13, the image sensor unit 350 may include a fixed unit, an OIS moving unit, which is disposed so as to be spaced apart from the fixed unit, an elastic member (or an elastic support member), which is connected to the fixed unit and the OIS moving unit and supports the OIS moving unit with respect to the fixed unit, and a shape memory alloy member 45, which causes the OIS moving unit to move in a direction perpendicular to the optical axis.

The fixed unit may include at least one of the housing 140, the base 210, the second board unit 800, or the lower base 219.

The OIS moving unit may include a first board unit 350 and components disposed on the first board unit 305. In an example, the OIS moving unit may further include at least one of the image sensor 810, the filter 610, a filter holder 600, or a controller 830.

The elastic member may include at least one of a first elastic member 310 or a second elastic member 320. The elastic members 310 and 320 may elastically support the OIS moving unit with respect to the fixed unit. The elastic members 310 and 320 may alternatively be referred to as "support members" or "elastic parts."

The first elastic member 310 may conductively connect the shape memory alloy member 45 to the first board unit 305, and the second elastic member 320 may conductively connect the first board unit 305 to the second board unit 800.

For example, in order to facilitate electrical connection to the elastic members 310 and 320, at least a portion of the shape memory alloy member 45 may be plated with at least one of gold or tin. Thereby, it may also be possible to suppress corrosion of the shape memory alloy member 45.

In an example, the image sensor unit 350 may include the base 210, the first elastic member 310, the first board unit 305, the image sensor 810 disposed on the first board unit, and the shape memory alloy member 45.

The image sensor unit 350 may further include the second board unit 800 and the second elastic member 320. The first elastic member 310 and the second elastic member 320 may be wrapped with an insulative material or sealed in order to prevent electrical short circuit and corrosion.

Referring to FIGS. 9A, 9B, and 10, the base 210 may be disposed under the housing 140 of the AF moving unit, and may be coupled to the housing 140. In an example, the base 210 may be disposed on the first board unit 305, e.g. the upper surface of the first circuit board 250.

As described above, since the housing 140 is coupled to the lower base 219 and the base 210 is coupled to the housing 140, the base 210 may correspond to the fixed unit. In an example, the base 210 may serve to couple the AF fixed unit (e.g. the housing 140) of the AF moving unit to the OIS fixed unit (e.g. the lower base 219). In an example, the base 210 may be coupled to the OIS fixed unit, and may be supported by the OIS fixed unit. The base 210 may include at least one of plastic, resin, or metal.

The base 210 may have formed therein a bore 210A, which corresponds to or faces the image sensor 810. The bore 210A may be a through-hole formed through the base 210 in the optical-axis direction. When viewed from above, the bore 210A may have a polygonal shape, e.g. a quadrangular shape or an octagonal shape. However, the disclosure is not limited thereto, and the bore 210A may have a circular shape or an elliptical shape.

When viewed from above or below, the outer circumferential surface of the base 210 may have a polygonal shape, e.g. a quadrangular shape, a pentagonal shape, or a hexagonal shape. However, the disclosure is not limited thereto. In another embodiment, the outer circumferential surface of the base 210 may have a circular shape or an elliptical shape.

The base 210 may include at least one protruding portion (or protrusion) 224 protruding from the upper surface thereof. The at least one protruding portion 224 may be in contact with, attached to, or coupled to the lower portion, the lower end, or the lower surface of the housing 140 of the AF moving unit by means of an adhesive.

In an example, the base 210 may include a plurality of protruding portions 22A to 22D, which are spaced apart from each other. The plurality of protruding portions 22A to 22D may be disposed corresponding to sides of the upper surface of the base 210.

The base 210 may include a coupling portion 216, which is coupled to the first elastic member 310. In an example, the coupling portion 216 may protrude from the lower surface of the base 210. For example, the coupling portion 216 may alternatively be referred to as a "protruding portion," a "protrusion," or a "column portion."

In an example, the coupling portion 216 may include a first coupling portion 216A, which is disposed on a first corner of the lower surface of the base 210, and a second coupling portion 216B, which is disposed on a second corner of the lower surface of the base 210. In an example, the first corner of the base 210 may face the second corner in a first diagonal direction.

In an example, the base 210 may have escape recesses 212 formed therein to avoid spatial interference with support portions 217 disposed on the first board unit 305. In an example, the escape recesses 212 may be formed on a third corner and a fourth corner of the base 210, and the third corner may face the fourth corner in n a second diagonal direction. The first diagonal direction and the second diagonal direction may be perpendicular to each other.

The base 210 may include at least one protrusion 214 protruding from the lower surface thereof. For example, the number of protrusions 214 may be two or greater.

The at least one protrusion 214 may serve to maintain an air gap formed between the lower surface of the base 210 and the first board unit 305. In addition, the at least one protrusion 214 may serve as a stopper for preventing the lower surface of the base 210 from directly colliding with the first board unit 305.

In an example, the protrusion 214 may be in contact with the first board unit 305, e.g. a first surface 31A of the first circuit board 250.

In an example, the lower surface of the protrusion 214 may be located below the lower surface of the coupling portion 216. In an example, on the basis of the lower surface of the base 210, the length by which the protrusion 214 protrudes may be longer than the length by which the coupling portion 216 protrudes.

In an example, the base 210 may be spaced apart from the first board unit 305. In an example, the lower surface of the base 210 may be spaced apart from the upper surface of the first board unit 305.

The first board unit 305 may be disposed below the base 210.

The first board unit 305 may include a board on which the image sensor 810 is disposed, and may alternatively be referred to as a first board, a first circuit board, a moving circuit board, a main circuit board, a main board, or a moving board.

The lens module 400 may be disposed on the first board unit 305. In an example, the lens module 400 may be located on the filter 610 disposed on the filter holder 600.

The first board unit 305 may include at least one board on which the image sensor 810 is disposed.

Referring to FIGS. 12 and 13, the first board unit 305 may include one or more pads Q1 and Q2, which are coupled to the first elastic member 310. The one or more pads Q1 and Q2 may be conductively connected to the first elastic member 310.

The first board unit 305 may include one or more pads (or terminals) P1 to P4, which are conductively connected to the shape memory alloy member 45.

In addition, the first board unit 305 may include at least one pad (or terminal) 261, which is coupled to the second elastic member 320, and the at least one pad 261 may be conductively connected to the second elastic member 320.

In an example, the first board unit 305 may include a first circuit board 250, a second circuit board 260 disposed under the first circuit board 250, and a third circuit board 270 disposed under the second circuit board 260.

The first circuit board 250 may include a bore 250A formed therein so as to correspond to or face the bore 101 in the bobbin 110, the bore in the housing 140, and/or the lens module 400. For example, the bore 250A may be a through-hole formed through the first circuit board 250 in the optical-axis direction, and may be formed in the center of the first circuit board 250.

When viewed from above, the first circuit board 250, e.g. the outer periphery thereof, may have a polygonal shape, e.g. a quadrangular shape, but the disclosure is not limited thereto.

In addition, when viewed from above, the bore 250A in the first circuit board 250 may have a polygonal shape, e.g. a quadrangular shape, a circular shape, or an elliptical shape, but the disclosure is not limited thereto.

In an example, the controller 830 may be disposed on the first surface 31A of the first circuit board 250, but the disclosure is not limited thereto. The one or more pads Q1 and Q2, which are coupled to the first elastic member 310, may be formed on the first surface 31A of the first circuit board 250. The pads Q1 and 02 may alternatively be referred to as terminals, coupling portions, conductive patterns, or conductive layers.

In an example, a first pad Q1 and a second pad Q2, to which two second coupling portions 312 and 322 of the first elastic member 310 are coupled, may be formed on the first surface of the first circuit board 250.

In addition, the one or more pads P1 to P4, which are conductively connected to the shape memory alloy member 45, may be formed on the first surface 31A of the first circuit board 250.

At least one pad 251, which is conductively connected to the second circuit board 260, may be formed on a second surface 31B of the first circuit board 250. In an example, the first circuit board 250 may include a plurality of pads 251, which are disposed around the bore 250A. The first surface 31A of the first circuit board 250 may be a surface that faces the base 210, and the second surface 31B of the first circuit board 250 may be a surface opposite the first surface of the first circuit board 250.

The second circuit board 260 may include a bore 260A formed therein so as to correspond to or face the bore 250A in the first circuit board 250. In an example, the bore 260A may be a through-hole formed through the second circuit board 260 in the optical-axis direction, and may be formed in the center of the second circuit board 260. In an example, the bore 260A in the second circuit board 260 may have the same size as the bore 250A in the first circuit board 250, but the disclosure is not limited thereto. In another embodiment, the former may be larger or smaller than the latter.

When viewed from above, the second circuit board 260, e.g. the outer periphery thereof, may have a polygonal shape, e.g. a quadrangular shape, but the disclosure is not limited thereto.

In addition, when viewed from above, the bore 260A in the second circuit board 260 may have a polygonal shape, e.g. a quadrangular shape, a circular shape, or an elliptical shape, but the disclosure is not limited thereto.

In an example, at least one first pad 261, which is conductively connected to the first circuit board 250, may be formed on a first surface 32A of the second circuit board 260. In an example, the first surface 32A of the second circuit board 260 may be a surface facing the second surface 31B of the first circuit board 250. The pad 251 of the first circuit board 250 and the first pad 261 of the second circuit board 260 may be coupled to each other by means of a conductive adhesive or a solder.

In an example, the second circuit board 260 may include a plurality of first pads 261, which are disposed adjacent to the bore 260A. In an example, the first pads 261 may be disposed between a first side of the first surface 32A and the bore 260A and between a second side of the first surface 32A and the bore 260A. The first side and the second side of the first surface may face each other or may be located opposite each other.

At least one second pad 262, which is conductively connected to the third circuit board 270, may be formed on a second surface 32B of the second circuit board 260. In an example, the second surface 32B of the second circuit board 260 may be a surface opposite the first surface 32A of the second circuit board 260.

In an example, the second circuit board 260 may include a plurality of second pads 262, which are disposed on the second surface 32B at positions adjacent to the bore 260A. In an example, the second pads 262 may be disposed between a first side of the second surface 32B and the bore 260A and between a second side of the second surface 32B and the bore 260A. The first side and the second side of the second surface 32B may face each other or may be located opposite each other.

In addition, at least one third pad 263, which is coupled to the second elastic member 320, may be formed on the second surface 32B of the second circuit board 260. In an example, the second circuit board 260 may include a plurality of third pads 263, which are disposed on the second surface 32B at positions adjacent to the bore 260A. In an example, the third pads 263 may be disposed between a third side of the second surface 32B and the bore 260A and between a fourth side of the second surface 32B and the bore 260A. The third side and the fourth side of the second surface 32B may face each other or may be located opposite each other, and may be perpendicular to the first side (or second side).

The second circuit board 260 may include at least one protruding portion 265, which protrudes from a side surface thereof in a direction perpendicular to the optical axis. The protruding portion 265 functions to increase the contact area between the second circuit board 260 and the first circuit board 250 to increase coupling force therebetween.

At least one pad 271, which is conductively connected to the second pad 262 of the second circuit board 260, may be formed on a first surface 33A of the third circuit board 270. The first surface 33A of the third circuit board 270 may be a surface that faces or is opposite the second surface 32B of the second circuit board 260.

In an example, the third circuit board 270 may include a plurality of pads 271, and the plurality of pads 271 may be disposed around the image sensor 810.

The second pad 262 of the second circuit board 260 and the pad 271 of the third circuit board 270 may be coupled and conductively connected to each other by means of a conductive adhesive or a solder.

The image sensor 810 may be disposed on the first surface 33A of the third circuit board 270.

In an example, the area of the bore 260A in the second circuit board 260 may be larger than that of the image sensor 810. In an example, the filter holder 600, the filter 610, and the image sensor 810 may be disposed in the bore 250A in the first circuit board 250 and the bore 260A in the second circuit board 260.

In an example, the first circuit board 250 may be a main board on which various elements (e.g. the controller 830) are mounted, and the third circuit board 270 may be a board on which the image sensor 810 is mounted, and may be conductively connected to the image sensor 810 via a plurality of conductive members (e.g. wires). The second circuit board 260 may be conductively connected to the first circuit board 250 and the third circuit board 270, and may be conductively connected to the second board unit 800 via the second elastic member 320.

Each of the first to third circuit boards 250, 260, and 270 may include at least one of a printed circuit board or a flexible printed circuit board (FPCB).

Although the first board unit 305 is illustrated in FIGS. 12 and 13 as including three circuit boards, the disclosure is not limited thereto. In another embodiment, at least two of the first to third circuit boards 250, 260, and 270 may be combined into a single board.

The second board unit 800 may be spaced apart from the first board unit 305. In an example, the second board unit 800 may be located below the first board unit 305.

Referring to FIG. 3B, in an example, at least a portion of the first board unit 305 may be disposed in the bore 800A in the second board unit 800. In an example, a portion of the third circuit board 270 may be disposed in the bore 800A in the second board unit 800. The second surface 32B of the second circuit board 260 may be positioned at the same height as or higher than the upper surface of the second board unit 800.

The second board unit 800 may serve to provide a signal from the outside to the image sensor unit 350 or to output a signal from the image sensor unit 350 to the outside. The second board unit 800 may alternatively be referred to as a second board, a second circuit board, a fixed circuit board, a sub-circuit board, a sub-board, or a fixed board.

Figure 14:
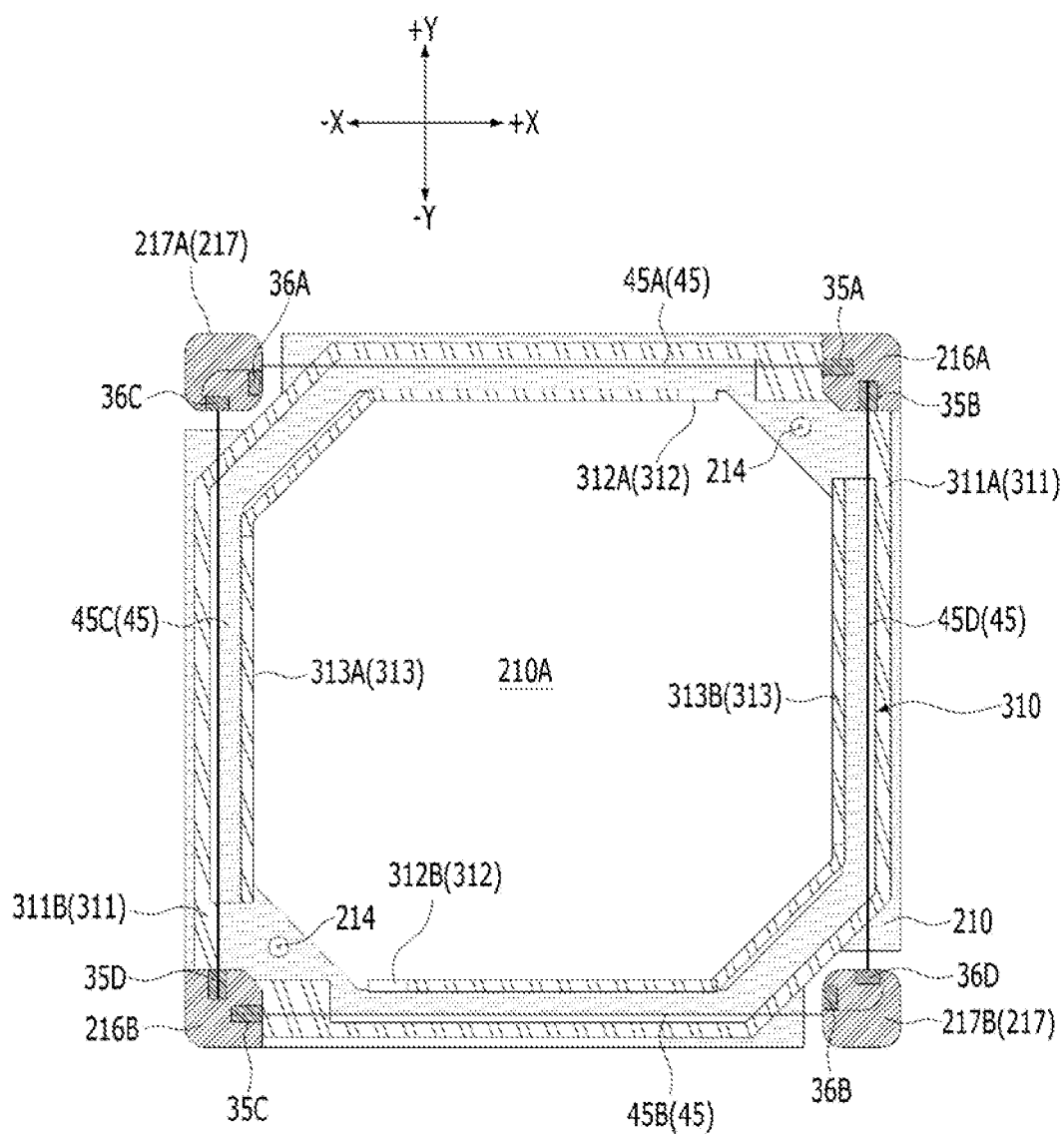
FIG. 14 is a bottom view of a first elastic member, the base, and a shape memory alloy member.
Figure 15:
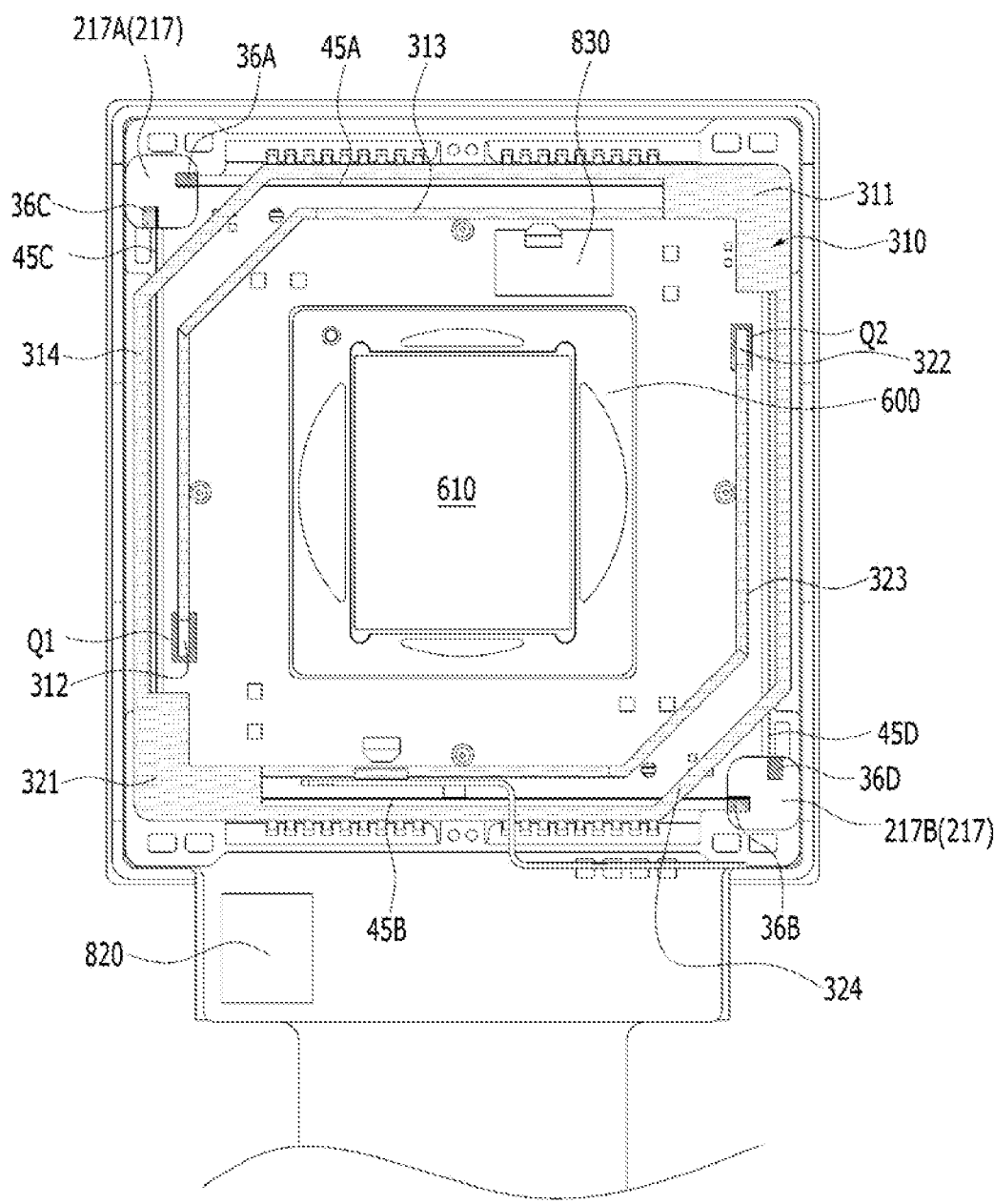
FIG. 15 is a view for explaining a coupling relationship between the first elastic member and a first board unit.
Figure 16:
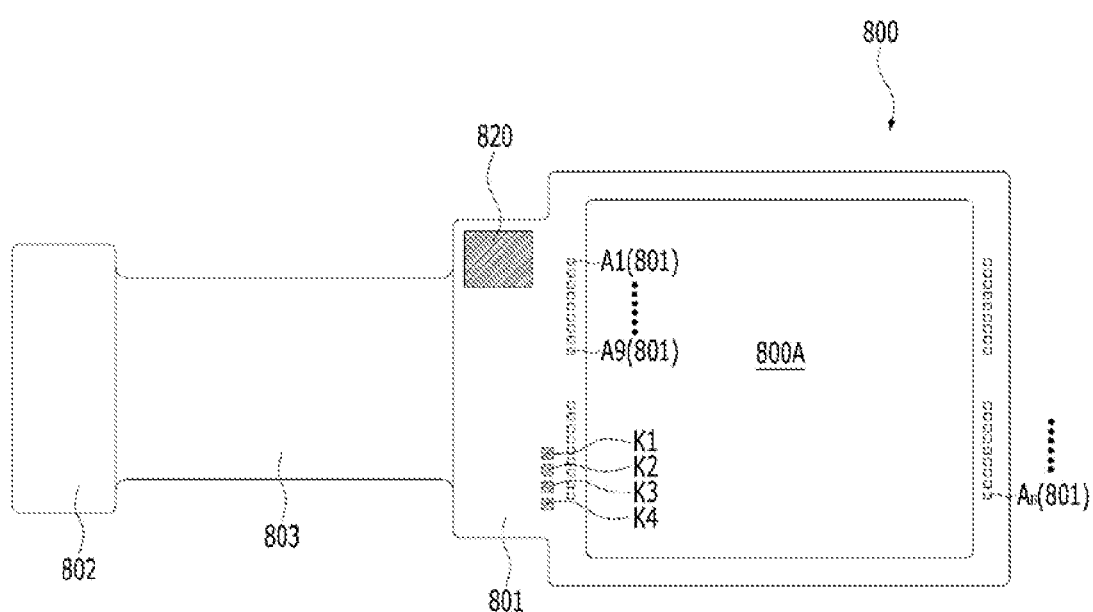
FIG. 16 is a plan view of a second board unit.
Figure 17:
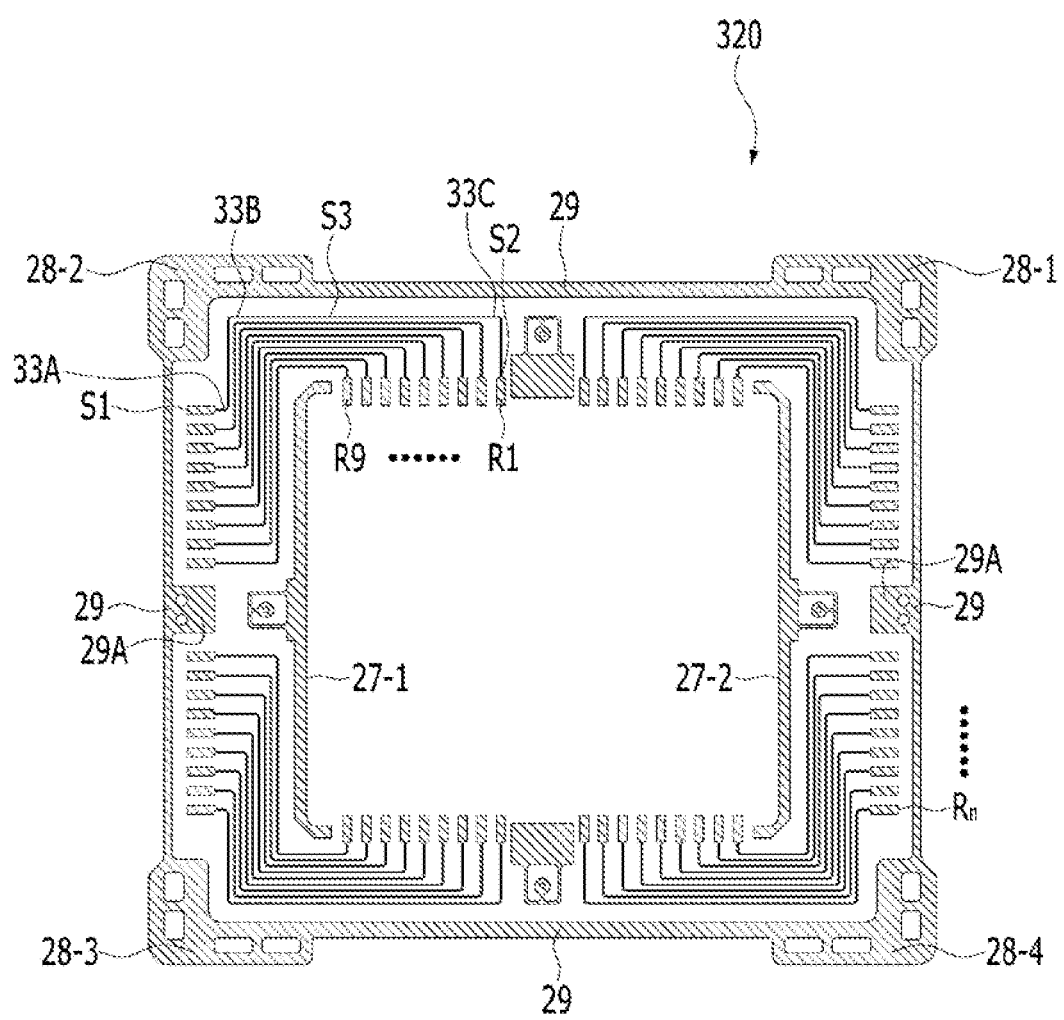
FIG. 17 is a plan view of a second elastic member.
Figure 18:
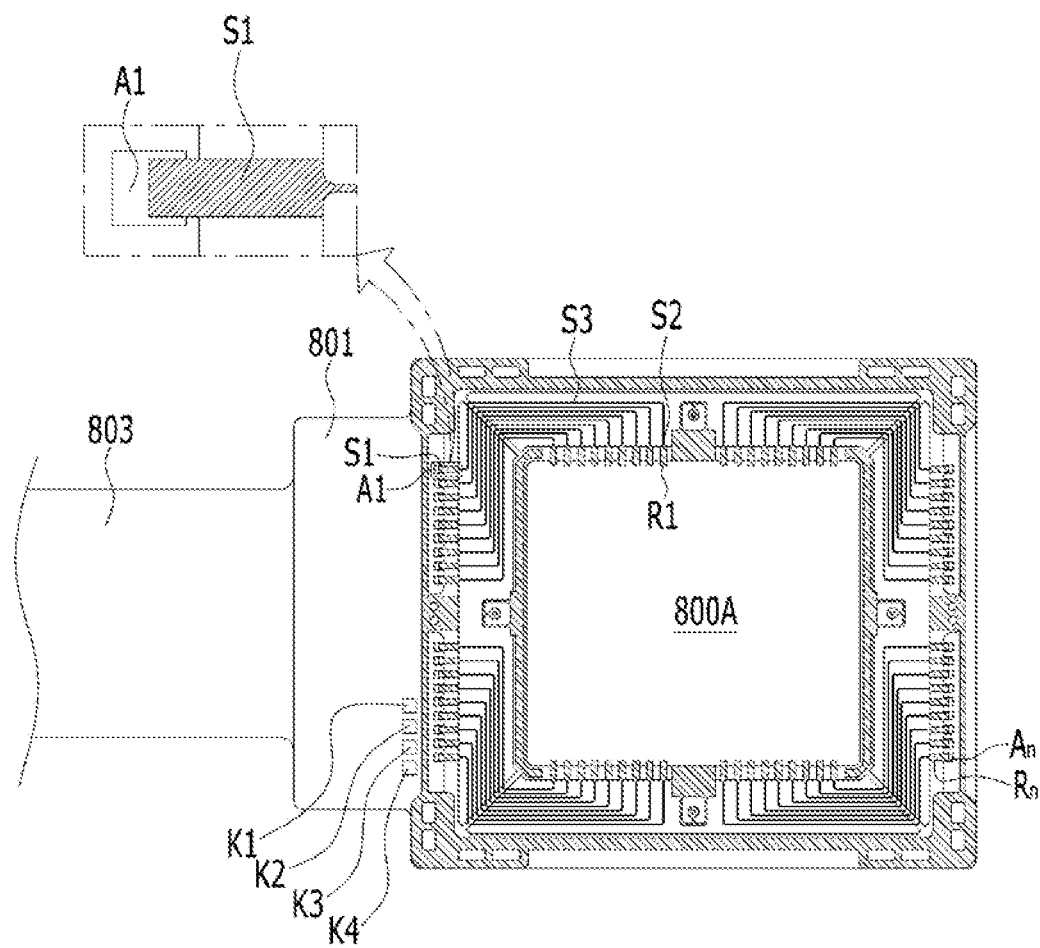
FIG. 18 is a view showing coupling between the second board unit and the second elastic member.
Figure 19:
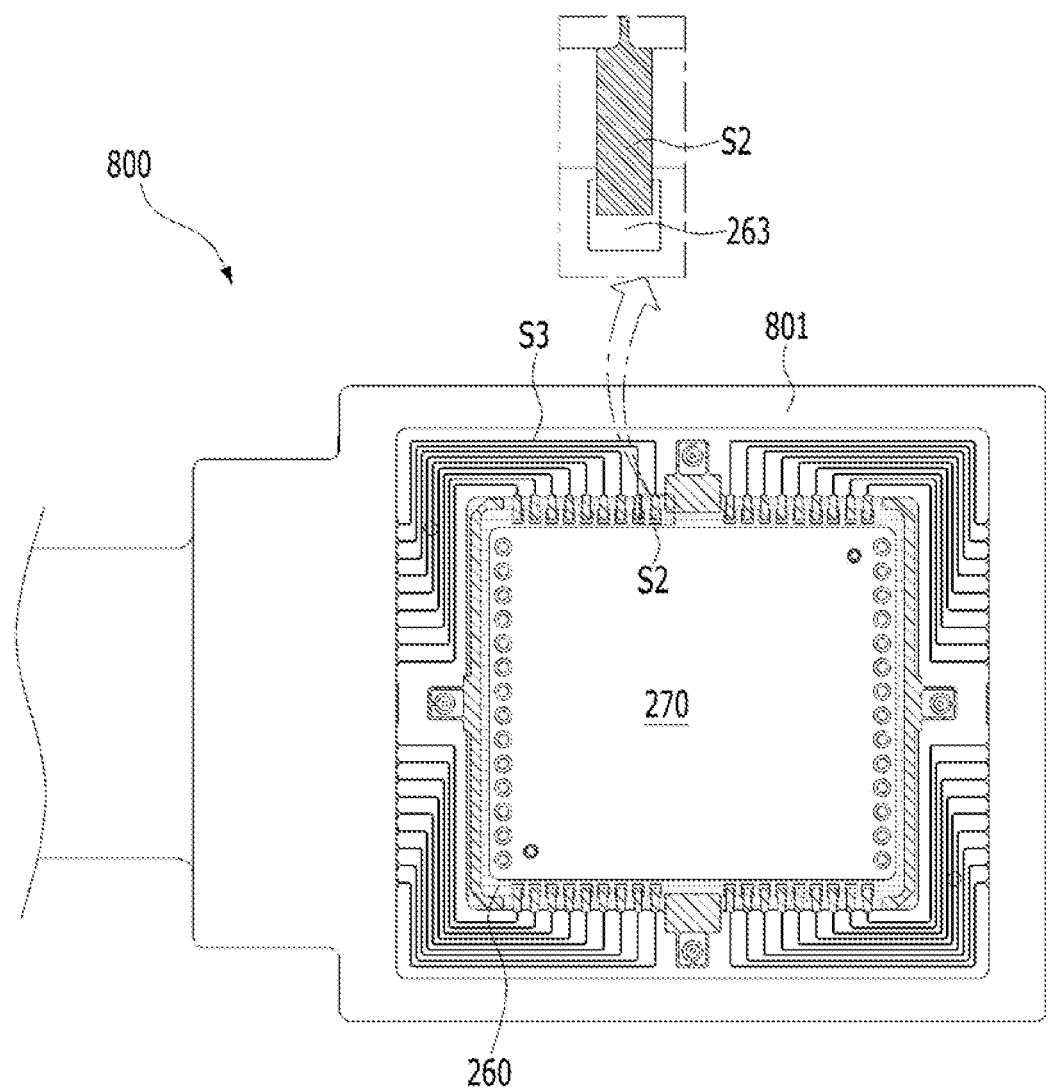
FIG. 19 is a view showing coupling between a second circuit board of the first board unit and the second elastic member.
Figure 20:
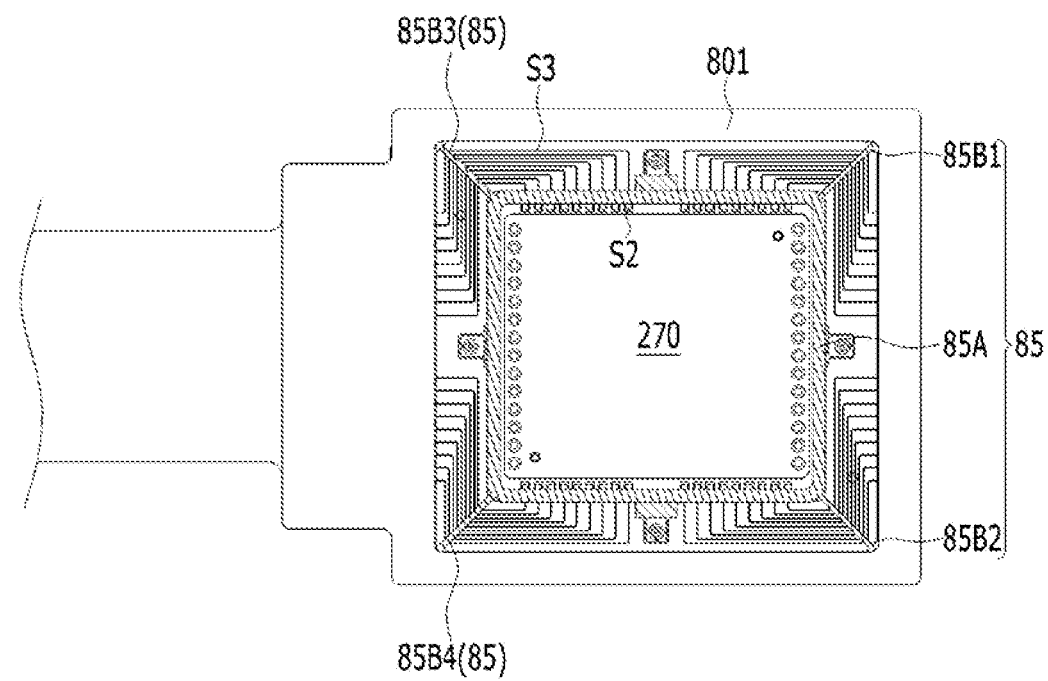
FIG. 20 is a view showing coupling between an insulation member and the second elastic member.
Figure 21:
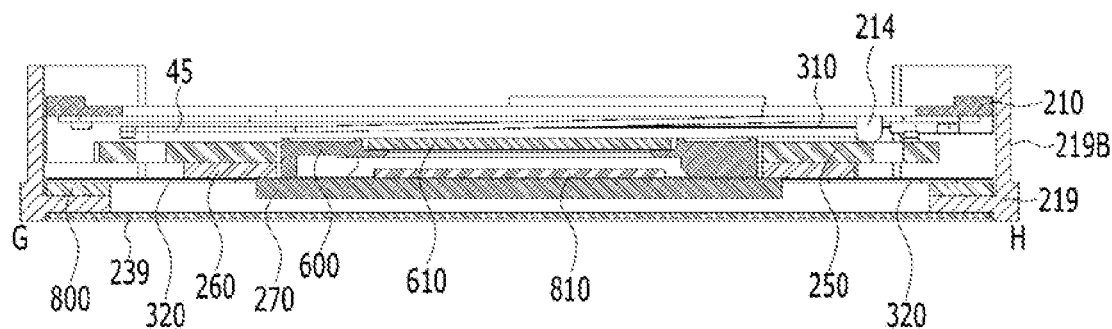
FIG. 21 is a cross-sectional view taken along line GH in FIG. 8.
Figure 22:
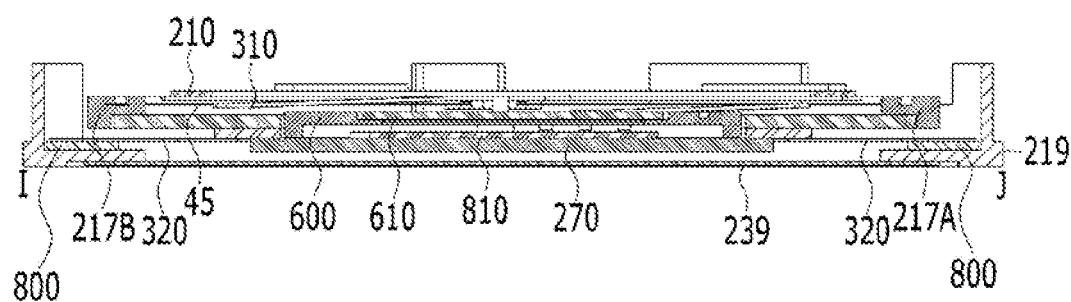
FIG. 22 is a cross-sectional view taken along line IJ in FIG. 8.

FIG. 14 is a bottom view of the first elastic member 310, the base 210, and the shape memory alloy member 45, FIG. 15 is a view for explaining the coupling relationship between the first elastic member 310 and the first board unit 305, FIG. 16 is a plan view of the second board unit 800, FIG. 17 is a plan view of the second elastic member 320, FIG. 18 is a view showing coupling between the second board unit 800 and the second elastic member 320, FIG. 19 is a view showing coupling between the second circuit board 260 of the first board unit 305 and the second elastic member 320, FIG. 20 is a view showing coupling between an insulation member and the second elastic member 320, FIG. 21 is a cross-sectional view taken along line GH in FIG. 8, and FIG. 22 is a cross-sectional view taken along line IJ in FIG. 8.

Referring to FIGS. 16 to 18, the second board unit 800 may include a first region 801 corresponding to the AF moving unit 100, a second region 802 in which a connector 840 is disposed, and a third region 803 interconnecting the first region 801 and the second region 802. The third region 803 may serve as an interposer interconnecting the first region 801 and the second region 802.

The connector 840 may be conductively connected to the second region 802 of the second board unit 800, and may include a port in order to be conductively connected to an external device.

Each of the first region 801 and the second region 802 of the second board unit 800 may include a flexible substrate and a rigid substrate, and the third region 803 thereof may include a flexible substrate, but the disclosure is not limited thereto. In another embodiment, at least one of the first to third regions 801 to 803 of the circuit board 800 may include at least one of a rigid substrate or a flexible substrate.

The first region 801 may alternatively be referred to as a "first substrate," the second region 802 may alternatively be referred to as a "second substrate," and the third region 803 may alternatively be referred to as a "third substrate."

The second board unit 800 may have formed therein a bore 800A corresponding to the bore 101 in the bobbin 110 of the AF moving unit 100, the lens module 400, and/or the image sensor 810, or the first board unit 305. In an example, the bore 800A may be a through-hole formed through the second board unit 800 in the optical-axis direction. In an example, the bore 800A in the second board unit 800 may be formed in the first region 801.

When viewed from above, the first region 801 of the second board unit 800 may have a polygonal shape (e.g. a quadrangular shape, a square shape, or a rectangular shape), but the disclosure is not limited thereto. In another embodiment, the first region of the second board unit may have a circular shape. In addition, the bore 800A in the second board unit 800 may have a polygonal shape (e.g. a quadrangular shape, a square shape, or a rectangular shape), but the disclosure is not limited thereto. In another embodiment, the bore in the second board unit may have a circular shape.

The second board unit 800 may include at least one pad 801, which is conductively connected to the second elastic member 320. In an example, the at least one pad 801 of the second board unit 800 may include a plurality of pads A1 to An (where n is a natural number greater than 1 (n>1)). Here, the pad 801 may alternatively be referred to as a "lead pattern," a "terminal," or a "lead member."

In an example, each of the plurality of pads A1 to An may correspond to, face, or overlap springs R1 to Rn (where n is a natural number greater than 1 (n>1)) in the optical-axis (OA) direction.

In an example, the plurality of pads A1 to An may be disposed around the bore 800A in the second board unit 800.

In an example, the plurality of pads A1 to An may be disposed adjacent to the bore 800A in the second board unit 800, and may be spaced apart from each other. In an example, the plurality of pads 800B may be disposed in a region between the bore 800A in the second board unit 800 and sides of the second board unit 800.

The second board unit 800 may include at least one terminal, which is conductively connected to the circuit board 190 of the AF moving unit. In an example, the second board unit may include a plurality of terminals K1 to K4. In an example, the first position sensor 170 may perform data communication with the outside through the second board unit 800.

In an example, the plurality of terminals K1 to K4 may be formed on the first surface of the second board unit 800. In an example, the plurality of terminals K1 to K4 may be disposed adjacent to one corner of the first region of the second board unit 800.

Each of the plurality of terminals K1 to K4 may be conductively connected to a corresponding one of the terminals B1 to B4 of the circuit board 190 by means of a conductive adhesive member or a solder.

The second board unit 800 may include a connector 840, which is disposed in the second region 802. In an example, the connector 840 may be disposed on one surface (e.g. the lower surface or the upper surface) of the second region 802 of the second board unit 800.

The image sensor unit 350 may include a motion sensor 820 and a controller 830. In addition, the image sensor unit may include at least one of a memory (not shown) or a capacitor.

The motion sensor 820, the controller 830, the memory, and the capacitor may be disposed or mounted on any one of the first board unit 305 and the second board unit 800.

In an example, the motion sensor 820 may be disposed on the second board unit 800, and the controller 830 may be disposed on the first board unit 305.

In an example, the motion sensor 820 disposed on the second board unit 800 may be conductively connected to the controller 830 disposed on the first board unit 305 via the second elastic member 320.

The motion sensor 820 outputs information about a rotational angular speed in response to movement of the camera device 200. The motion sensor 820 may be implemented as a 2-axis, 3-axis, or 5-axis gyro sensor or an angular speed sensor.

The memory may store first code values corresponding to displacement of the bobbin 110 in the optical-axis direction in order to perform AF feedback. In addition, the memory may store second code values corresponding to displacement of the OIS moving unit in a direction perpendicular to the optical axis in order to perform OIS feedback. In addition, the memory may store an algorithm or a program for operation of the controller 830. In another embodiment, the first code values and the second code values may be stored in a memory 760 of the optical instrument 200A.

For example, the memory may be a non-volatile memory such as an electrically erasable programmable read-only memory (EEPROM), but the disclosure is not limited thereto.

The controller 830 may be conductively connected to the first position sensor 170 and/or the second position sensor 240.

In an example, in the case in which the first position sensor 170 is implemented as a Hall sensor alone, the first circuit board 250 may be provided with an AF controller (or a driver IC) configured to receive an output of the first position sensor 170. In an example, the controller 780 of the optical instrument 200A may receive an output signal of the first position sensor 170 from the AF controller, may receive the first code values from the memory, and may control a driving signal, which is to be provided to the coil 120, using the received output of the first position sensor 170 and the received first code values, whereby feedback autofocus operation may be performed. In another embodiment, the AF controller may control a driving signal, which is to be provided to the coil 120, using the output of the first position sensor 170 and the first code values.

Alternatively, in the case in which the first position sensor 170 is implemented as a driver IC including a Hall sensor, the first position sensor 170 may transmit an output of the first position sensor 170 to the controller 780 of the optical instrument 200A using I2C communication, and the controller 780 of the optical instrument 200A may control a driving signal, which is to be provided to the coil 120, using the output of the first position sensor 170 and the first code values stored in the memory, whereby feedback autofocus operation may be performed. In another embodiment, the controller 780 may control a driving signal, which is to be provided to the coil 120, using the output of the first position sensor 170 and the first code values stored in the memory.

The controller 830 may be implemented in the form of a driver IC, but the disclosure is not limited thereto. In an example, the controller 830 may be conductively connected to the pads 251 of the first circuit board 250 of the first board unit 305, and may be conductively connected to the second pads 262 of the second circuit board 260 of the first board unit 305.

The first elastic member 310 may interconnect the base 210, which is the fixed unit, and the first board unit 305, which is the OIS moving unit.

Referring to FIGS. 14 and 15, the first elastic member 310 may be disposed under the base 210.

One end of the first elastic member 310 may be coupled to the base 210, and the other end of the first elastic member 310 may be coupled to the first board unit 305 (e.g. the first circuit board 250).

In an example, the first elastic member 310 may include first coupling portions 311 and 321, which are coupled to the base 210, second coupling portions 312 and 322, which are coupled to the first board unit 305, and connection portions 313 and 323, which interconnect the first coupling portions 311 and 321 and the second coupling portions 312 and 322.

The first coupling portions 311 and 321 may alternatively be referred to as "outer portions," "outer frames," or "first portions," the second coupling portions 312 and 322 may alternatively be referred to as "inner portions," "inner frames," or "second portions," and the connection portions 313 and 323 may alternatively be referred to as connection frames or "third portions."

In an example, the first coupling portions 311 and 321 may be coupled to the first corner and the second corner of the base 210. In an example, the first coupling portions 311 and 321 may be coupled to the coupling portion 216 of the base 210. In an example, the first coupling portions 311 and 321 may at least partially be disposed within the coupling portion 216 of the base 210. In an example, the first coupling portions 311 and 321 may be located between the upper surface of the base 210 and the lower surface of the coupling portion 216 of the base 210.

In an example, the first coupling portions 311 and 321 of the first elastic member 310 may include a $1\text{-}1^{st}$ coupling portion 311, which is coupled to the first coupling portion 216A of the base 210, and a $1\text{-}2^{nd}$ coupling portion 321, which is coupled to the second coupling portion 216B of the base 210. In addition, in an example, the second coupling portions 312 and 322 of the first elastic member 310 may include a $2\text{-}1^{st}$ coupling portion 312, which is coupled and conductively connected to the first board unit 305, e.g. the first pad Q1 of the first circuit board 250, and a $2\text{-}2^{nd}$ coupling portion 322, which is coupled and conductively connected to the second pad Q2.

In addition, the connection portions 313 and 323 of the first elastic member 310 may include a $1\text{-}1^{st}$ connection portion 313, which interconnects the $1\text{-}1^{st}$ coupling portion 311 and the $1\text{-}2^{nd}$ coupling portion 312, and a $1\text{-}2^{nd}$ connection portion 323, which interconnects the $2\text{-}1^{st}$ coupling portion 321 and the $2\text{-}2^{nd}$ coupling portion 322.

In an example, the connection portions 313 and 323 may be spaced apart from the base 210. In an example, the connection portions 313 and 323 may be bent or curved at least once. In an example, each of the first and second frames 314 and 324 may include at least one line portion (or straight portion) and at least one bent portion.

In an example, the $1\text{-}1^{st}$ connection portion 313 may include a first portion, which extends from the $1\text{-}1^{st}$ coupling portion 311 disposed on the first corner of the base 210 toward the third corner of the base 210, and a second portion, which extends from the third corner of the base 210 toward the second corner of the base 210. In addition, in an example, the $1\text{-}1^{st}$ connection portion 313 may include a third portion interconnecting the first portion and the second portion of the $1\text{-}1^{st}$ connection portion 313, and may include a first bent portion located between the first portion and the third portion and a second bent portion located between the second portion and the third portion.

In an example, the $1\text{-}2^{nd}$ connection portion 323 may include a first portion, which extends from the $1\text{-}2^{nd}$ coupling portion 321 disposed on the second corner of the base 210 toward the fourth corner of the base 210, and a second portion, which extends from the fourth corner of the base 210 toward the first corner of the base 210. In addition, in an example, the $1\text{-}2^{nd}$ connection portion 323 may include a third portion interconnecting the first portion and the second portion of the $1\text{-}2^{nd}$ connection portion 323, and may include a first bent portion located between the first portion and the third portion and a second bent portion located between the second portion and the third portion.

In an example, the first pad Q1 of the first circuit board 250 may be located closer to the second corner of the base 210 than to the first corner, the third corner, and the fourth corner of the base 210. In addition, in an example, the second pad Q2 of the first circuit board 250 may be located closer to the second corner of the base 210 than to the first corner, the third corner, and the fourth corner of the base 210.

In an example, the first pad Q1 of the first circuit board 250 may be disposed closer to the 1-2$^{nd}$ coupling portion 321 than to the 1-1$^{st}$ coupling portion 311, and the second pad Q2 of the first circuit board 250 may be disposed closer to the 1-1$^{st}$ coupling portion 311 than to the 1-2$^{nd}$ coupling portion 321.

Due to the above disposition of the first and second pads Q1 and Q2, the length of the 1-1$^{st}$ connection portion 313 and the length of the 1-2$^{nd}$ connection portion 323 may be increased. If the length of the 1-1$^{st}$ connection portion 313 and the length of the 1-2$^{nd}$ connection portion 323 are short, elastic force supporting the OIS moving unit, e.g. the first board unit 305, is large, and thus the driving power or force of the shape memory alloy member 45 necessary to move or rotate the OIS moving unit may be increased, which may make it difficult to move or rotate the OIS moving unit using the shape memory alloy member 45.

In addition, the first elastic member 310 may include a first frame 314, which interconnects one side of the 1-1$^{st}$ coupling portion 311 and one side of the 1-2$^{nd}$ coupling portion 321, and a second frame, which interconnects another side of the 1-1$^{st}$ coupling portion 311 and another side of the 1-2$^{nd}$ coupling portion 321.

In an example, the first frame 314 may be located outside the 1-1$^{st}$ connection portion 313, and the second frame 324 may be located outside the 1-2$^{nd}$ connection portion 323.

In an example, the first and second frames 314 and 324 may be included in the first coupling portions 311 and 321, and may be coupled to the base 210, but the disclosure is not limited thereto. In another embodiment, the first and second frames may be spaced apart from the base 210.

The first and second frames 314 and 324 may be bent or curved at least once. In an example, each of the first and second frames 314 and 324 may include at least one line portion (or straight portion) and at least one bent portion.

Although the first elastic member 310 is illustrated in FIG. 15 as including two coupling portions, the disclosure is not limited thereto. In another embodiment, the number of coupling portions may be one or three or more. In an example, the number of coupling portions of the first elastic member 310 and the number of coupling portions of the base 210 may be the same as each other.

For example, the first elastic member 310 may be implemented as a conductive leaf spring, but the disclosure is not limited thereto. In another embodiment, the first elastic member may be implemented as a conductive and elastic member, e.g. a suspension wire or a coil spring.

As shown in FIG. 14, the first elastic member 310 may be formed as a single spring. In an example, the first elastic member may serve as a common electrode or a common ground of the shape memory alloy member 45. However, in another embodiment, the first elastic member may include two or more springs, which are separated or spaced apart from each other.

The camera device according to the embodiment may include a conductive member 35, which is disposed on the base 210. The conductive member 35 may alternatively be referred to as a "terminal," a "pad," an "electrode," or a "conductor."

In an example, the coupling portion 216 may include a conductive member 35, to which one end of the shape memory alloy member 45 is coupled and which is conductively connected to the first elastic member 310.

In an example, the conductive member 35 may be disposed on the coupling portion 216 of the base 210. In an example, the conductive member 35 may pass through the coupling portion 216 of the base 210, and may be in contact with and conductively connected to the first elastic member 310.

In an example, the conductive member 35 may include first and second conductive members 35A and 35B, which are disposed on the first coupling portion 216A of the base 210, and third and fourth conductive members 35C and 35D, which are disposed on the second coupling portion 216B.

In addition, the first and second coupling portions 216A and 216B of the base 210 may include bores or holes corresponding to the first to fourth conductive members 35A to 35D, and the first to fourth conductive members 35A to 35D may be respectively disposed in the bores or the holes in the first and second coupling portions 216A and 216B.

In an example, the first and second conductive members 35A and 35B may be connected to or integrally formed with each other. In another embodiment, the first and second conductive members 35A and 35B may be separated or spaced apart from each other.

In addition, in an example, the third and fourth conductive members 35C and 35D may be connected to or integrally formed with each other. In another embodiment, the third and fourth conductive members 35C and 35D may be separated or spaced apart from each other.

In an example, the first and second conductive members 35A and 35B may be coupled and conductively connected to the 1-1$^{st}$ coupling portion 311 of the first elastic member 310. In an example, the first and second conductive members 35A and 35B may be disposed within the first coupling portion 216A of the base 210, and one end of each of the first and second conductive members 35A and 35B may be coupled and conductively connected to the 1-1$^{st}$ coupling portion 311 of the first elastic member 310. In addition, the other ends of the first and second conductive members 35A and 35B may be exposed from the first coupling portion 216A of the base 210. In an example, the other ends of the first and second conductive members 35A and 35B may be exposed from the lower surface of the first coupling portion 216A of the base 210.

In addition, in an example, the third and fourth conductive members 35C and 35D may be coupled and conductively connected to the 1-2$^{nd}$ coupling portion 321 of the first elastic member 310.

In an example, the third and fourth conductive members 35C and 35D may be disposed within the second coupling portion 216B of the base 210, and one end of each of the third and fourth conductive members 35C and 35D may be coupled and conductively connected to the 1-2$^{nd}$ coupling portion 321 of the first elastic member 310. In addition, the other ends of the third and fourth conductive members 35C and 35D may be exposed from the second coupling portion 216B of the base 210. In an example, the other ends of the third and fourth conductive members 35C and 35D may be exposed from the lower surface of the second coupling portion 216B of the base 210.

In order to facilitate coupling to the shape memory alloy member 45, at least a portion of each of the first to fourth conductive members 35A to 35D may be plated with at least one of gold or tin.

The shape memory alloy member 45 may move the OIS moving unit (or OIS driving unit) in directions perpendicular to the optical axis, e.g. the second direction (e.g. the X-axis direction) and the third direction (e.g. the Y-axis direction), due to expansion and contraction thereof. In addition, the shape memory alloy member 45 may rotate or tilt the OIS moving unit (or OIS driving unit) in the clockwise or counterclockwise direction with respect to the optical axis due to expansion and contraction thereof.

The shape memory alloy member 45 may include a shape memory alloy (SMA). A shape memory alloy is an alloy that returns to its remembered original shape at a specific temperature when deformed.

In an example, the shape memory alloy member 45 may be a conductive member made of a conductive material. For example, the shape memory alloy member 45 may be an alloy including at least one of Ti, Ni, Cu, Fe, Au, Zn, Mn, Ag, or Cd.

As shown in FIG. 14, the shape memory alloy member 45 may be, for example, a wire, but the disclosure is not limited thereto. In another embodiment, the shape memory alloy member 45 may be formed in a plate shape.

The shape memory alloy member 45 may include a first member 45A, a second member 45B, a third member 45C, and a fourth member 45D. Although the shape memory alloy member 45 is illustrated in FIG. 14 as including four independent members, the disclosure is not limited thereto. In another embodiment, the shape memory alloy member may include five or more independent members.

In an example, the first coupling portion 216A of the base 210 may protrude from the first corner of the base 210 toward the first board unit 305, and may be coupled to the other end of the first member 45A and the other end of the fourth member 45D.

The second coupling portion 216B of the base 210 may protrude from the second corner of the base 210 toward the first board unit 305, and may be coupled to the other end of the second member 45B and the other end of the third member 45C.

The first circuit board 250 may include first to fourth pads corresponding to the first to fourth members 45A to 45D.

In an example, one end of the first member 45A may be conductively connected to the first pad P1 of the first circuit board 250, and the other end of the first member 45A may be conductively connected to the first conductive member 35A disposed on the base 210.

In an example, one end of the second member 45B may be conductively connected to the second pad P2 of the first circuit board 250, and the other end of the second member 45B may be conductively connected to the third conductive member 35C disposed on the base 210.

In an example, one end of the third member 45C may be conductively connected to the third pad P3 of the first circuit board 250, and the other end of the third member 45C may be conductively connected to the fourth conductive member 35D disposed on the base 210.

In an example, one end of the fourth member 45D may be conductively connected to the fourth pad P4 of the first circuit board 250, and the other end of the fourth member 45D may be conductively connected to the second conductive member 35B disposed on the base 210.

The camera device 200 may include a support part 217, which is coupled to the first board unit 305 (e.g. the first circuit board 250) and to the shape memory alloy member 45.

The camera device 200 may include a support part 217 (or coupling part), which is coupled to the first board unit 305 (e.g. the first circuit board 250) and to one end of each of the first to fourth members 45A to 45D.

The support part 217 may support one end of each of the first to fourth members 45A to 45D. The support part may attach, fix, or couple one end of each of the first to fourth members 45A to 45D to the first board unit 305 (e.g. the first circuit board 250).

In an example, the lower surface of the support part 217 may be coupled or attached to the first surface 31A of the first circuit board 250 by means of an adhesive.

In an example, the support part 217 may include a first support part 217A, which is disposed adjacent to the third corner of the base 210, and a second support part 217B, which is disposed adjacent to the fourth corner of the base 210. The first and second support parts 217A and 217B may be disposed adjacent to the escape recesses 212 in the base 210. In an example, the first and second support parts 217A and 217B may protrude from the first board unit 305, e.g. the first circuit board 250, toward the base 210.

Referring to FIG. 11, the first board unit 305, e.g. the first circuit board 250, may include a first corner 2A, a second corner 2B, a third corner 20, and a fourth corner 2D. The first corner 2A and the second corner 2B may face each other or may be located opposite each other in the first diagonal direction, and the third corner 2C and the fourth corner 2D may face each other or may be located opposite each other in the second diagonal direction. In an example, the first diagonal direction and the second diagonal direction may be perpendicular to each other.

The first coupling portion 216A of the base 210 may be disposed so as to correspond to, face, or overlap the first board unit 305, e.g. the first corner 2A of the first circuit board 250, and the second coupling portion 216B of the base 210 may be disposed so as to correspond to, face, or overlap the first board unit 305, e.g. the second corner 2B of the first circuit board 250.

In addition, the first support part 217A may correspond to, face, or overlap the first board unit 305, e.g. the third corner 2C of the first circuit board 250, and may be coupled, attached, or secured to the third corner 2C. In addition, the first support part 217A may be coupled to one end of the first member 45A and one end of the third member 45C.

In addition, the second support part 217B may correspond to, face, or overlap the first board unit 305, e.g. the fourth corner 2D of the first circuit board 250, and may be coupled, attached, or secured to the fourth corner 2D. In addition, the second support part 217B may be coupled to one end of the second member 45B and one end of the fourth member 45D.

The support part 217 may include conductive members 36A to 36D, which are coupled to the shape memory alloy member 45 and are conductively connected to the first board unit.

In an example, the support part 217 may include conductive members 36A to 36D, which conductively connect one end of each of the first to fourth members 45A to 45D to a corresponding one of the first to fourth pads P1 to P4 of the first board unit 305 (e.g. the first circuit board 250).

In an example, the first support part 217A may include two conductive members 36A and 36C, which are conductively separated from or independent of each other. One 36A of the two conductive members 36A and 36C of the first support part 217A may be conductively connected to the first pad P1 of the first circuit board 250, and may be coupled and conductively connected to one end of the first member 45A.

In an example, the remaining one 36C of the two conductive members 36A and 36C of the first support part 217A may be conductively connected to the third pad P3 of the first circuit board 250, and may be coupled and conductively connected to one end of the third member 45C.

In addition, in an example, the second support part 217B may include two conductive members 36B and 36D, which are conductively separated from or independent of each other. One 36B of the two conductive members 36B and 36D of the second support part 217B may be conductively connected to the second pad P2 of the first circuit board 250, and may be coupled and conductively connected to one end of the second member 45B. In addition, in an example, the remaining one 36D of the two conductive members 36B and 36D of the second support part 217B may be conductively connected to the fourth pad P4 of the first circuit board 250, and may be coupled and conductively connected to one end of the fourth member 45D.

Referring to FIGS. 11 and 14, the first board unit 305, e.g. the first circuit board 250, may include first to fourth corners 2A to 2D, which correspond to, face, or overlap the first to fourth corners of the base 210.

The first coupling portion 216A of the base 210 may be disposed at a position corresponding to the first board unit 305, e.g. the first corner of the first circuit board 250, and the second coupling portion 216B may be disposed at a portion corresponding to the second corner of the first circuit board 250.

The first support part 217A may be disposed on the first board unit 305, e.g. the third corner of the first circuit board 250, and the second support part 217B may be disposed on the fourth corner of the first circuit board 250.

In an example, the first member 45A may interconnect the first coupling portion 216A and the first support part 217A, the second member 45B may interconnect the second coupling portion 216A and the second support part 217B, the third member 45C may interconnect the first support part 217A and the second coupling portion 216A, and the fourth member 45D may interconnect the first coupling portion 216A and the second support part 217B.

In an example, the first member 45A may interconnect the first corner of the base 210 and the first board unit 305, e.g. the third corner of the first circuit board 250, the second member 45B may interconnect the second corner of the base 210 and the fourth corner of the first board unit 305, the third member 45C may interconnect the second corner of the base 210 and the third corner of the first board unit 305, and the fourth member 45D may interconnect the first corner of the base 210 and the fourth corner of the first board unit.

The shape memory alloy member 45 may change in resistance and length in accordance with energization or de-energization thereof.

Figure 23:
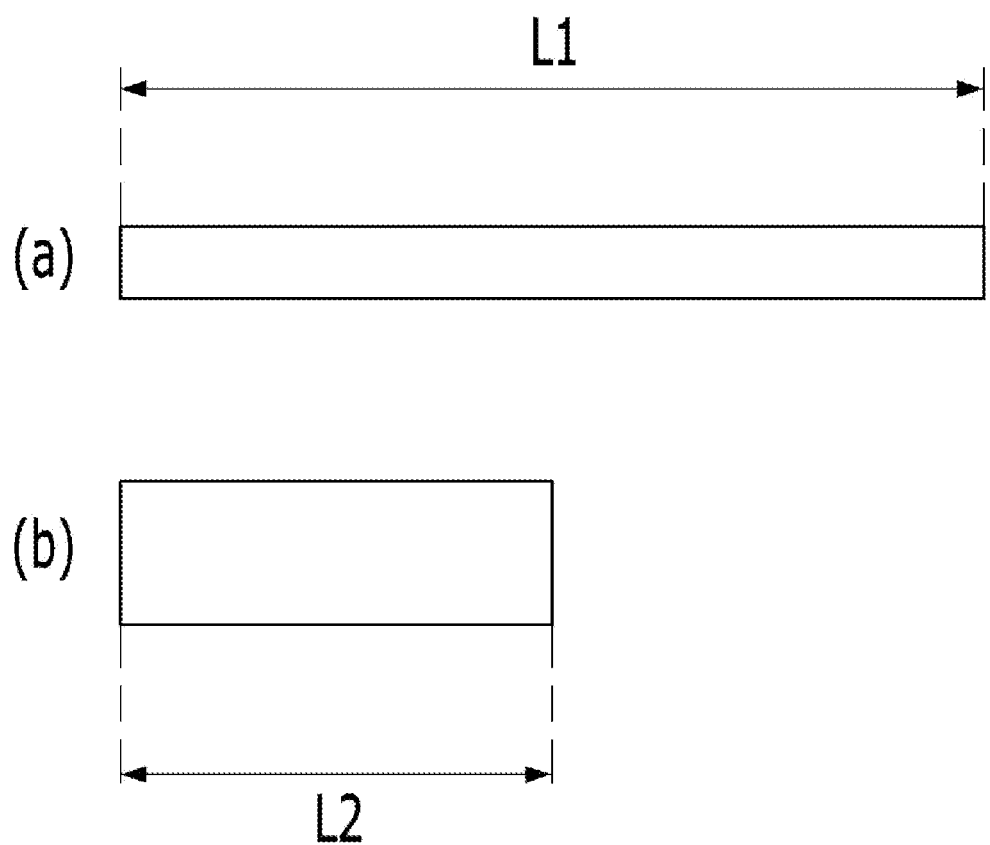
FIG. 23 is a view for explaining a relationship between the temperature, the resistance, and the length of the shape memory alloy member.

FIG. 23 is a view for explaining the relationship between the temperature, the resistance, and the length of the shape memory alloy member 45.

Referring to FIG. 23(a), the shape memory alloy member 45 may have a high resistance value at a low temperature (e.g. room temperature). In this case, the shape memory alloy member 45 may have a first length L1.

Referring to FIG. 23(b), when a driving signal (e.g. driving current or driving voltage) is applied to the shape memory alloy member 45, the temperature of the shape memory alloy member 45 may rise, and the length of the shape memory alloy member 45 may decrease at a driving temperature (e.g. 100° C. to 110° C.). In this case, the shape memory alloy member 45 may have a second length L2, which is shorter than the first length L1.

In this way, the shape memory alloy member 45 may expand or contract in response to a driving signal, and the OIS moving unit (e.g. the first board unit 305) coupled to the shape memory alloy member 45 may move in a direction perpendicular to the optical axis.

The intensity of the driving signal applied to the shape memory alloy member 45 may be controlled to adjust the degree of expansion or the degree of contraction of the shape memory alloy member 45, whereby the optical image stabilization function may be performed.

When compared to a comparative example that includes a magnet and an OIS coil to perform OIS operation, the embodiment employs the shape memory alloy member having a small weight and volume in place of the magnet and the OIS coil, whereby the structure thereof may be simple, a cost of manufacturing the same may be reduced, reduction in the size and the height of a product may be facilitated, and the design and the design freedom of an optical instrument such as a mobile phone may be improved.

In addition, since the OIS moving unit, in which the image sensor is disposed, is disposed below the shape memory alloy member 45 and the fixed unit (e.g. the base 210), a sufficient spacing distance between the lens and the image sensor may be ensured, and accordingly, the embodiment may reduce the length of the camera device in the optical-axis direction.

In addition, since the embodiment does not use a magnet, magnetic field interference with peripheral elements and peripheral products may be minimized, and manufacture of a dual or triple camera device may be facilitated.

In addition, since the driving force generated by expansion or contraction of the shape memory alloy member is about eight times greater than electromagnetic force between a magnet and a coil, current consumption may be reduced, and accordingly, a battery runtime of an optical instrument may increase.

In addition, the AF moving unit 100 may be easily attached to the base 210 of the OIS sensor unit 350, and accordingly, the two components may be easily separated from each other. Therefore, various types of AF moving units may be assembled to the camera device, and a test on the performance of the AF moving unit may be easily conducted in the camera device.

For example, the shape memory alloy member 45 has strong hysteresis characteristics, and thus the driving signal provided to the shape memory alloy member 45 may be a pulse width modulation (PWM) signal in order to minimize the hysteresis characteristics. Thereby, current consumption may be reduced, and a response speed may be increased.

The first board unit 305 may supply a first driving signal to the first member 45A, may supply a second driving signal to the second member 45B, may supply a third driving signal to the third member 45C, and may supply a fourth driving signal to the fourth member 45D.

The controller 830 may supply a first driving signal to the first member 45A through the conductive members 36A connected to the first pad P1 of the first circuit board 250. The controller 830 may supply a second driving signal to the second member 45B through the conductive members 36B connected to the second pad P2 of the first circuit board 250. In addition, the controller 830 may supply a third driving signal to the third member 45C through the conductive members 36C connected to the third pad P3 of the first circuit board 250. In addition, the controller 830 may supply a fourth driving signal to the fourth member 45D through the conductive members 36D connected to the fourth pad P4 of the first circuit board 250.

Each of the first to fourth driving signals may be an individual or independent signal. In addition, for example, each of the first to fourth driving signals may be a PWM signal in order to increase a response speed and to reduce power consumption. In another embodiment, each of the first to fourth driving signals may include at least one of a direct current signal or an alternating current signal.

When OIS operation, e.g. movement in the X-axis direction, movement in the Y-axis direction, and rotation, is performed, all of the first to fourth driving signals may be supplied to the first to fourth members in order to eliminate crosstalk between the signals. The intensities of the first to fourth driving signals may be controlled to perform movement in the X-axis direction, movement in the Y-axis direction, or rotation.

When the intensity of the current of the driving signal increases in the driving range (or the driving temperature range (e.g. 100° C. to 110° C.)) of the shape memory alloy member 45, the shape memory alloy member 45 may contract and decrease in length. On the other hand, when the intensity of the current of the driving signal decreases, the shape memory alloy member 45 may expand and increase in length.

Referring to FIG. 14, the first and second coupling portions 216A and 216B may correspond to the fixed unit, and the first and second support parts 217A and 217B may correspond to the moving unit.

A first case CASEL in which the OIS moving unit is moved in the second direction (e.g. the X-axis direction) will be described.

In order to move the OIS moving unit in the +X-axis direction, the first driving signal may be controlled such that the first member 45A contracts, and the second driving signal may be controlled such that the second member 45B expands. On the other hand, in order to move the OIS moving unit in the −X-axis direction, the second driving signal may be controlled such that the second member 45B contracts, and the first driving signal may be controlled such that the first member 45A expands.

For example, the shift (or stroke) range of the OIS moving unit in the +X-axis direction (or the −X-axis direction) from the origin (or the initial position) may be 80 μm to 400 μm. Alternatively, for example, the shift (or stroke) range of the OIS moving unit in the +X-axis direction (or the −X-axis direction) may be 100 μm to 200 μm.

Next, a second case CASE2 in which the OIS moving unit is moved in the third direction (e.g. the Y-axis direction) will be described.

In order to move the OIS moving unit in the +Y-axis direction, the fourth driving signal may be controlled such that the fourth member 45D contracts, and the third driving signal may be controlled such that the third member 45C expands. On the other hand, in order to move the OIS moving unit in the −Y-axis direction, the third driving signal may be controlled such that the third member 45C contracts, and the fourth driving signal may be controlled such that the fourth member 45D expands.

For example, the shift (or stroke) range of the OIS moving unit in the +Y-axis direction (or the −Y-axis direction) from the origin (or the initial position) may be 80 μm to 400 μm. Alternatively, for example, the shift (or stroke) range of the OIS moving unit in the +Y-axis direction (or the −Y-axis direction) may be 100 μm to 200 μm.

Next, a third case CASE3 in which the OIS moving unit is rotated about the optical axis will be described.

For example, in order to rotate the OIS moving unit in the clockwise direction, the first and second driving signals may be controlled such that both the first and second members 45A and 45B contract. Alternatively, in order to rotate the OIS moving unit in the clockwise direction, the third and fourth driving signals may be controlled such that both the third and fourth members 45C and 45D expand.

In addition, in order to rotate the OIS moving unit in the counterclockwise direction, the third and fourth driving signals may be controlled such that both the third and fourth members 45C and 45D contract. Alternatively, in order to rotate the OIS moving unit in the counterclockwise direction, the first and second driving signals may be controlled such that both the first and second members 45A and 45B expand.

For example, the rotational angle of the OIS moving unit in the clockwise or counterclockwise direction may range from 0.3 degrees to 3 degrees. Alternatively, for example, the rotational angle of the OIS moving unit may range from 0.5 degrees to 1.5 degrees.

Referring to FIGS. 17 to 20, the second elastic member 320 may be coupled to the first board unit 305 and the second board unit 800, and may support the first board unit 305 with respect to the second board unit 800.

The second elastic member 320 may include a first coupling portion S1, which is coupled and conductively connected to the second board unit 800, a second coupling portion S2, which is coupled and conductively connected to the first board unit 305 (e.g. the second circuit board 260), and a connection portion S3, which interconnects the first coupling portion S1 and the second coupling portion S2.

In an example, the first coupling portion S1 may be coupled to the pad An of the second board unit 800, and the second coupling portion S2 may be coupled to the pad 263 of the second circuit board 260 of the first board unit 305.

The second elastic member 320 may include a plurality of elastic members R1 to Rn (where n is a natural number greater than 1 (n>1)) corresponding to the plurality of pads A1 to An of the second board unit 800.

Each of the plurality of elastic members R1 to Rn may include a first coupling portion S1, which is coupled to the pads A1 to An of the second board unit 800, a second coupling portion S2, which is coupled to the third pad 263 of the second circuit board 260, and a connection portion S3, which interconnects the first coupling portion S1 and the second coupling portion S2. The first coupling portion S1 may be coupled to the pads A1 to An of the second board unit 800 by means of a solder 902 or a conductive adhesive member, and the second coupling portion S2 may be coupled to the third pad 263 of the second circuit board 260 by means of a solder or a conductive adhesive member.

In another embodiment, the second circuit board 260 may be omitted, the third circuit board 270 may be conductively connected to the first circuit board 250, and the second coupling portions S2 of the elastic members R1 to Rn may be coupled to the third circuit board 270. The third circuit board 270 may be provided with pads, which are coupled to the second coupling portions S2 of the elastic members R1 to Rn.

For example, in order to facilitate soldering, at least one element selected from among the first coupling portions S1 of the elastic members R1 to Rn, the second coupling portions S2, the pads A1 to An of the second board unit 800, and the third pad 263 of the second circuit board 260 may be plated with tin, nickel, or gold.

The second elastic member 320 may be implemented as a conductive wire or a suspension wire, but the disclosure is not limited thereto. In another embodiment, the second elastic member 320 may be implemented as a spring (e.g. a leaf spring) or a coil spring.

In an example, the second elastic member 320 may be formed of a conductive material. For example, the second elastic member 320 may include a metal material, e.g. at least one of titanium, nickel, or a copper alloy.

In an example, the width, diameter, or thickness of the connection portion S3 may be smaller than the widths, diameters, or thicknesses of the first coupling portion S1 and the second coupling portion S2.

The second elastic member 320 may extend from the upper surface of the second board unit 800 toward the second surface 32B of the second circuit board 260 of the first board unit 305.

Referring to FIG. 21, the second coupling portion S2 of the second elastic member 320 may be located below the upper surface of the image sensor 810. Accordingly, the size or height of the camera device 200 in the optical-axis direction may be reduced.

The connection portion S3 may include at least one straight portion and one or more bent portions 33A, 33B, and 33C.

Referring to FIG. 17, each of the plurality of elastic members R1 to Rn may include three bent portions 33A, 33B, and 33C, but the disclosure is not limited thereto. In another embodiment, each of the plurality of elastic members R1 to Rn may include one bent portion or two or more bent portions.

Referring to FIG. 20, the camera device 200 may further include an insulation member 85, which is disposed on the second elastic member 320. The insulation member 85 may alternatively be referred to as an "insulation layer." For example, the insulation member 85 may include polyimide.

The insulation member 85 may surround at least a portion of the second elastic member 320, or may be in contact with at least a portion of the second elastic member 320.

In an example, the insulation member 85 may surround at least a portion of the second coupling portion S2 of the second elastic member 320. The insulation member 85 may surround at least a portion of the lower surface of the second coupling portion S2. In addition, the insulation member 85 may be disposed on the second surface 32B of the second circuit board 260.

The insulation member 85 may be disposed on the second coupling portions S2 of the plurality of elastic members R1 to Rn, and may connect the second coupling portions S2 of the plurality of elastic members R1 to Rn to each other.

The insulation member 85 may support and protect the second coupling portions S2 of the plurality of elastic members R1 to Rn.

In addition, the insulation member 85 may include a body 85A, which includes a bore or a cavity. In an example, when viewed from above, the body 85A of the insulation member 85 may have a polygonal shape, which is a closed curve shape overall, for example, a quadrangular ring shape, but the disclosure is not limited thereto.

The insulation member 85 may include one or more expanded portions (or extended portions) 85B1 to 85B4, which are expanded from the body 85A to one or more corners of the bore 800A in the second board unit 800. The expanded portions 85B1 to 85B4 may be in contact with the connection portions S3 of the plurality of elastic members R1 to Rn.

In this case, the expanded portions (or the extended portions) 85B1 to 85B4 may connect the connection portions S3 of the plurality of elastic members R1 to Rn to each other, and may cause all of the connection portions S3 to move together when the OIS moving unit moves, thereby preventing the connection 3 from contacting each other, thus preventing the connection portions S3 from being electrically short-circuited.

The insulation member 85 may include four expanded portions 85B1 to 85B4, which are expanded to the inner corners formed by the bore 800A in the second board unit 800. The expanded portions 85B1 to 85B4 may be in contact with the bent portions of the connection portions S3 of the plurality of elastic members R1 to Rn.

Each of the expanded portions 85B1 to 85B4 may have a straight shape or a line shape, but the disclosure is not limited thereto. In another embodiment, each of the expanded portions may include at least one of a straight portion or a curved portion.

The expanded portions 85B1 to 85B4 may serve as dampers. In an example, the expanded portions 85B1 to 85B4 may absorb vibration of the OIS moving unit during OIS operation, thereby preventing or suppressing oscillation of the OIS moving unit and rapidly stabilizing the OIS moving unit.

In addition, in order to prevent corrosion and electrical short circuit, each of the plurality of elastic members R1 to Rn may be covered or coated with an insulative material.

A camera device 200 according to another embodiment may include separate dampers, which are disposed on the connection portions S3 and are in contact with the connection portions S3.

In an example, at least a portion of the insulation member 85 may be in contact with or connected to at least some of dummy members 28-1 to 28-4, 29, 27-1, and 27-2 to be described later.

The second elastic member 320 may further include at least one dummy member (or dummy pattern).

Referring to FIGS. 17 and 18, in an example, the dummy member may include first dummy members 28-1 to 28-4, which are disposed on the second board unit 800. In an example, the first dummy members 28-1 to 28-4 may be disposed on the upper surface of the second board unit 800.

The first dummy members 28-1 to 28-4 may be coupled or attached to the lower surface of the first region 801 of the second board unit 800 by means of an adhesive.

In an example, the first dummy members 28-1 to 28-4 may not be conductively connected to the plurality of elastic members R1 to Rn. In an example, the first dummy members 28-1 to 28-4 may be connected to the ground GND or the power source.

The first dummy members 28-1 to 28-4 may be provided in plural (e.g. four), but the disclosure is not limited thereto. In another embodiment, the number of first dummy members may be one or greater.

In an example, the plurality of elastic members R1 to Rn may be disposed on the corners of the lower surface of the first region 801 of the second board unit 800.

The dummy members may include a connection dummy 29 interconnecting the plurality of dummy members 28-1 to 28-4. The connection dummy 29 may include at least one region 29A having a larger width than the remaining region thereof. In another embodiment, the plurality of dummy members may be separated from each other, rather than being connected to each other.

The dummy members may further include one or more second dummy members 27-1 and 27-2, which are disposed on the second surface 32B of the second circuit board 260 of the first board unit 305.

In an example, the dummy members may include a 2-1$^{st}$ dummy member 27-1, which is disposed adjacent to the first side of the second surface 32B of the second circuit board 260, and a 2-2$^{nd}$ dummy member 27-2, which is disposed adjacent to the second side of the second surface 32B of the second circuit board 260. The first side and the second side of the second surface 32B may face each other or may be located opposite each other.

During a process of coupling the plurality of elastic members R1 to Rn, the second board unit 800, and the second circuit board 260 to each other, at least one of the first dummy members 28-1 to 28-4, the connection dummy 29, or the second dummy members 27-1 and 27-2 may be in a state of being coupled to the plurality of elastic members R1 to Rn. The two elements may be separated from each other when the coupling process is completed.

Since the first dummy members 28-1 to 28-4, the connection dummy 29, and the second dummy members 27-1 and 27-2 serve to reinforce the rigidity of the second elastic member 320 during the above coupling process, these elements may alternatively be referred to as "reinforcing members" or "reinforcing patterns."

In addition, the first dummy members 28-1 to 28-4, the connection dummy 29, and the second dummy members 27-1 and 27-2 may also serve to guide assembly positions of the plurality of elastic members R1 to Rn during the above coupling process.

The image sensor unit 350 may further include a filter 610. In addition, the image sensor unit 350 may further include a filter holder 600, in which the filter 610 is disposed, seated, or accommodated. The filter holder 600 may alternatively be referred to as a "sensor base."

The filter 610 may serve to block introduction of light within a specific frequency band, among the light that has passed through the lens barrel 400, into the image sensor 810.

The filter 610 may be, for example, an infrared cut filter, but the disclosure is not limited thereto. In an example, the filter 610 may be disposed parallel to the xy-plane, which is perpendicular to the optical axis OA.

The filter 610 may be disposed below the lens module 400. In an example, the filter holder 600 may be disposed below the AF moving unit 100. In an example, the filter holder 600 may be disposed on the third circuit board 270.

The filter holder 600 may be coupled to one region of the first surface 33A of the third circuit board 270 around the image sensor 810, and may be exposed through the bore 800A in the second board unit 800. In an example, the filter holder 600 may be visible through the bore 800A in the second board unit 800.

In an example, the filter holder 600 may be coupled to a region around a seating region of the first surface 33A of the third circuit board 270, on which the image sensor 810 is disposed.

Referring to FIG. 11, the filter holder 600 may have a bore 61A formed in a portion thereof, on which the filter 610 is mounted or disposed, in order to allow the light passing through the filter 610 to be introduced into the image sensor 810. The bore 61A in the filter holder 600 may be a through-hole formed through the filter holder 600 in the optical-axis direction. In an example, the bore 61A in the filter holder 600 may be formed through the center of the filter holder 600, and may be disposed so as to correspond to or face the image sensor 810.

The filter holder 600 may include a seating portion 500, which is depressed in the upper surface thereof to allow the filter 610 to be seated therein. The filter 610 may be disposed, seated, or mounted in the seating portion 500. The seating portion 500 may be formed so as to surround the bore 61A. In another embodiment, the seating portion of the filter holder may take the form of a protruding portion protruding from the upper surface of the filter.

The image sensor unit 350 may further include a first adhesive member (not shown), which is disposed between the filter 610 and the seating portion 500, and the filter 610 may be coupled or attached to the filter holder 600 by means of the first adhesive member.

The image sensor unit 350 may further include a second adhesive member (not shown), which is disposed between the filter holder 600 and the third circuit board 270, and the filter holder 600 may be coupled or attached to the third circuit board 270 by means of the second adhesive member. For example, each of the first and second adhesive members may be an epoxy, a thermosetting adhesive, or an ultraviolet-curable adhesive.

The camera device 200 may further include at least one of a cover member 300, a lower base 219, or a bottom cover 239 in order to accommodate the above-described AF moving unit 100 and the image sensor unit 350, to protect the AF moving unit 100 and the image sensor unit 350 from external impact, and to prevent external foreign substances from being introduced thereinto.

The cover member 300 may be formed in the shape of a box having an open lower portion and including an upper plate 301 and side plates 302, and the side plates 302 of the cover member 300 may be coupled to the outer side surface of the housing 140 of the AF moving unit 100. In another embodiment, the lower portions of the side plates of the cover member 300 may be coupled to the base.

The upper plate 301 of the cover member 300 may have a polygonal shape, e.g. a quadrangular shape or an octagonal shape. The cover member 300 may have a bore 303 formed in the upper plate 301 thereof to expose a lens (not shown) coupled to the bobbin 110 to external light.

The lower base 219 may be disposed below the second board unit 800. The lower base 219 may have a shape coinciding with or corresponding to the shape of the cover member 300, the housing 140, or the second board unit 800, for example a quadrangular shape.

In an example, the lower base 219 may include a lower plate 219A disposed below the second board unit 800 and side plates 219B extending from the lower plate 219A toward the housing 140. The lower base 219 may have a bore 219C formed in the lower plate 219A thereof.

The bore 219C in the lower base 219 may be a through-hole formed through the lower base 219 in the optical-axis direction. In another embodiment, the lower base may not have a bore.

In an example, the side plates 219B of the lower base 219 may be coupled to the housing 140 of the AF moving unit 100. In another embodiment, the side plates 219B of the lower base 219 may be coupled to the side plates of the cover member 300.

The lower base 219 may have a bore formed in any one side plate thereof to allow a portion of the first region 801 of the second board unit 800 to pass therethrough.

The bottom cover 239 may be disposed under or below the lower base 219, and may cover the bore 219C in the lower base 219. In another embodiment, the bottom cover 239 may be omitted. The bottom cover 239 may be formed of a thermally conductive material having high thermal conductivity. The bottom cover 239 may be in contact with the lower surface of the second board unit 800, and may serve to dissipate heat generated from the second board unit 800. In addition, the bottom cover 239 may support the second board unit 800.

At the initial position of the OIS moving unit, the OIS moving unit may be located at a position spaced a predetermined distance from the OIS fixed unit due to the first and second elastic members 310 and 320, and the OIS moving unit may be moved relative to the OIS fixed unit due to expansion or contraction of the shape memory alloy member 45.

In an example, expansion and contraction of the first to fourth members 45A to 45D of the shape memory alloy member 45 may be controlled in response to the first to fourth driving signals, and the image sensor 810 may be shifted or tilted in a direction perpendicular to the optical axis OA, or may be rotated about the optical axis.

For example, the optical-axis direction may be a direction perpendicular to one surface of the image sensor 810. For example, one surface of the image sensor 810 may be the upper surface of the image sensor 810. Alternatively, one surface of the image sensor 810 may be a surface that corresponds to or faces the lower surface of the lens module 400 or the filter 610. For example, one surface of the image sensor 810 may be an active area.

The initial position of the OIS moving unit may be the original position of the OIS moving unit (e.g. the first board unit 305) in the state in which no driving signal is applied to the shape memory alloy member 45 or the position at which the OIS moving unit is located as the result of the first and second elastic members 310 and 320 being elastically deformed due only to the weight of the OIS moving unit.

Alternatively, for example, the initial position of the OIS moving unit may be the position of the OIS moving unit when the driving force of the shape memory alloy member 45, which is generated by driving signals applied to the shape memory alloy member 45, does not exceed the pressing force of the first and second elastic members 310 and 320 and thus the OIS moving unit is in a stationary state.

The image sensor 810 may be any one of a charge coupled device (CCD), a metal oxide semiconductor (MOS), a CPD image sensor, and a CID image sensor, but the disclosure is not limited thereto.

In another embodiment, the AF moving unit may be omitted, and the image sensor unit 350 and a lens module, which is disposed so as to be secured to the fixed unit of the image sensor unit 350, may be included. In this case, the lens module may not be moved or shifted in the optical-axis direction, and may be stationary in the optical-axis direction. In addition, the lens module may not be moved or shifted in a direction perpendicular to the optical axis, and may be stationary in a direction perpendicular to the optical axis.

As camera technology develops, the resolution of images becomes higher and higher, and thus the size of image sensors is increasing. As the size of image sensors is increasing, the size of a lens module and the size of an actuator for shifting the lens module are also increasing. Therefore, not only the weight of the lens module but also the weights of other actuator components for shifting the lens module increase.

In the embodiment, AF is performed using the AF moving unit 100 (or the first actuator), which realizes a lens shift scheme, and the image sensor unit 350 (or the second actuator), which realizes an image sensor shift scheme using the shape memory alloy member 45, is provided, whereby the reliability of the camera device may be improved.

The embodiment is capable of achieving 5-axis optical image stabilization using a sensor shift scheme. For example, 5-axis optical image stabilization may include 2-axis angular optical image stabilization (e.g. pitch and yaw), 2-axis shifting optical image stabilization (e.g. x-axis shift and y-axis shift), and 1-axis rotational optical image stabilization (e.g. roll).

In order to realize OIS feedback operation, the controller 830 may include a resistance measurement unit configured to measure the resistance value of the shape memory alloy member 45. In an example, the controller 830 may supply a driving signal having a driving frequency of several tens of kHz to each of the members 45A to 45D of the shape memory alloy member 45, may measure the current value flowing through each of the members 45A to 45D in real time, and may measure the resistance value of each of the members 45A to 45D using the measured current value.

The controller 830 may store a displacement value of the OIS moving unit corresponding to the resistance value of each of the members 45A to 45D of the shape memory alloy member 45, and may detect the current displacement of the OIS moving unit corresponding to the real-time measured resistance value of each of the members 45A to 45D of the shape memory alloy member 45.

Figure 24:
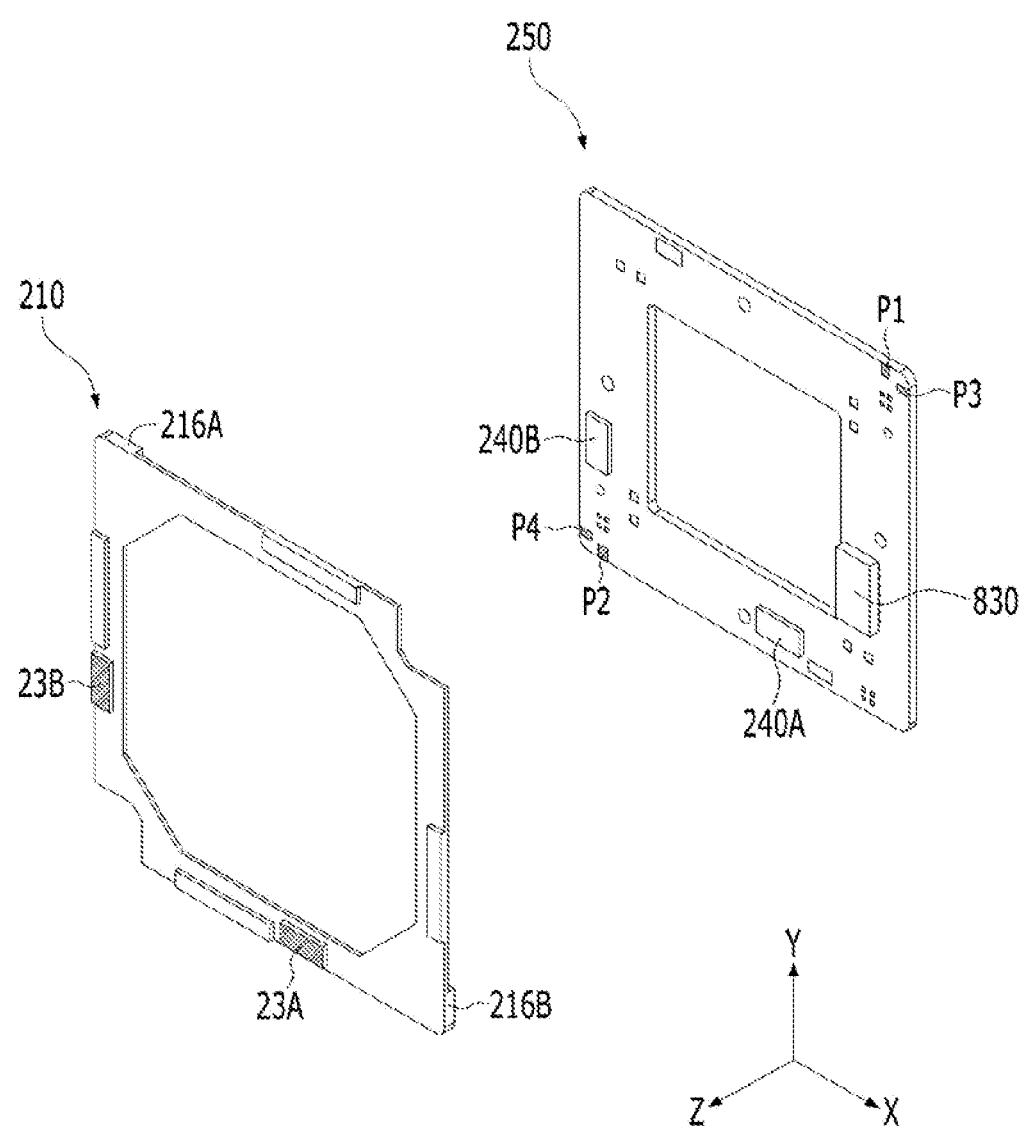
FIG. 24 shows a sensing magnet and an OIS position sensor according to an embodiment.

FIG. 24 shows a sensing magnet and an OIS position sensor for implementing OIS feedback operation according to the embodiment.

Referring to FIG. 24, the camera device 200 may include a sensing magnet disposed on the fixed unit and an OIS position sensor disposed on the moving unit. In another embodiment, the sensing magnet may be disposed on the moving unit, and the OIS position sensor may be disposed on the fixed unit.

In an example, the sensing magnet may be disposed on the base 210. In an example, the sensing magnet may include a first sensing magnet 23A and a second sensing magnet 23B. In an example, the first and second sensing magnets may respectively be disposed on two sides of the base 210 that are perpendicular to each other.

In an example, the first sensing magnet 23A may be disposed on a first side between the first corner and the fourth corner of the base 210, and the second sensing magnet 23B may be disposed on a second side between the fourth corner and the second corner of the base 210. In an example, the first and second sensing magnets 23A and 23B may be disposed on the upper surface or the lower surface of the base 210.

The OIS position sensor may include first and second sensors 240A and 240B disposed on the first board unit 305, e.g. the first circuit board 250. Each of the first and second sensors 240A and 240B may be implemented as a Hall sensor alone or a driver IC including a Hall sensor, and the description of the AF position sensor 170 may be applied thereto.

The first sensor 240A may correspond to, face, or overlap the first sensing magnet 23A in the optical-axis direction, and the second sensor 240B may correspond to, face, or overlap the second sensing magnet 23B in the optical-axis direction.

In an example, the first sensor 240A may detect the intensity of the magnetic field of the first sensing magnet 23A, may output a first sensing signal based on the result of detection, and may detect the displacement of the OIS moving unit in the second direction (e.g. the X-axis direction) using the same.

In an example, the second sensor 240B may detect the intensity of the magnetic field of the second sensing magnet 23B, may output a second sensing signal based on the result of detection, and may detect the displacement of the OIS moving unit in the third direction (e.g. the Y-axis direction) using the same.

In another embodiment, the sensing magnet may be disposed on the first board unit 305, and the OIS position sensor may be disposed on the base 210.

Although not shown in FIG. 24, in still another embodiment, a third sensing magnet disposed on the fixed unit (e.g. the base 210) and a third sensor disposed on the first board unit 305 (e.g. the first circuit board 250) may be included. The third sensor may be implemented as a Hall sensor alone or a driver IC including a Hall sensor, and the description of the AF position sensor 170 may be applied thereto.

The tilting or rotational angle of the OIS moving unit about the optical axis may be detected using the outputs of the first sensor 240A, the second sensor 240B, and the third sensor. In still another embodiment, for example, the third sensor may be a tunnel magnetoresistance (TMR) sensor.

The controller 830 or 780 may detect the displacement or rotational angle (or tilting angle) of the OIS moving unit using the first sensing signal of the first sensor 240A and the second sensing signal of the second sensor 240B.

In another embodiment, the first and second sensing magnets 23A and 23B may be omitted, and the first sensor 240A may correspond to, face, or overlap any one (e.g. 130-1) of the magnets 130-1 to 130-4 in the optical-axis direction. The first sensor 240A may detect the displacement of the OIS moving unit in the second direction (e.g. the X-axis direction) based on the result of detection of the magnetic field of the magnet (e.g. 130-1). In addition, in the embodiment, the second sensor 240B may correspond to, face, or overlap another one (e.g. 130-2) of the magnets 130-1 to 130-4 in the optical-axis direction. The second sensor 240B may detect the displacement of the OIS moving unit in the third direction (e.g. the Y-axis direction) based on the result of detection of the magnetic field of the other magnet (e.g. 130-2).

In the embodiment in which the position or displacement of the OIS moving unit is detected using the measured resistance value of the shape memory alloy, calibration is performed on the position (or displacement) of the OIS moving unit and the resistance value of the shape memory alloy member. However, because the shape memory alloy contracts or expands when the temperature thereof reaches about 100° C. to 110° C., a large amount of heat may be generated from the shape memory alloy member during OIS operation. The resistance value of the shape memory alloy member may change or vary due to the heat generated therefrom, and an error may occur in the detected resistance value of the shape memory alloy member, which may deteriorate the accuracy or reliability of detection of the position of the OIS moving unit.

In addition, since a driving signal having a driving frequency of several tens of kHz is used, the resistance value of the shape memory alloy may change due to the skin effect, which may cause an error in the detected resistance value of the shape memory alloy.

In addition, in the embodiment in which the position or displacement of the OIS moving unit is detected using the measured resistance value of the shape memory alloy, there is no accurately measured reference temperature. Therefore, it is not possible to determine how much offset occurs in the displacement of the OIS moving unit measured using the detected resistance value, and thus the reliability of the detected displacement of the OIS moving unit may be deteriorated.

The embodiment shown in FIG. 24 may have the following configuration in order to solve the above problems.

In the embodiment, the OIS moving unit may be driven using the shape memory alloy member 45, and the first and second sensors 240A and 240B and the first and second sensing magnets 23A and 23B may be used to detect the displacement or position of the OIS moving unit. Therefore, it is possible to prevent deterioration in the accuracy or reliability of detection of the position of the OIS moving unit due to the above-described error in the resistance value.

Figure 29:
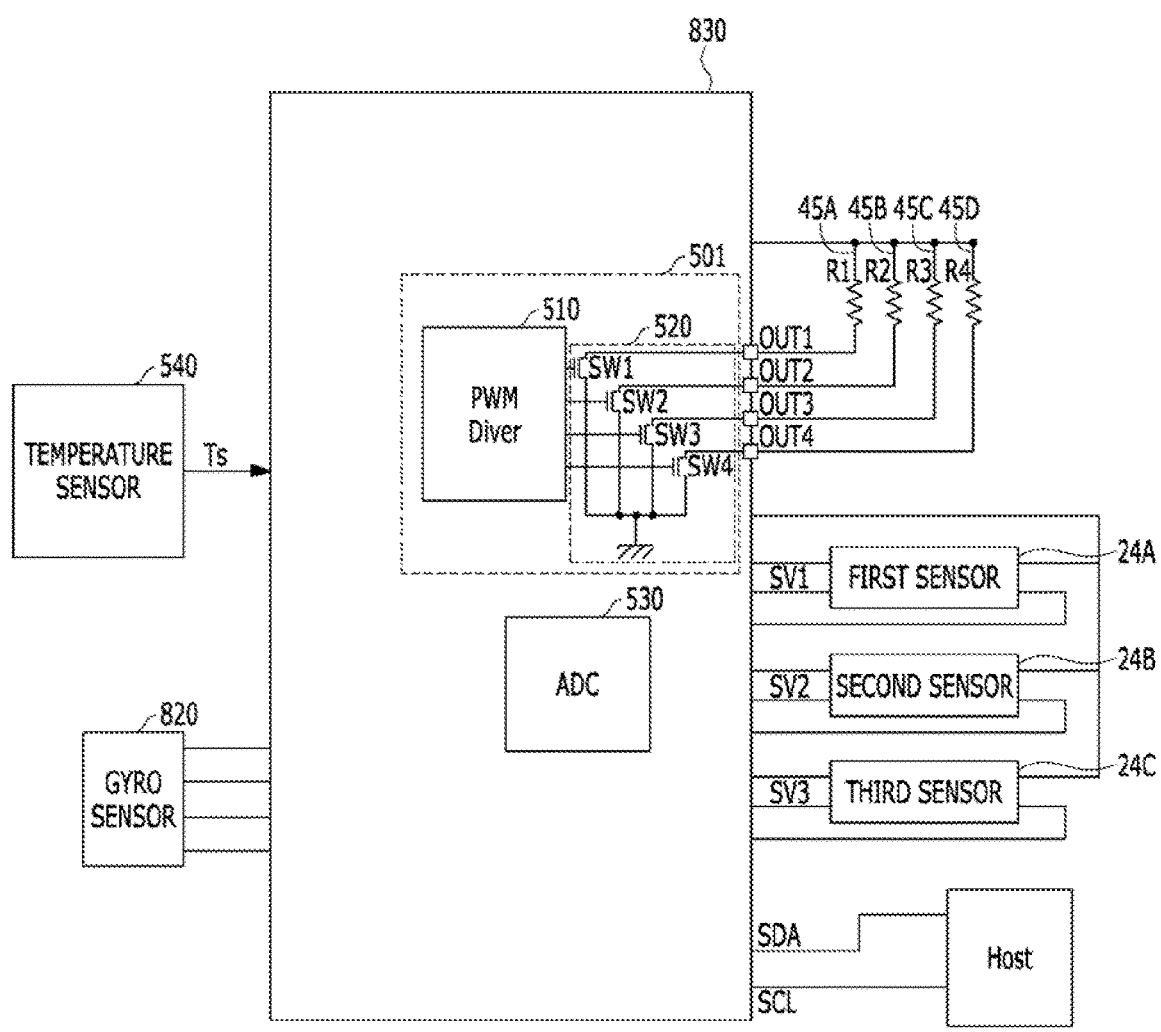
FIG. 29 is a block diagram of a controller and the first to third sensors.

In addition, the camera device 200 according to the embodiment may include a temperature sensor 540 (refer to FIG. 29). The temperature sensor 540 may be included in the controller 830 or 780, but the disclosure is not limited thereto. The temperature sensor may be implemented as a separate element, and may be mounted or disposed on the first board unit 305, e.g. the first circuit board 250.

The temperature sensor 540 may measure ambient temperature (e.g. the temperatures of the first and second sensors 240A and 240B), and may output a temperature detection signal Ts (refer to FIG. 29) corresponding to the result of measurement.

Because the output values of the first and second sensors 240A and 240B are affected by temperature, it is necessary to compensate for the output values of the first and second sensors 240A and 240B according to the ambient temperature in order to achieve accurate and reliable OIS feedback operation.

To this end, for example, the controller 830 or 780 may compensate for the output value (or output-related code value) of each of the first and second sensors 240A and 240B based on the ambient temperature measured by the temperature sensor 540.

In an example, the controller 830 or 780 may have a compensation algorithm for temperature compensation. For example, the controller 830 or 780 may have a memory storing a temperature compensation algorithm. For example, the temperature compensation algorithm may include a quadratic or cubic equation. For example, the temperature compensation algorithm may compensate for at least one of the displacement of the OIS moving unit or the slope and offset of the equation related to the output of each of the first and second sensors 240A and 240B.

Figure 25:
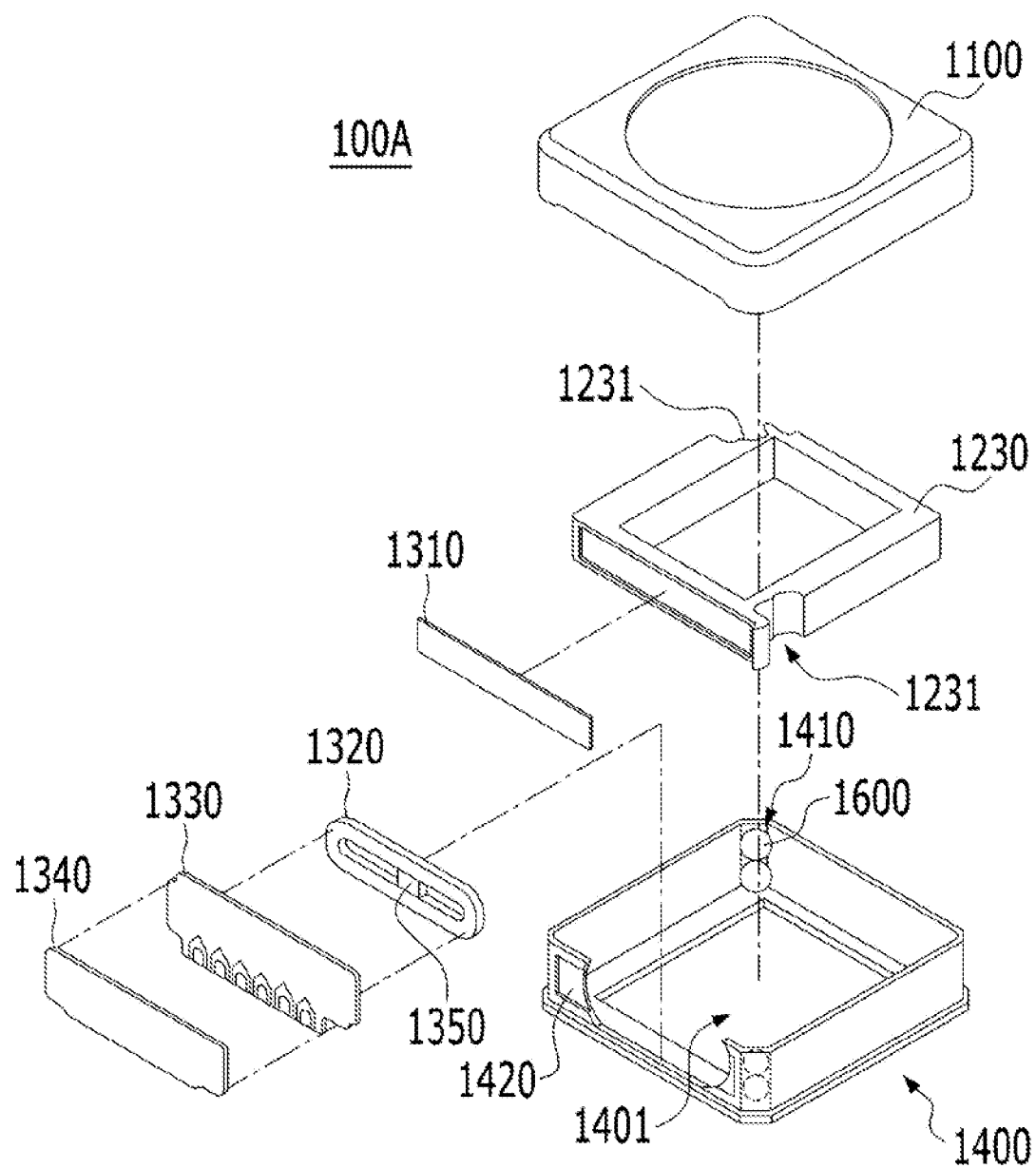
FIG. 25 shows an embodiment of an AF moving unit according to another embodiment.

FIG. 25 shows an embodiment of an AF moving unit according to another embodiment.

The lens moving apparatus 100B shown in FIG. 25 may be a ball-type lens moving apparatus.

Referring to FIG. 25, the lens moving apparatus 100B may include a housing 1400, a bobbin 1230 disposed in the housing 1400 so as to be coupled to the lens module 400, a coil 1320 disposed in the housing 1400, a magnet 1310 disposed on the bobbin 1230, a ball 1600 disposed between the housing 1400 and the bobbin 1230, and a yoke 1340 disposed in the housing 1400. The ball 1600 may alternatively be referred to as a "ball member" or a "ball bearing."

The lens moving apparatus 100B may further include a cover member 1100, which is coupled to the housing 1400 to cover the outer side surface of the housing 1400.

The lens moving apparatus 100B may further include a position sensor 1350, which is disposed in the housing 1400. In addition, the lens moving apparatus 100B may further include a circuit board 1330, which is disposed in the housing 1400, and the position sensor 1350 may be mounted on the circuit board 1330, and may be conductively connected to the circuit board 1330. The description of the AF position sensor 170 may be applied to the position sensor 1350 in FIG. 25.

The magnet 1310 may be disposed on the outer side surface of the bobbin 1230. The coil 1320 may be disposed on one side portion 1420 of the housing 1400 so as to face the magnet 1310. In another embodiment, the magnet may be disposed in the housing, and the coil may be disposed on the bobbin.

The housing 1400 may have therein a bore 1401 formed corresponding to the lens module 400, and the bore 1401 in the housing 1400 may be a through-hole formed through the housing 1400 in the optical-axis direction.

The coil 1320 may be conductively connected to the circuit board 1330.

The ball 1600 may support movement of the bobbin 1230 relative to the housing 1400. At least a portion of the ball 1600 may be in contact with at least a portion of the housing 1400 and at least a portion of the bobbin 1230, and may reduce friction between the housing 1400 and the bobbin 1230.

The yoke 1340 may be disposed on one side portion of the housing 1400, and may face the magnet 1310 in a direction perpendicular to the optical axis. In an example, the yoke 1340 may be disposed on the outer side portion of the circuit board 1330, and the coil 1320 may be disposed between the yoke 1340 and the magnet 1310.

The yoke 1340 may be a material capable of generating attractive force between the yoke and the magnet 1310, e.g. a magnet or a metal, and accordingly, attractive force may act in a direction perpendicular to the optical-axis direction between the yoke 1340 and the magnet 1310. Due to such attractive force, the ball 1600 may be maintained in the state of being in contact with the bobbin 1230 and the housing 1400.

In an example, the housing 1400 may have a first receiving recess 1410 formed therein to receive at least a portion of the ball 1600 or to allow at least a portion of the ball 1600 to be disposed therein.

In addition, in an example, the bobbin 1230 may have a second receiving recess 1231 formed therein to receive at least another portion of the ball 1600 or to allow at least another portion of the ball 1600 to be disposed therein. In an example, referring to FIG. 25, the first receiving recess may be formed in each of two corners of the housing 1400 that face each other or are located opposite each other, and the second receiving recess may be formed in each of two corners of the bobbin 1230 that correspond to the two corners of the housing 1400.

In another embodiment, the first receiving recess may be formed in each of four corners of the housing 1400, and the second receiving recess may be formed in each of four corners of the bobbin 1230 that correspond to the four corners of the housing 1400.

In still another embodiment, the first receiving recess may be formed in each of two corners of the housing 1400 that are adjacent to the side portion 1420 of the housing 1400, on which the coil 1320 and/or the circuit board 1330 is disposed.

In addition, the second receiving recess may be formed in each of two corners of the bobbin 1230 that correspond to the two corners of the housing 1400 that are adjacent to the side portion 1420 of the housing 1400.

In still another embodiment, the first receiving recess may be formed in each of two corners adjacent to the side portion located opposite the side portion 1420 of the housing 1400. The second receiving recess may be formed in each of two corners of the bobbin 1230 that correspond to the two corners adjacent to the side portion located opposite the side portion 1420 of the housing 1400.

In another embodiment, a lens assembly including a liquid lens may be included instead of the AF moving unit 100 in FIG. 2.

In an example, the lens assembly may include a liquid lens unit including a liquid lens. In addition, in an example, the lens assembly may include a liquid lens unit and at least one of a first lens unit or a second lens unit. For example, the first lens unit and the second lens unit may be solid lens units. The first lens unit may be disposed above the liquid lens unit, and the second lens unit may be disposed below the liquid lens unit. In another embodiment, at least one of the first lens unit or the second lens unit may be omitted.

The liquid lens unit may include a holder, a liquid lens disposed in the holder, and at least one terminal conductively connected to the liquid lens and disposed on the holder. The holder may have a hole or a bore formed therein to accommodate the liquid lens, and the liquid lens may be disposed or seated in the hole in the holder.

The liquid lens may include a liquid lens area containing different types of liquids and an electrode area conductively connected to at least one terminal. The liquid lens area may contain a first liquid that is conductive and a second liquid that is non-conductive, and an interface may be formed between the first liquid and the second liquid.

In the liquid lens, the interface formed between the conductive liquid and the non-conductive liquid may be deformed in response to a driving signal (e.g. driving current or driving voltage) or a control signal provided to the at least one terminal, and the focal length of the liquid lens may be adjusted by the deformed interface. Accordingly, the AF function may be performed on the lens assembly, and the focus of the camera device may also be adjusted.

Figure 26:
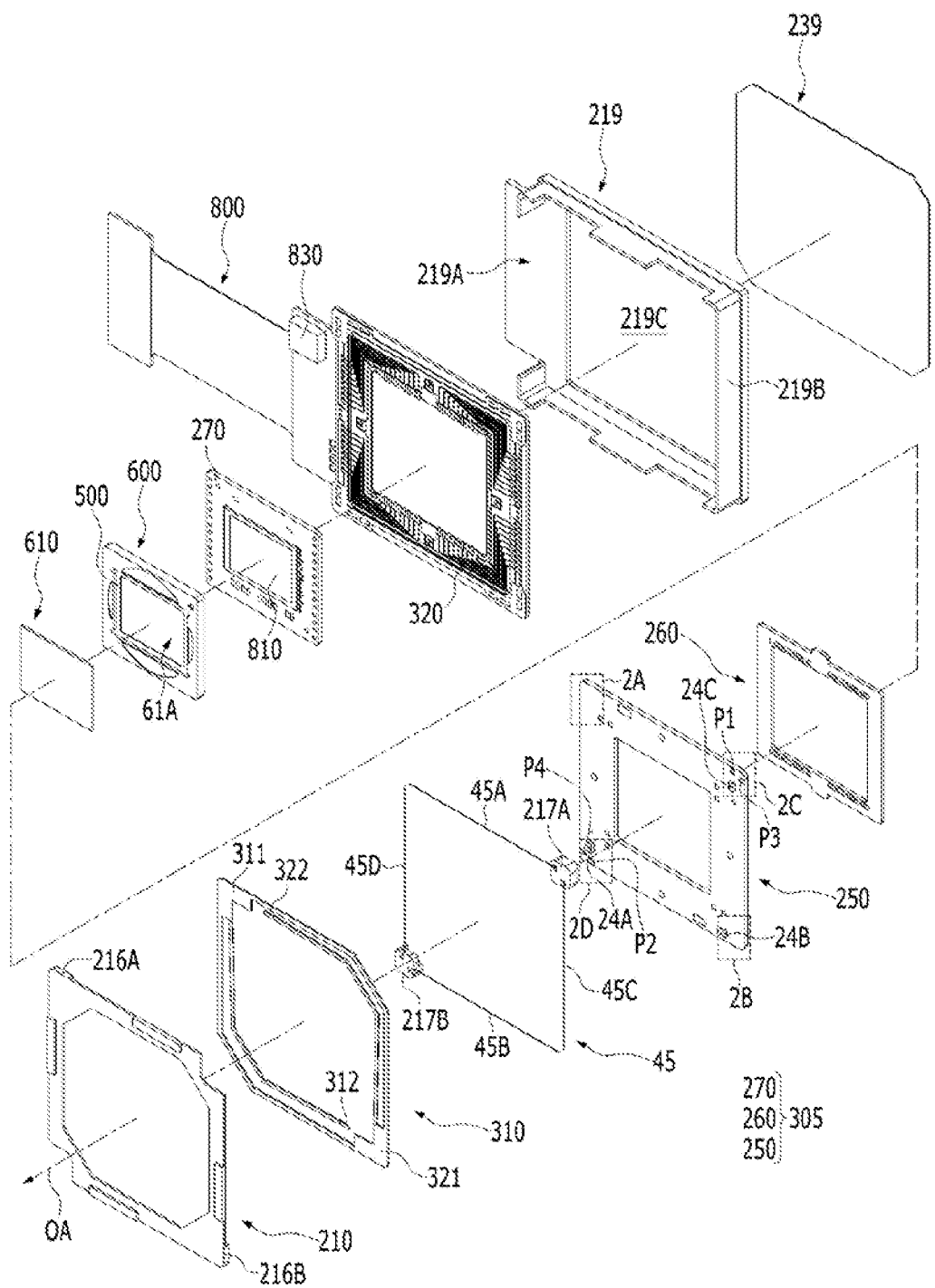
FIG. 26 is an exploded perspective view of an image sensor unit according to another embodiment.
Figure 27:
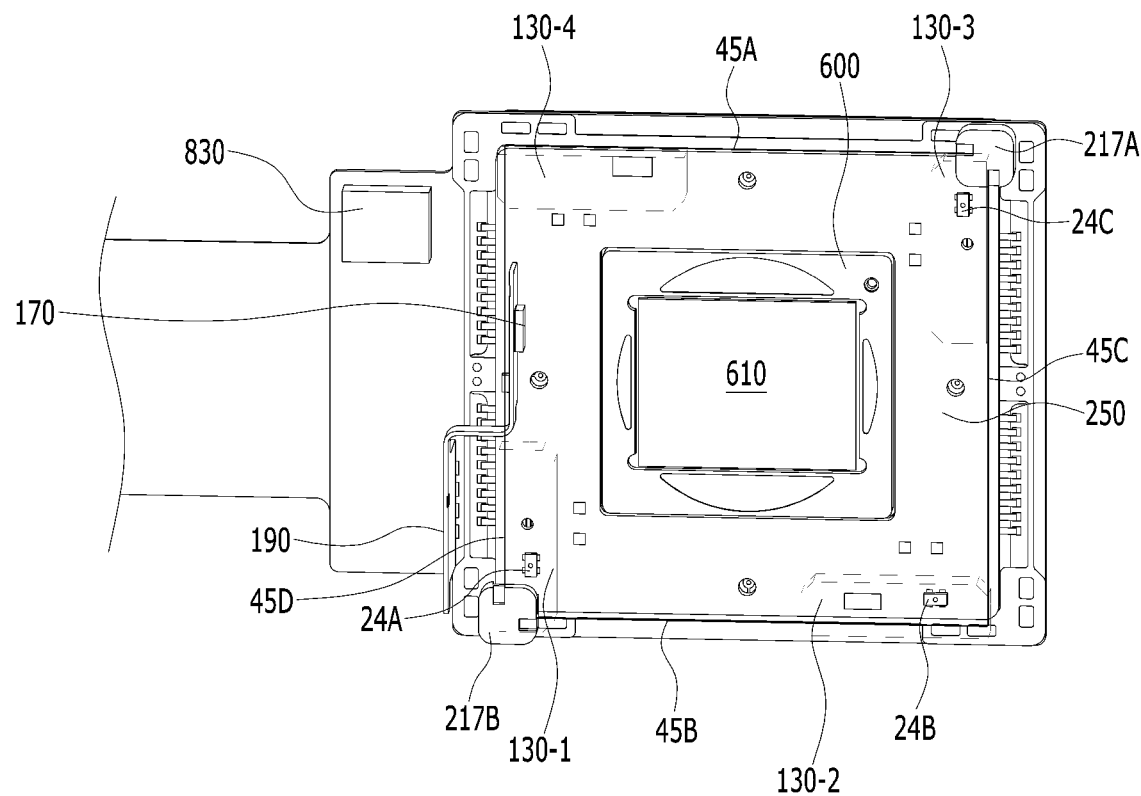
FIG. 27 shows disposition of first to fourth magnets and first to third sensors.

FIG. 26 is an exploded perspective view of an image sensor unit according to another embodiment, and FIG. 27 shows disposition of first to fourth magnets 130-1 to 130-4 and first to third sensors 24A to 24C. The same reference numerals as those in FIG. 11 denote the same components, and the description of the same components will be given in brief or omitted.

The image sensor unit 350 in FIG. 26 may include a first sensor 24A, a second sensor 24B, and a third sensor 24C, which are disposed on the first circuit board 250.

In FIG. 26, the controller 830 shown in FIG. 11 is disposed on the second board unit 800, rather than being disposed on the first circuit board 250. As the size of the driver IC, which is the controller 830, increases, the amount of heat generated increases, which may cause generation of noise in the image sensor 810, and the quality or color of an image of the image sensor is affected by the generated noise. Therefore, it is necessary to space the controller 830 away from the image sensor 810.

In addition, the motion sensor 820 may be omitted from the camera device 200, or may be disposed in another area of the second board unit 800. When the motion sensor 820 is omitted from the camera device, the camera device 200 may receive position information according to movement of the camera device 200 from the motion sensor provided in the optical instrument 200A.

The first sensor 24A may be disposed adjacent to the fourth corner 2D of the first circuit board 250, the second sensor 24B may be disposed adjacent to the second corner 2B of the first circuit board 250, and the third sensor 24C may be disposed adjacent to the third corner 2C of the first circuit board 250.

In addition, in an example, the first sensor 24A may be disposed adjacent to the second support part 217B, the second sensor 24B may be disposed adjacent to the second coupling portion 216B of the base 210, and the third sensor 24C may be disposed adjacent to the first support part 217A.

The first sensor 24A may correspond to, face, or overlap at least a portion of the first magnet 130-1 in the optical-axis direction, the second sensor 24B may correspond to, face, or overlap at least a portion of the second magnet 130-2 in the optical-axis direction, and the third sensor 24C may correspond to, face, or overlap at least a portion of the third magnet 130-3 in the optical-axis direction.

In an example, at the initial position of the OIS moving unit, the center of each of the first to third sensors 24A to 24C may correspond to, face, or overlap the center of a corresponding one of the first to third magnets 130-1 to 130-3 in the optical-axis direction.

In an example, the center of each of the first to third sensors 24A to 24C may be the center of the self-sensing area of each of the first to third sensors 24A to 24C. The center of each of the first to third magnets 130-1 to 130-4 may be the center of a boundary region between an N pole and an S pole thereof.

In an example, the first sensor 24A may detect the intensity of the magnetic field of the first magnet 130-1, and may output a first sensing signal (e.g. first sensing voltage) based on the result of detection. In an example, the second sensor 24B may detect the intensity of the magnetic field of the second magnet 130-2, and may output a second sensing signal (e.g. second sensing voltage) based on the result of detection.

In an example, the third sensor 24C may detect the intensity of the magnetic field of the third magnet 130-3, and may output a third sensing signal (e.g. third sensing voltage) based on the result of detection.

At least one of the first sensing voltage of the first sensor 24A, the second sensing voltage of the second sensor 24B, or the third sensing voltage of the third sensor 24C may be used to acquire, detect, or calculate displacement of the OIS moving unit in the second direction, displacement of the OIS moving unit in the third direction, or a rolling angle (or a rotational angle) of the OIS moving unit.

Figure 28A:
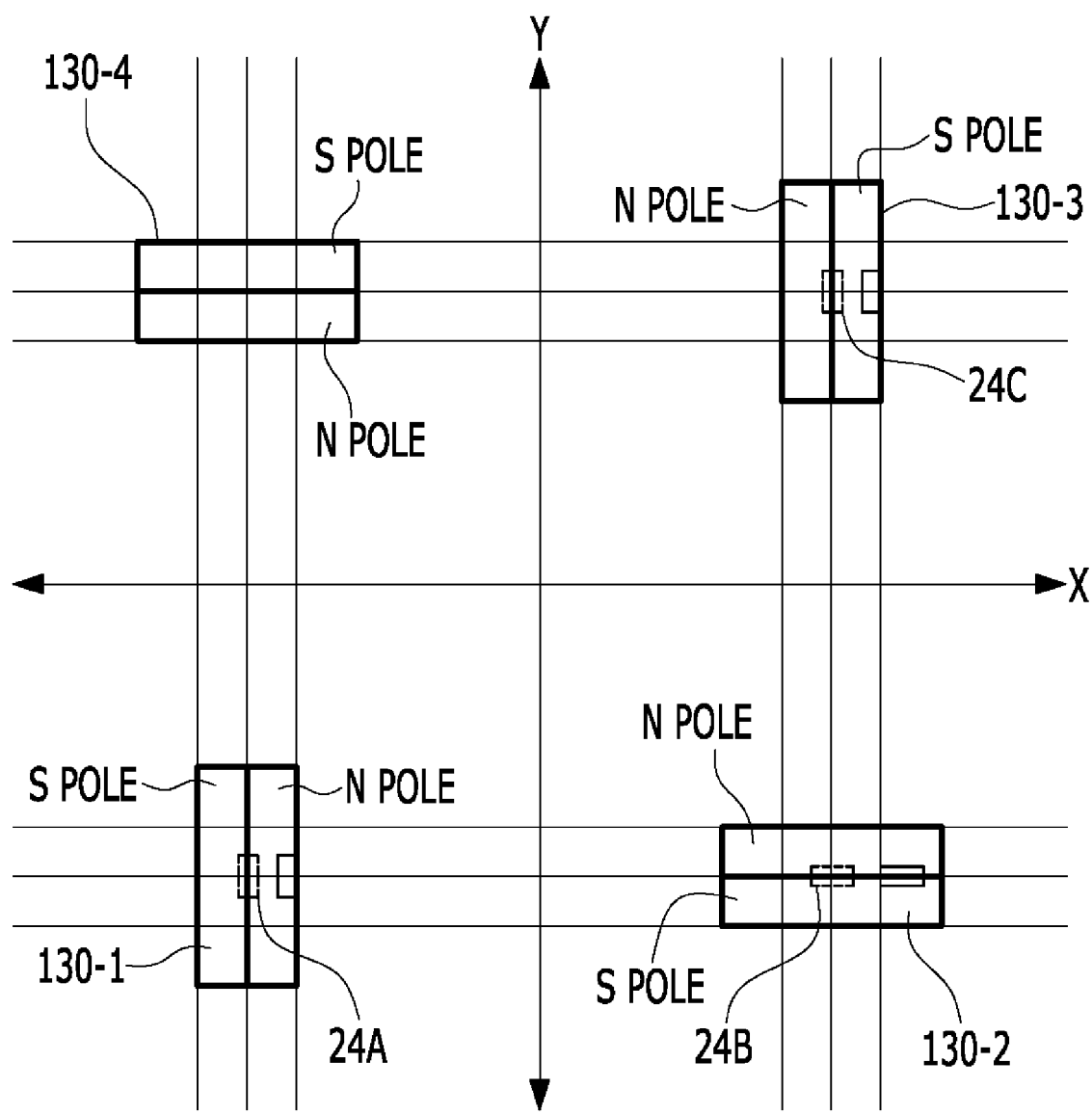
FIG. 28A is a diagram for explaining changes in first to third sensing voltages of the first to third sensors according to movement of an OIS moving unit in a second direction.

FIG. 28A is a diagram for explaining changes in the first to third sensing voltages SV1, SV2, and SV3 of the first to third sensors according to movement of the OIS moving unit in the second direction. FIG. 28A shows a case in which the OIS moving unit moves in the X-axis direction. In an example, the N pole and the S pole of each of the first and third magnets 130-1 and 130-3, which face each other in the first diagonal direction, may be disposed so as to face each other in the second direction, and the N pole and the S pole of each of the second and fourth magnets 130-2 and 130-4, which face each other in the second diagonal direction, which is perpendicular to the first diagonal direction, may be disposed so as to face each other in the third direction.

Each of the first to fourth magnets 130-1 to 130-4 may be fixed, and the first to third sensors 24A to 24C may be moved together by movement of the OIS moving unit.

As the first to third sensors 24A to 24C move in the X-axis direction, the first sensing voltage SV1 of the first sensor 24A and the third sensing voltage SV3 of the third sensor 24C may change. The second sensing voltage SV2 of the second sensor 24B may change little. The small change of the second sensing voltage SV2 may be caused by crosstalk, and the controller 830 or 780 may perform crosstalk compensation to eliminate the crosstalk.

Figure 28B:
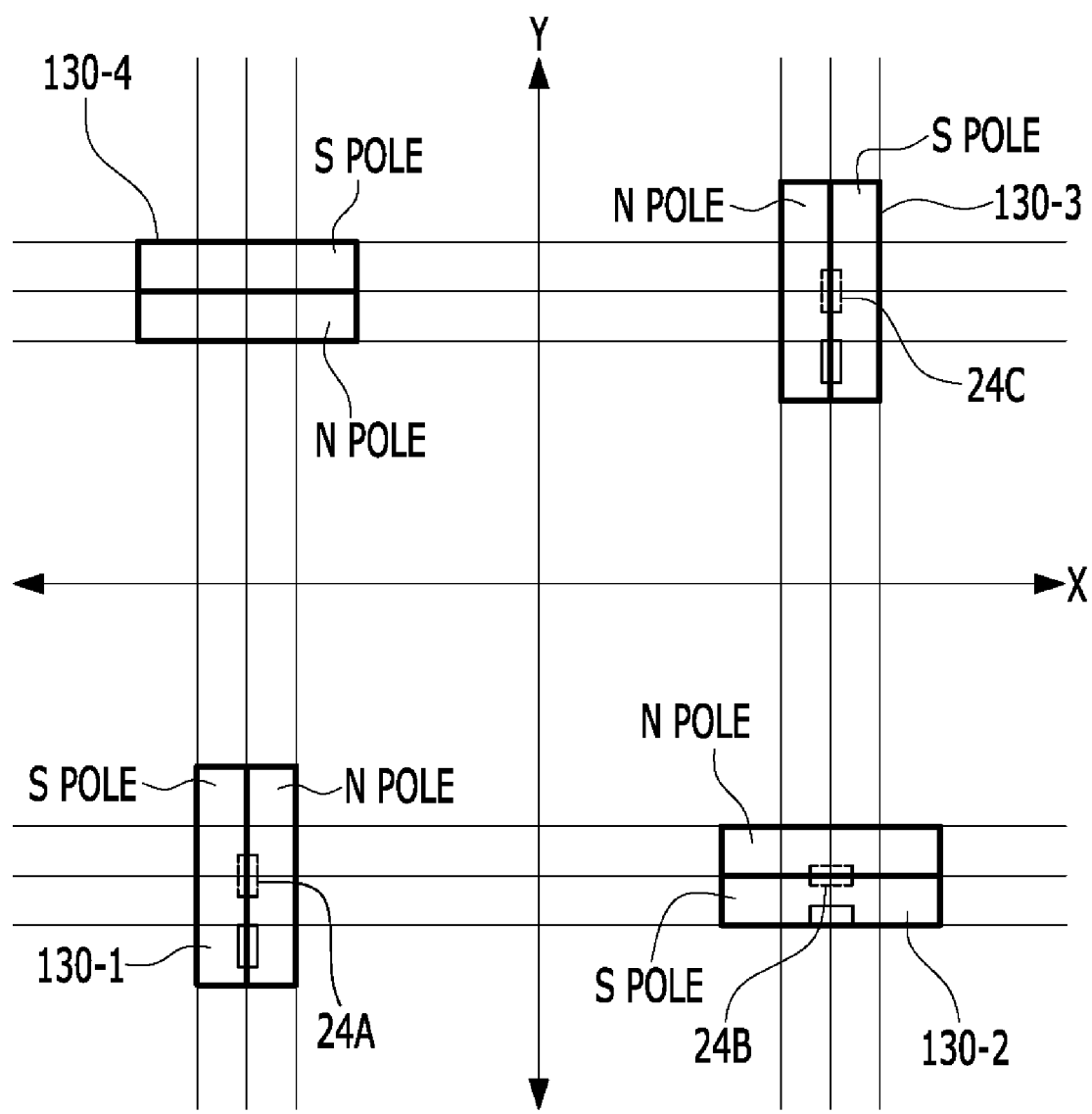
FIG. 28B is a diagram for explaining changes in the first to third sensing voltages of the first to third sensors according to movement of the OIS moving unit in a third direction.

FIG. 28B is a diagram for explaining changes in the first to third sensing voltages SV1, SV2, and SV3 of the first to third sensors according to movement of the OIS moving unit in the third direction.

As the first to third sensors 24A to 24C move in the Y-axis direction, the second sensing voltage SV2 of the second sensor 24B may change. The first sensing voltage SV1 and the third sensing voltage SV3 may change little. The small change of each of the first and third sensing voltage SV1 and SV3 may be caused by crosstalk, and the controller 830 or 780 may perform crosstalk compensation to eliminate the crosstalk.

Figure 28C:
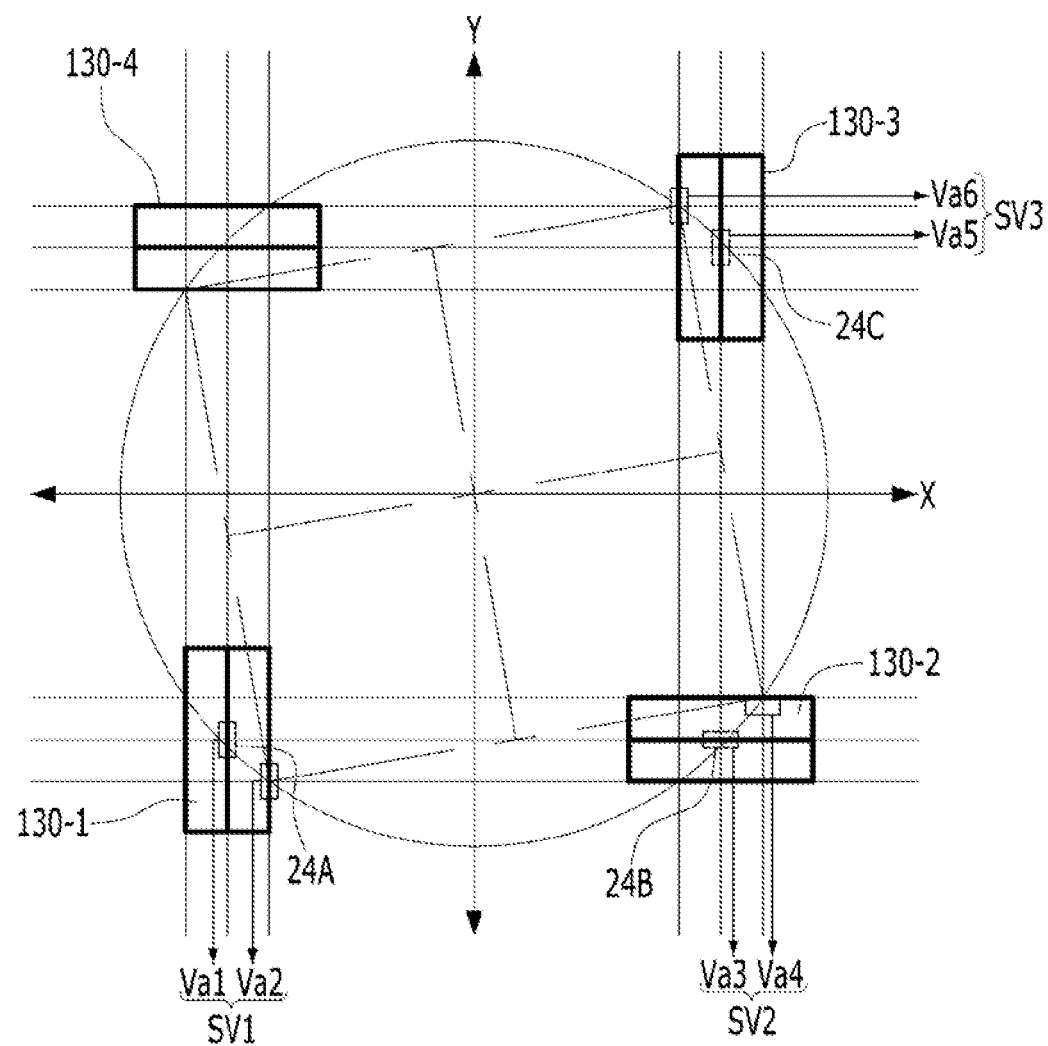
FIG. 28C is a diagram for explaining changes in the first to third sensing voltages of the first to third sensors according to rotation of the OIS moving unit.

FIG. 28C is a diagram for explaining changes in the first to third sensing voltages SV1, SV2, and SV3 of the first to third sensors 24A to 24C according to rotation of the OIS moving unit. FIG. 28C shows a case in which the OIS moving unit rotates or rolls about the optical axis in a plane perpendicular to the optical axis.

Referring to FIG. 28C, each of the first to third sensing voltages SV1 to SV3 may change. For example, the first sensing voltage SV1 may change from a first voltage Va1 to a second voltage Va2, the second sensing voltage SV2 may change from a third voltage Va3 to a fourth voltage Va4, and the third sensing voltage SV3 may change from a fifth voltage Va5 to a sixth voltage Va6.

In an example, the rotational direction and the rotational angle of the OIS moving unit may be detected using the first sensing voltage SV1 and the third sensing voltage SV3.

In an example, the controller 830 may detect the movement amount and/or displacement of the OIS moving unit in the x-axis direction using the first sensing voltage SV1. In addition, in an example, the controller 830 may detect the movement amount and/or displacement of the OIS moving unit in the y-axis direction using the second sensing voltage SV1. In addition, in an example, the controller 830 may detect the rotation amount or rotational angle (or rolling angle or the degree of rotation) of the OIS moving unit using at least two of the first to third sensing voltages.

Alternatively, in an example, the controller 830 may detect the movement amount and/or displacement of the OIS moving unit in the x-axis direction using the first to third sensing voltages SV1 to SV3, may detect the movement amount and/or displacement of the OIS moving unit in the y-axis direction using the first to third sensing voltages SV1 to SV3, and may detect the rotation amount or rotational angle (or rolling angle) of the OIS moving unit using the first and third sensing voltages SV1 and SV3.

Alternatively, in an example, the controller 830 may detect the movement amount and/or displacement of the OIS moving unit in the x-axis direction using a first equation using the first to third sensing voltages SV1 to SV3. For example, the first equation may be an equation including at least one of the first to third sensing voltages SV1 to SV3 as a variable.

In addition, in an example, the controller 830 may detect the movement amount and/or displacement of the OIS moving unit in the Y-axis direction using a second equation using the first to third sensing voltages SV1 to SV3. For example, the second equation may be an equation including at least one of the first to third sensing voltages SV1 to SV3 as a variable.

In addition, in an example, the controller 830 may detect the rotation amount or rotational angle (or rolling angle) of the OIS moving unit using a third equation using the first to third sensing voltages SV1 to SV3. The third equation may be an equation including at least one of the first to third sensing voltages SV1 to SV3 as a variable.

In addition, in an example, the controller 830 may detect the rotation amount or rotational angle (or rolling angle) of the OIS moving unit using a fourth equation using the first and third sensing voltages SV1 and SV3. For example, the fourth equation may be an equation including the first and third sensing voltages SV1 and SV3 as variables.

Each of the first to third sensors 24A to 24C may be a Hall sensor or a driver IC including a Hall sensor. In another embodiment, the first and second sensors 24A and 24B may be Hall sensors, and the third sensor 24C may be a tunnel magnetoresistance (TMR) sensor. In another embodiment, each of the first to third sensors 24A to 24C may be a tunnel magnetoresistance (TMR) sensor. In this case, the TMR sensor may be a TMR linear magnetic field sensor, the output of which according to movement of the OIS moving unit is linear.

The controller 830 (or the controller 780 of the optical instrument 200A) may receive, from the motion sensor 820, position information on the X-axis movement amount, the Y-axis movement amount, and the rotation amount according to movement of the camera device 200 caused by shaking of the user's hand, and may move or rotate the OIS moving unit so as to compensate for the position information in order to realize hand-shake compensation for an optical image stabilization.

FIG. 29 is a block diagram of the controller 830 and the first to third sensors 24A, 24B, and 24C. The controller 830 may perform communication for exchanging data with a host using a clock signal SCL and a data signal SDA, e.g. I2C communication.

Referring to FIG. 29, the controller 830 may include a driving signal generator 510, which generates a driving signal, e.g. a PWM signal, for driving the shape memory alloy member 45, and a switch unit 520, which supplies each of control signals S1 to S4 generated from the driving signal generator 510 to a corresponding one of the first to fourth members 45A to 45D. In an example, the controller 830 may include a driving signal supply unit 501 (refer to FIG. 31), which includes the driving signal generator 510 and the switch unit 520.

In an example, the switch unit 520 may include a plurality of switches SW1 to SW4 corresponding to the control signals S1 to S4. Each of the switches SW1 to SW4 may be a transistor configured to be turned on or off in response to a corresponding one of the control signals S1 to S4.

The switches SW1 to SW4 may be turned on or off in response to the control signals S1 to S4 generated by the driving signal generator 510, current passages may be formed between the first to fourth members 45A to 45D and a power source VSSM, and driving signals I1 to I4 may be provided to the first to fourth members 45A to 45D through the formed current passages.

In this case, each of the control signals S1 to S4 may be a PWM signal in order to reduce current consumption, and the driving frequency of the PWM signal may be 20 kHz or more, which is outside of the audible frequency band.

In another embodiment, the controller 830 may generate direct current as a driving signal to provide the same to each of the first to fourth members 45A to 45D.

Each of the first to third sensors 24A to 24C may include two input terminals and two output terminals. The controller 830 may supply power or driving signals to the two input terminals of each of the first to third sensors 24A to 24C. In an example, among the two input terminals (a (+) input terminal and a (−) input terminal) of each of the first to third sensors 24A to 24C, one input terminal (e.g. the ground terminal or the (−) input terminal) may be connected to the same types of input terminals of the other sensors.

The controller 830 may include an analog-to-digital converter 530, which receives the sensing voltages SV1, SV2, and SV3 output from the two output terminals of each of the first to third sensors 24A to 24C and outputs data values, digital values, or code values corresponding to the result of analog-to-digital conversion of the received sensing voltages SV1, SV2, and SV3.

The controller 830 may detect the displacement (or position) of the OIS moving unit in the X-axis direction, the displacement (or position) of the OIS moving unit in the Y-axis direction, and the rotational angle (rolling angle) of the OIS moving unit using the data values output from the analog-to-digital converter 530.

The temperature sensor 540 may measure ambient temperature (e.g. the temperatures of the first to third sensors 24A, 24B, and 24C), and may output a temperature detection signal Ts corresponding to the result of measurement. For example, the temperature sensor 540 may be a thermistor.

In another embodiment, the temperature sensor 540 may be mounted in the controller 830.

Figure 30A:
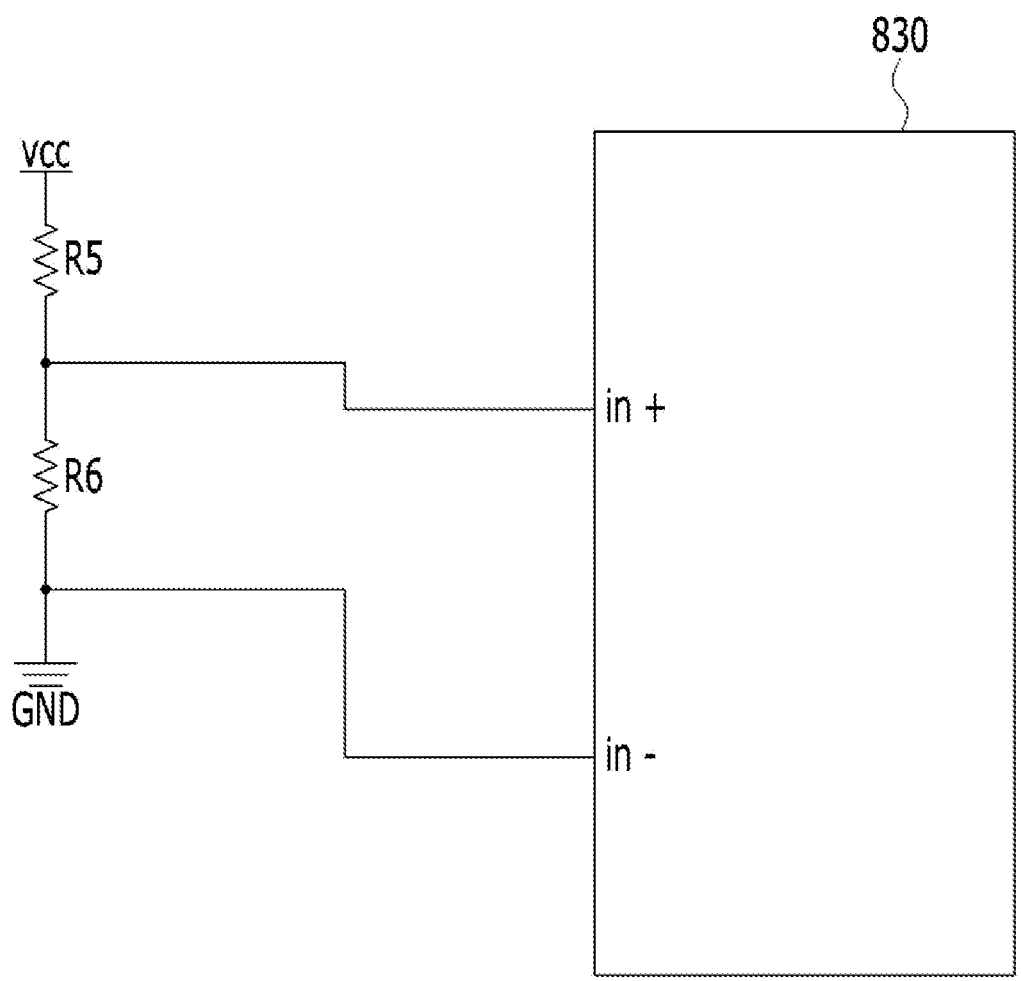
FIG. 30A shows an embodiment of a temperature sensor in FIG. 29.
Figure 30B:
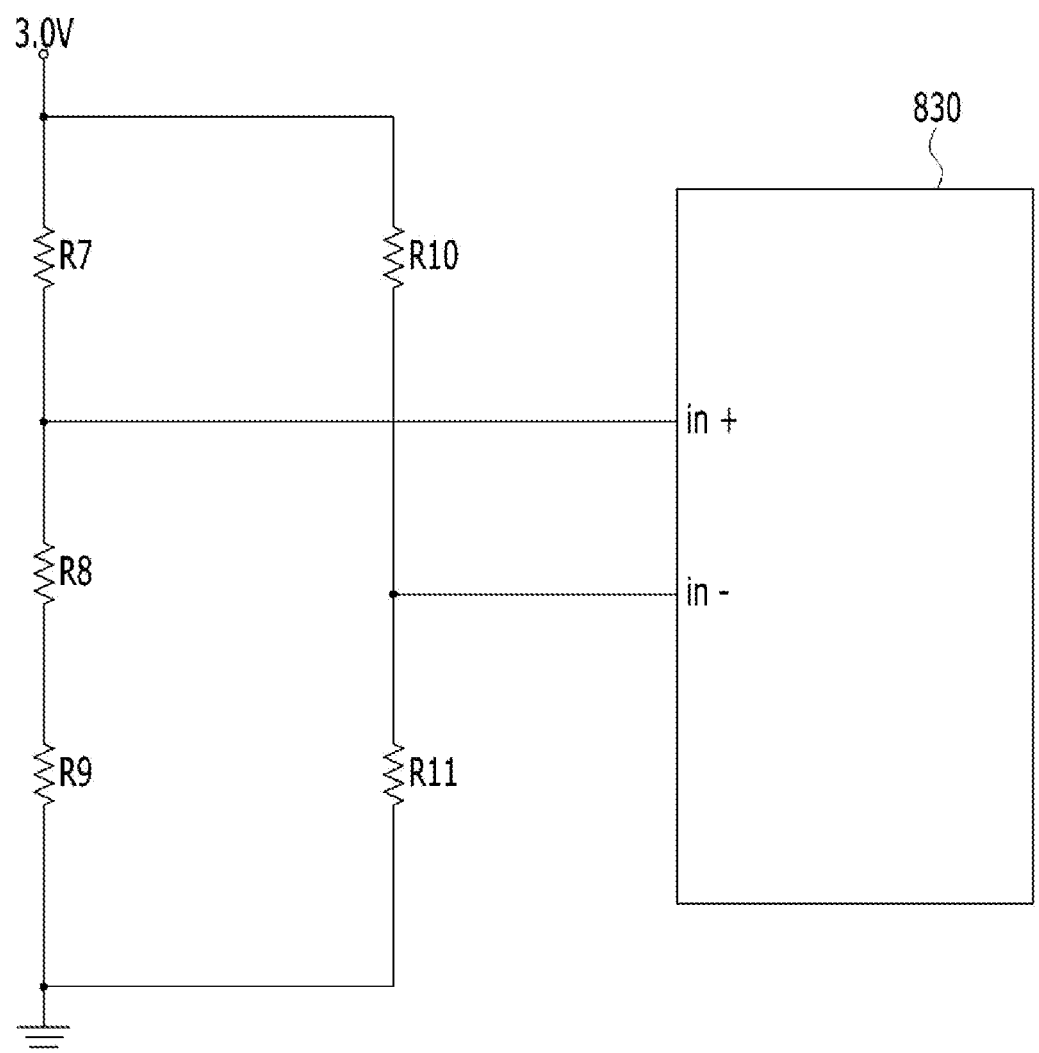
FIG. 30B shows another embodiment of the temperature sensor in FIG. 29.

FIG. 30A shows an embodiment of the temperature sensor 540 in FIG. 29, and FIG. 30B shows another embodiment of the temperature sensor 540 in FIG. 29. The temperature sensor 540 may include at least one resistance element.

In an example, the temperature sensor 540 in FIG. 30A may include two resistance elements R5 and R6, to which driving power VCC and GND are applied and which are connected to each other, and voltage across both ends of any one resistance element R6 may be the temperature detection signal Ts.

The temperature sensor 540 in FIG. 30B may include five resistance elements R7 to R11, to which driving voltage (e.g. 3V) is applied and which are connected to each other, and voltage between a first connection node of any two resistance elements R7 and R8 and a second connection node of the two other resistance elements R10 and R11 may be the temperature detection signal Ts.

The resistance values of the resistors included in the temperature sensor 540 may change according to ambient temperature, and accordingly, the value of the temperature detection signal Ts may change according to the ambient temperature. The memory or the controller 830 or 780 may store an equation or a look-up table related to a mutual relationship between the ambient temperature and the temperature detection signal Ts through calibration.

Because the output values of the first to third sensors 24A, 24B, and 24C are also affected by temperature, it is necessary to compensate for the output values of the first to third sensors 24A, 24B, and 24C according to the ambient temperature in order to achieve accurate and reliable OIS feedback operation.

To this end, for example, the controller 830 or 780 may compensate for the output value (or output-related code value) of each of the first to third sensors 24A, 24B, and 24C using the ambient temperature measured by the temperature sensor 540 and a temperature compensation algorithm or a compensation equation. The temperature compensation algorithm or the compensation equation may be stored in the controller 830 or 780 or the memory.

In another embodiment, the temperature of the camera device 200 may be measured using the resistance value of the shape memory alloy member 45 measured by the resistance measurement unit of the controller 830, and the output value (or output-related code value) of each of the first to third sensors 24A, 24B, and 24C may be compensated using the measured temperature and the temperature compensation algorithm (or compensation equation).

In the embodiment, in order to drive the OIS moving unit using the shape memory alloy member 45 and to detect the displacement or position of the OIS moving unit, the sensing voltages SV1 to SV3 of the first to third sensors 24A to 24C may be used. Therefore, it is possible to prevent deterioration in the accuracy or reliability of detection of the position of the OIS moving unit due to the above-described error in the resistance value of the shape memory alloy member 45. In addition, since the embodiment uses the sensing voltages SV1 to SV3 of the first to third sensors, the algorithm for detecting displacement of the OIS moving unit is simple, and the driver IC for embodying the controller 830 may be reduced in size.

The content described with reference to FIGS. 26 to 30B may be applied to the embodiments in FIGS. 1 to 23.

Figure 31:
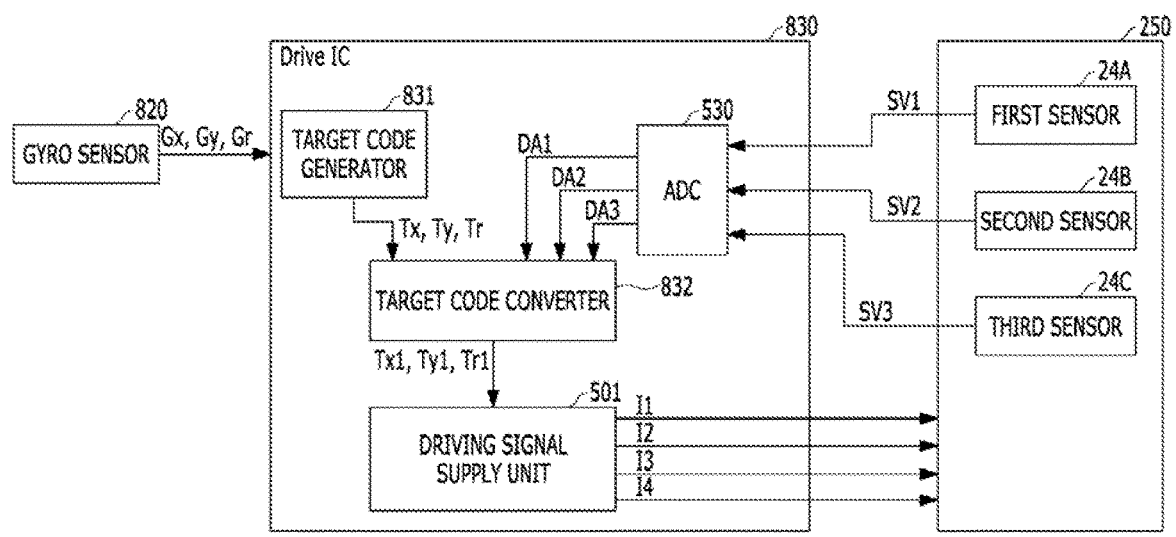
FIG. 31 is a diagram showing the configuration of an embodiment of the controller.

FIG. 31 is a diagram showing the configuration of an embodiment of the controller 830.

Referring to FIG. 31, the camera device 200 may include a fixed unit, a first board unit 305 (e.g. a first circuit board 250) disposed so as to be spaced apart from the fixed unit, an OIS moving unit including an image sensor 810 disposed on the first board unit 305, a shape memory alloy member 45 coupled to the fixed unit and the OIS moving unit and conductively connected to the board unit 305, a position sensing unit including a first sensor 24A, a second sensor 24B, and a third sensor 24C, which are disposed on the first board unit 305, and a controller 830 configured to supply driving signals I1 to I4 to the shape memory alloy member 45 and to move the OIS moving unit in a direction perpendicular to the optical axis or to rotate the OIS moving unit about the optical axis using the shape memory alloy member 45.

The controller 830 may control movement and rotation of the moving unit using the first sensing voltage SV1 of the first sensor 24A, the second sensing voltage SV2 of the second sensor 24B, and the third sensing voltage SV3 of the third sensor 24C.

Each of the first sensor 24A and the third sensor 24C may detect movement of the moving unit in the x-axis direction (or the y-axis direction) in a plane perpendicular to the optical axis. The second sensor 24B may detect movement of the moving unit in the y-axis direction (or the x-axis direction) in a plane perpendicular to the optical axis.

The fixed unit may include a first magnet 130-1 facing the first sensor 24A, a second magnet 130-2 facing the second sensor 24B, and a third magnet 130-3 facing the third sensor 24C in a direction parallel to the optical axis. For example, the magnetization direction of the first magnet 130-1 and the magnetization direction of the third magnet 130-3 may be the same as each other. For example, the magnetization direction of the second magnet 130-2 may be different from the magnetization direction of the first magnet 130-1. For example, the two directions may be perpendicular to each other. The magnetization direction of the second magnet 130-2 may be perpendicular to the magnetization direction of the first magnet 130-1.

For example, each of the first to third sensors 24A to 24C may be a Hall sensor. Alternatively, for example, each of the first and second sensors 24A and 24B may be a Hall sensor, and the third sensor 24C may be a tunnel magnetoresistance (TMR) sensor.

The controller 830 generates an x-axis target code value Tx for the x-axis movement amount, a y-axis target code value Ty for the y-axis movement amount, and a rotation target code value Tr for the rotation amount in order to implement hand-shake compensation for the optical image stabilization upon movement of the camera device 200.

The controller 830 may convert the target code values Tx, Ty, and Tr using the first to third sensing voltages SV1 to SV3, and may generate an x-axis target code value Tx1, a y-axis target code value Ty1, and a rotation target code value Tr1 corresponding to the result of conversion.

For example, the controller 830 may convert the rotation target code value Tr using the first and third sensing voltages SV1 and SV3, and may generate the rotation target code value Tr1 corresponding to the result of conversion.

For example, the controller 830 may convert the x-axis target code value Tx using the first to third sensing voltages SV1, SV2, and SV3, and may generate the x-axis target code value Tx1 corresponding to the result of conversion. For example, the controller may convert the x-axis target code value Tx using the first and third sensing voltages SV1 and SV3, and may generate the x-axis target code value Tx1 corresponding to the result of conversion.

In addition, for example, the controller 830 may convert the y-axis target code value Ty using the first to third sensing voltages SV1, SV2, and SV3, and may generate the y-axis target code value Ty1 corresponding to the result of conversion.

The controller 830 may control the driving signals I1 to I4, which are to be supplied to the shape memory alloy member 45, based on the converted rotation target code value Tr1, the converted x-axis target code value Tx1, and the converted y-axis target code value Ty1.

The controller 830 may include a target code generator 831, an analog-to-digital converter 530, a target code converter 832, and a driving signal supply unit 501.

The target code generator 831 receives, from the motion sensor (e.g. the gyro sensor 820), position information (or movement information) about the x-axis movement amount Gx, the y-axis movement amount Gy, and the rotation amount Gr in response to movement of the camera device 200. The target code generator 831 generates, based on the position information Gx, Gy, and Gr of the camera device 200, the x-axis target code value Tx for the x-axis movement amount, the y-axis target code value Ty for the y-axis movement amount, and the rotation target code value Tr for the rotation amount in order to perform hand-shake compensation for the optical image stabilization upon movement of the camera device 200. For example, the rotation amount may be an extent to which the camera device 200 rotates about the optical axis (e.g. an angle or an angular speed).

The analog-to-digital converter 530 may generate a first data value DA1 corresponding to the first sensing voltage SV1, a second data value DA2 corresponding to the second sensing voltage SV2, and a third data value DA3 corresponding to the third sensing voltage SV3.

The target code converter 832 may convert the x-axis target code value Tx, the y-axis target code value Ty, and the rotation target code value Tr for hand-shake compensation using the first to third data values DA1 to DA3.

For example, the target code converter 832 may convert the rotation target code value Tr using the first data value DA1 and the third data value DA3, and may generate the rotation target code value Tr1 corresponding to the result of conversion.

In addition, for example, the target code converter 832 may convert the x-axis target code value Tx using the first data value DA1, the second data value DA2, and the third data value DA3, and may generate the x-axis target code value Tx1 corresponding to the result of conversion. Alternatively, for example, the target code converter 832 may convert the x-axis target code value Tx using the first data value DA1 and the third data value DA3, and may generate the x-axis target code value Tx1 corresponding to the result of conversion.

The target code converter 832 may convert the y-axis target code value Ty using the first data value DA1, the second data value DA2, and the third data value DA3, and may generate the y-axis target code value Ty1 corresponding to the result of conversion.

The driving signal supply unit 501 may control the driving signals I1 to I4, which are to be supplied to the shape memory alloy member 45, based on the converted rotation target code value Tr1, the converted x-axis target code value Tx1, and the converted y-axis target code value Ty1.

Figure 32:
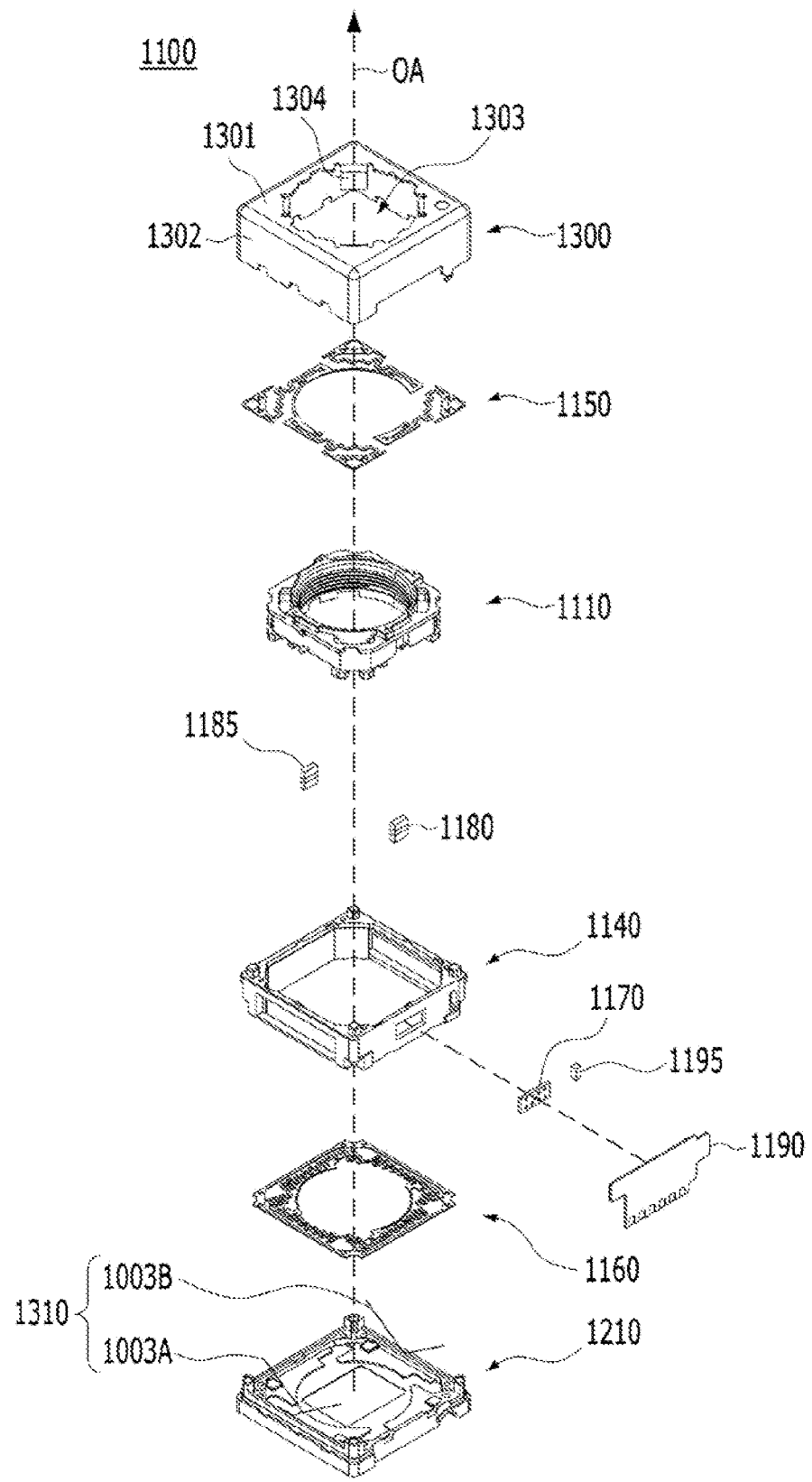
FIG. 32 is an exploded view of a lens moving apparatus according to another embodiment.
Figure 33:
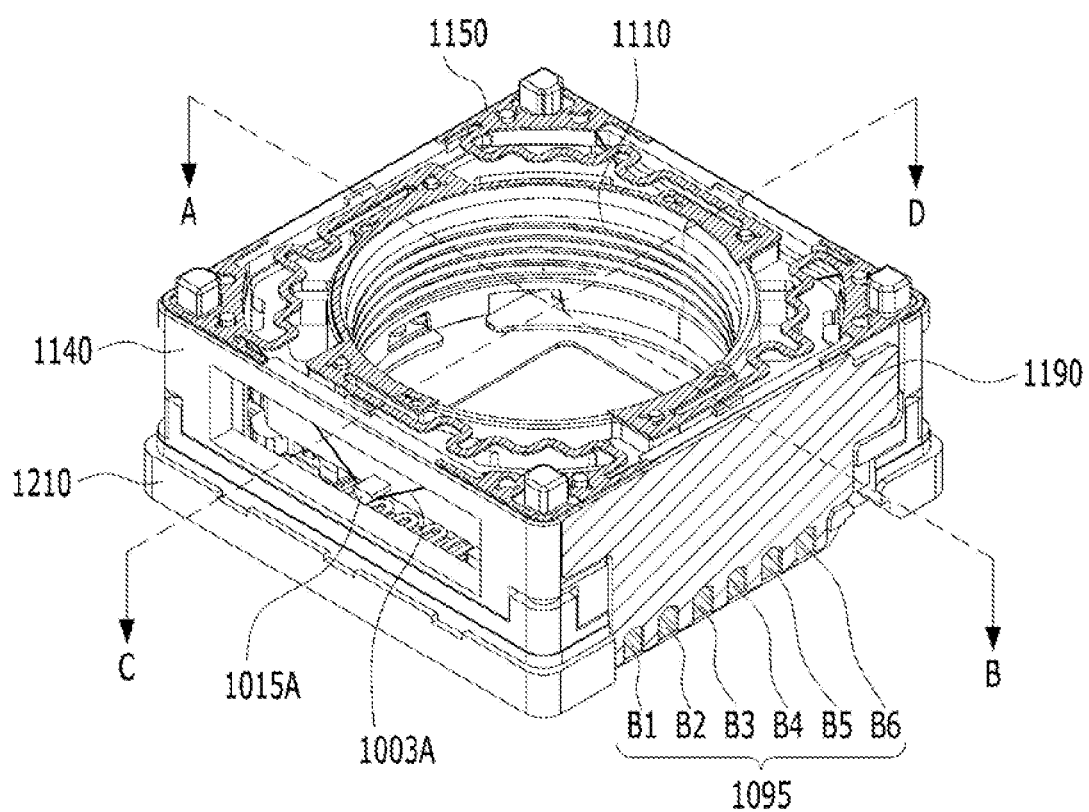
FIG. 33 shows the lens moving apparatus, with a cover member in FIG. 32 removed therefrom.

FIG. 32 is an exploded view of a lens moving apparatus 1100 according to another embodiment, and FIG. 33 shows the lens moving apparatus 1100, with a cover member 1300 in FIG. 32 removed therefrom.

Referring to FIGS. 32 and 33, the lens moving apparatus 1100 may include a bobbin 1110, a housing 1140, an upper elastic member 1150, and a shape memory alloy member 1310.

In addition, the lens moving apparatus 1100 may include a sensing magnet 1180 and a position sensor 1170 for AF feedback operation.

In addition, the lens moving apparatus 1100 may include a balancing magnet 1185.

In addition, the lens moving apparatus 1100 may further include a circuit board 1190 conductively connected to the position sensor 1170. In addition, the lens moving apparatus 1100 may further include a capacitor 1195 disposed on the circuit board 1190.

In addition, the lens moving apparatus 1100 may further include at least one of a cover member 1300 or a base 1210.

First, the bobbin 1110 will be described.

The bobbin 1110 may be provided for mounting of the lens module 1400, and may be disposed in the housing 1140. The bobbin 1110 may be moved in the optical-axis (OA) direction or the first direction (e.g. the Z-axis direction) by the shape memory alloy member 1310. The bobbin 1110 may alternatively be referred to as a "lens holder" or a holder. The lens module 1400 may include at least one of a lens or a lens barrel.

Figure 34A:
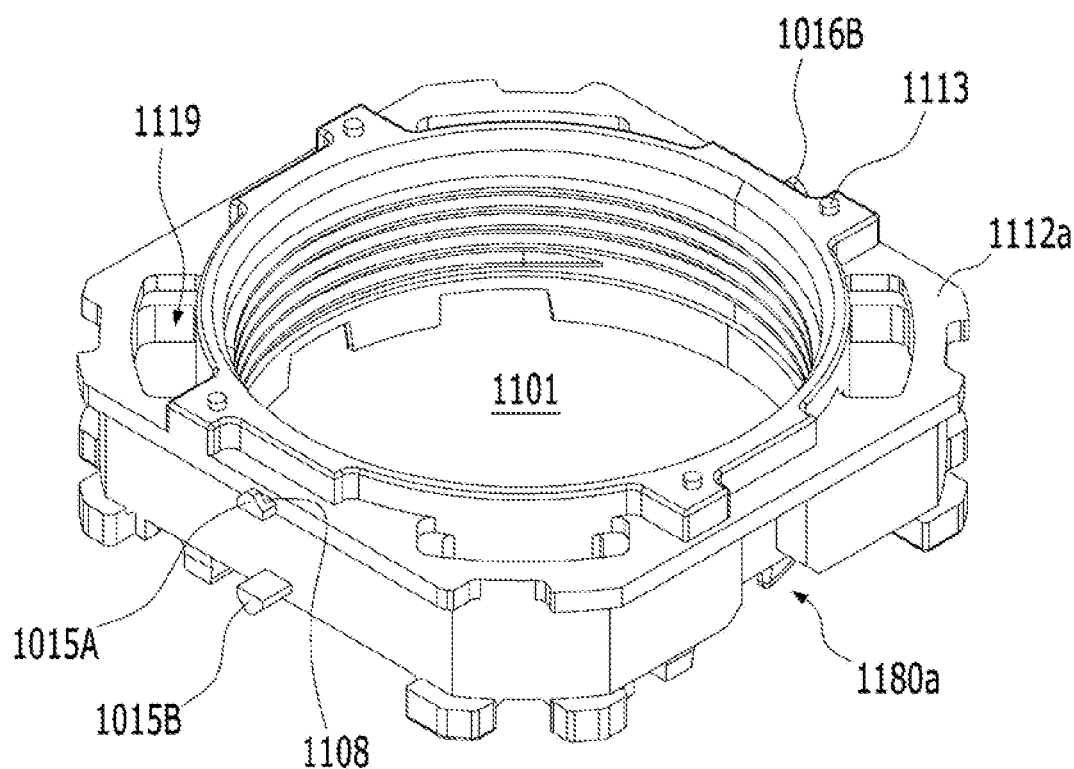
FIG. 34A is an exploded perspective view of a bobbin, a sensing magnet, and a balancing magnet shown in FIG. 32.
Figure 34A:
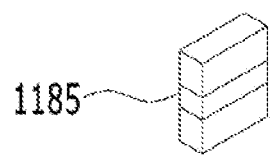
Figure 34A:
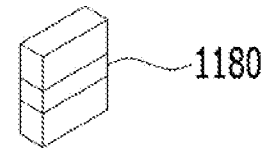
Figure 34B:
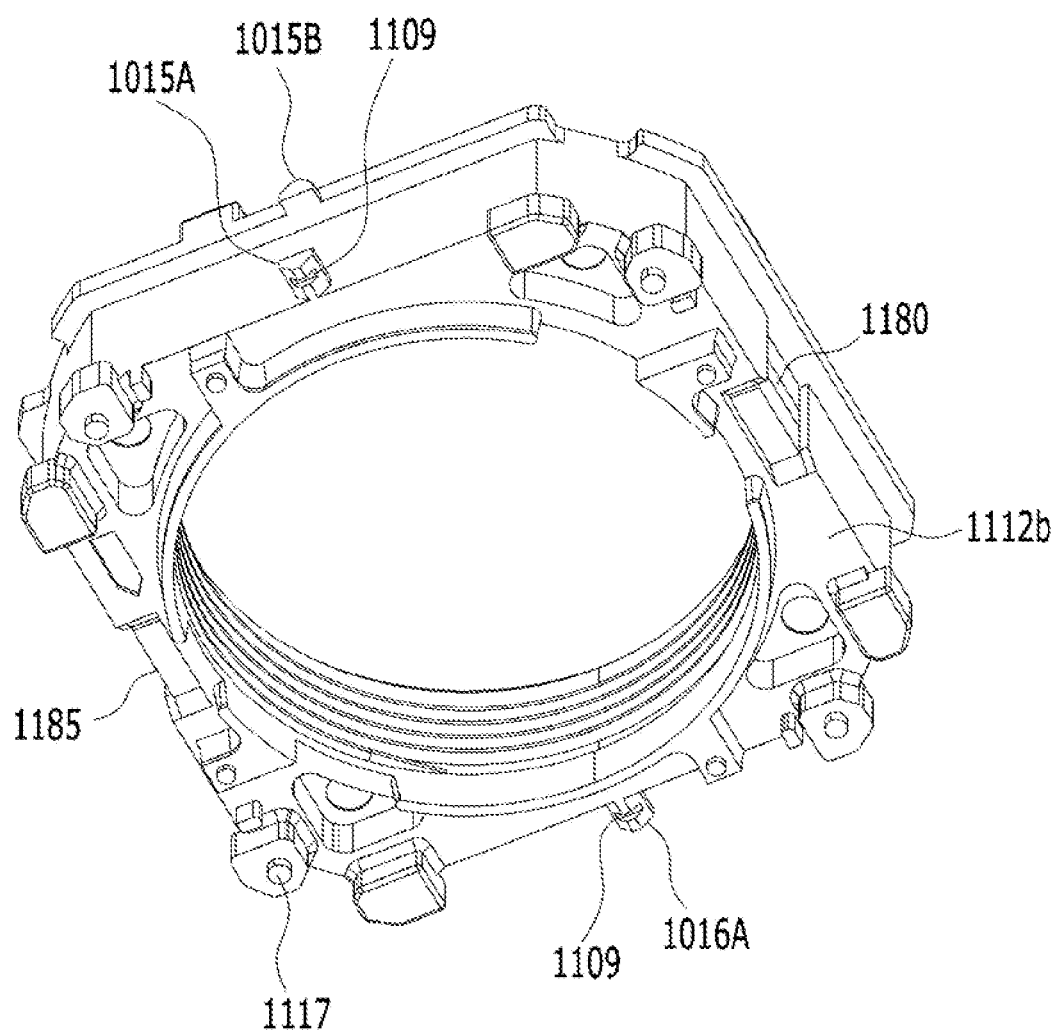
FIG. 34B is a coupled perspective view of the bobbin, the sensing magnet, and the balancing magnet shown in FIG. 34A.

FIG. 34A is an exploded perspective view of the bobbin 1110, the sensing magnet 1180, and the balancing magnet 1185 shown in FIG. 32, and FIG. 34B is a coupled perspective view of the bobbin 1110, the sensing magnet 1180, and the balancing magnet 1185 shown in FIG. 34A.

Referring to FIGS. 34A and 34B, the bobbin 1110 is disposed in the housing 1140. The bobbin 1110 may have a bore 1101 formed therein to allow the lens module 1400 to be mounted thereon. In an example, the bore 1101 in the bobbin 1110 may be a hole or a through-hole formed through the bobbin 1110 in the optical-axis direction, and may have a circular shape, an elliptical shape, or a polygonal shape. However, the disclosure is not limited thereto.

The bobbin 1110 may include a first coupling portion 113, which is disposed on the upper portion, the upper surface, or the upper end thereof to be coupled and secured to a first inner frame 1151 of the upper elastic member 1150, and a second coupling portion 117, which is disposed on the lower portion, the lower surface, or the lower end thereof to be coupled and secured to a second inner frame 1161 of the lower elastic member 1160.

Referring to FIGS. 3A and 3B, each of the first and second coupling portions 113 and 117 has a protrusion shape, but the disclosure is not limited thereto. In another embodiment, each of the first and second coupling portions may have a recessed shape or a flat surface shape.

The bobbin 1110 may include a first escape recess 1112a formed in one region of the upper surface thereof, which corresponds to or is aligned with a first frame connection portion 1153 of the upper elastic member 1150 in the optical-axis direction, and the first escape recess 1112a may have a shape depressed in the upper surface of the bobbin 1110.

In addition, the bobbin 1110 may include a second escape recess 1112b formed in one region of the lower surface thereof, which corresponds to or is aligned with a second frame connection portion 1163 of the lower elastic member 1160 in the optical-axis direction, and the second escape recess 1112b may have a shape depressed in the lower surface of the bobbin 1110.

By virtue of the first escape recess 1112a and the second escape recess 1112b in the bobbin 1110, when the bobbin 1110 moves in the first direction, spatial interference between the bobbin 1110 and each of the first frame connection portion 1153 and the second frame connection portion 1163 may be prevented, and accordingly, the frame connection portions 1153 and 1163 may be easily elastically deformed.

The bobbin 1110 may include a plurality of side portions, side surfaces, or outer side surfaces. In an example, the bobbin 1110 may include side portions and corner portions. In an example, each of the first to fourth corner portions of the bobbin 1110 may be disposed between two adjacent ones of the side portions of the bobbin 1110.

In addition, the bobbin 1110 may have a first recess 1180a formed in any one side portion thereof to allow the sensing magnet 1180 to be seated therein. In an example, the recess 1180a may be formed in any one outer side surface of the bobbin 1110.

In an example, the first recess 1180a may include an opening that is open in the lower surface of the bobbin 1110 in order to facilitate mounting of the sensing magnet 1180 therein. In addition, the bobbin 1110 may have a second recess formed in a side portion thereof, which is located opposite the side portion in which the first recess 1180a is formed, in order to allow the balancing magnet 1185 to be seated therein.

The bobbin 1110 may have a recess 1119 depressed in the upper surface thereof at a position corresponding to, facing, or overlapping a protruding portion 1304 of the cover member 1300. The recess 1119 may include side surfaces and a bottom surface.

In addition, the cover member 1300 may include at least one protruding portion 1304 extending from a region of the upper plate 1301 adjacent to a bore 1303 toward the upper surface of the bobbin 1110 or the recess 1119. The at least one protruding portion 1304 may be disposed in the recess 1119 in the bobbin 1110.

In addition, when AF operation is performed, the protruding portion 1304 of the cover member 1300 may come into contact with the bottom surface of the recess 1119 in the bobbin 1110, and accordingly, may serve as a stopper that restricts movement of the bobbin 1110 in the optical-axis direction (e.g. the upward direction) within a predetermined range.

In another embodiment, the bobbin 1110 may include a first stopper (not shown), which protrudes in the upward direction from the upper surface thereof, and a second stopper (not shown), which protrudes in the downward direction from the lower surface thereof. In this case, when the bobbin 1110 moving in the first direction for autofocus moves beyond a prescribed range due to external impact or the like, the first and second stoppers may prevent the upper surface or the lower surface of the bobbin 1110 from directly colliding with the inner wall of the cover member 1300 or the upper surface of the base 1210.

The bobbin 1110 may include one or more protrusions 15A, 15B, 16A, and 16B, which protrude from the outer side surface thereof in order to support at least a portion of the shape memory alloy member 1310.

Referring to FIGS. 34A and 34B, in an example, the bobbin 1110 may include a first protrusion 1015A protruding from the first outer side surface thereof in the horizontal direction and a second protrusion 1016A protruding from the second outer side surface thereof in the horizontal direction. In an example, the first outer side surface and the second outer side surface of the bobbin 1110 may face each other or may be located opposite each other. The sensing magnet 1180 may be disposed on the third outer side surface of the bobbin 1110, and the balancing magnet 1185 may be disposed on the fourth outer side surface of the bobbin 1110.

Here, the horizontal direction may be a direction perpendicular to the optical axis OA or a direction parallel to a line that is perpendicular to the optical axis OA and extends through the optical axis OA.

In an example, the first protrusion 1015A and the second protrusion 1016A may be disposed closer to the lower surface of the bobbin 1110 than to the upper surface of the bobbin 1110. In an example, the first protrusion 1015A and the second protrusion 1016A may correspond to, face, or overlap each other in the horizontal direction. The reason for this is to enable the shape memory alloy member 1310 to support the bobbin 1110 in a balanced manner.

In addition, each of the first protrusion 1015A and the second protrusion 1016A may include a curved surface that is convex in the downward direction. For example, each of the first protrusion 1015A and the second protrusion 1016A may have a hemispherical shape, a semi-elliptical shape, or a dome shape that is convex in a direction from the upper surface of the bobbin 1110 toward the lower surface of the bobbin 1110. Accordingly, the curved surfaces or the convex surfaces of the first protrusion 1015A and the second protrusion 1016A are in contact with at least a portion of the shape memory alloy member 1310 (1003A and 1003B), whereby friction between the protrusions 1015A and 1016A and the shape memory alloy member 1310 (1003A and 1003B) may be reduced, and accordingly, disconnection of the shape memory alloy member 1310 (1003A and 1003B) may be prevented.

In addition, each of the first protrusion 1015A and the second protrusion 1016A may have a recess 1109 formed in the convex curved surface thereof to allow at least a portion (e.g. an intermediate portion or an intermediate region) of the shape memory alloy member 1310 (1003A and 1003B) to be disposed therein. The recess 1109 may serve to prevent the shape memory alloy member 1310 (1003A and 1003B) from escaping from the protrusions 1015A and 1016A, whereby coupling force between the shape memory alloy member 1310 (1003A and 1003B) and the bobbin 1110 may be increased.

Alternatively, for example, the upper portion of each of the first protrusion 1015A and the second protrusion 1016A may be flat, but the disclosure is not limited thereto.

The AF moving unit (or the AF driving unit) may move in the first direction, e.g. the upward direction (the +Z-axis direction) or the downward direction (the −Z-axis direction) due to expansion and contraction of the shape memory alloy member 1310.

Next, the housing 1140 will be described.

The housing 1140 accommodates therein the bobbin 1110, on which the sensing magnet 1180 is mounted or disposed. The housing 1140 may be disposed on the base 1210, and may be disposed inside the cover member 1300.

Figure 35A:
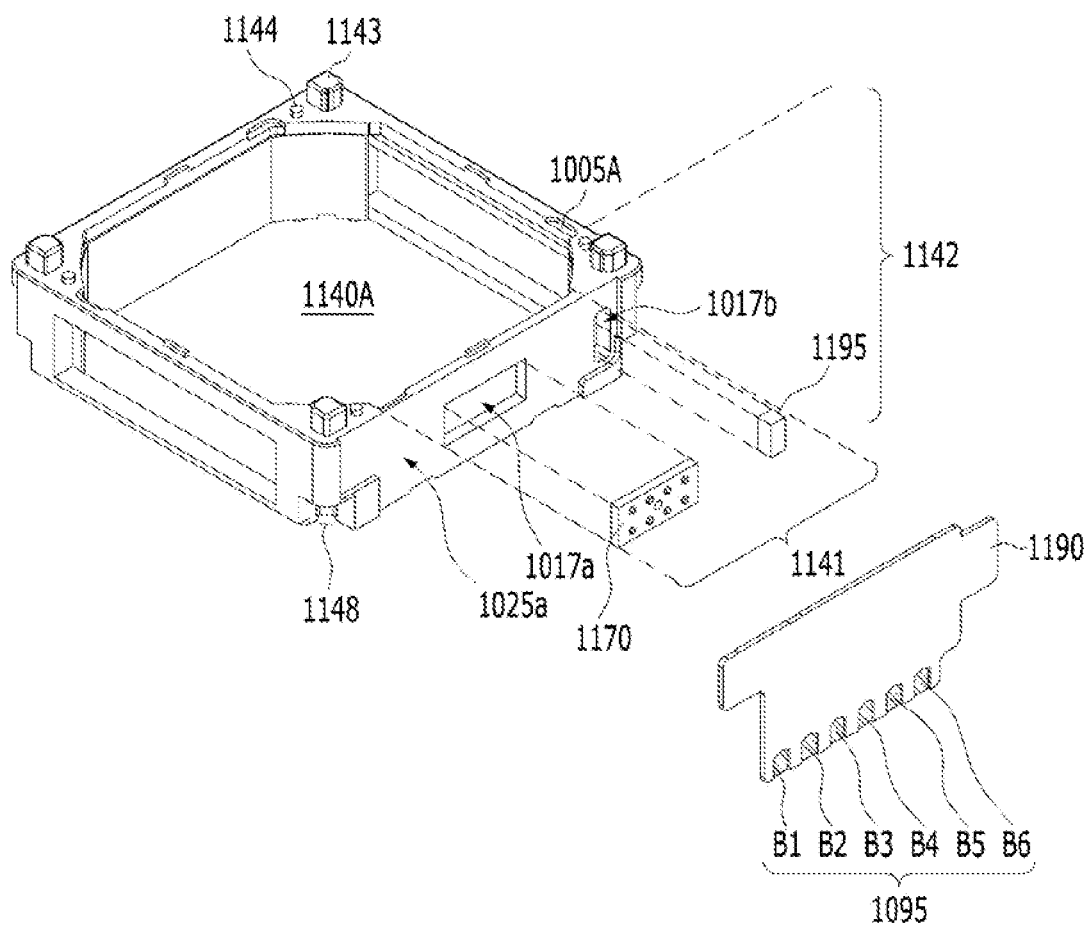
FIG. 35A is a perspective view of a housing, a position sensor, and a capacitor shown in FIG. 32.
Figure 35B:
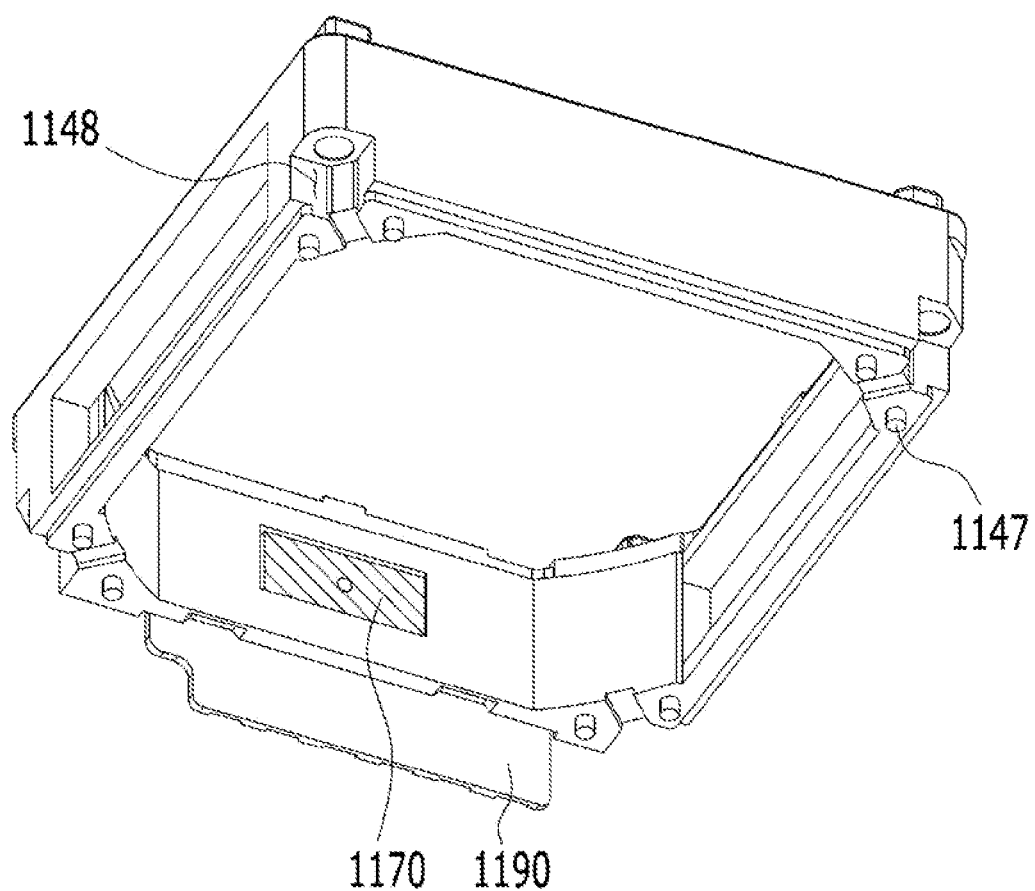
FIG. 35B is a perspective view of a housing to which a circuit board and a position sensor are coupled.
Figure 36:
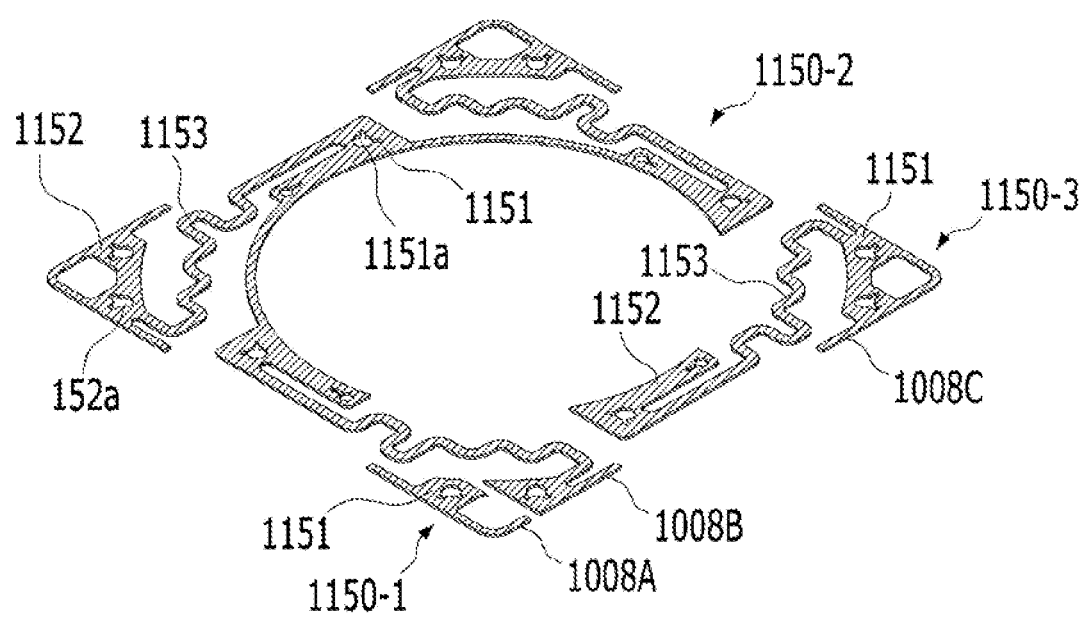
FIG. 36 is a perspective view of the upper elastic member.
Figure 37:
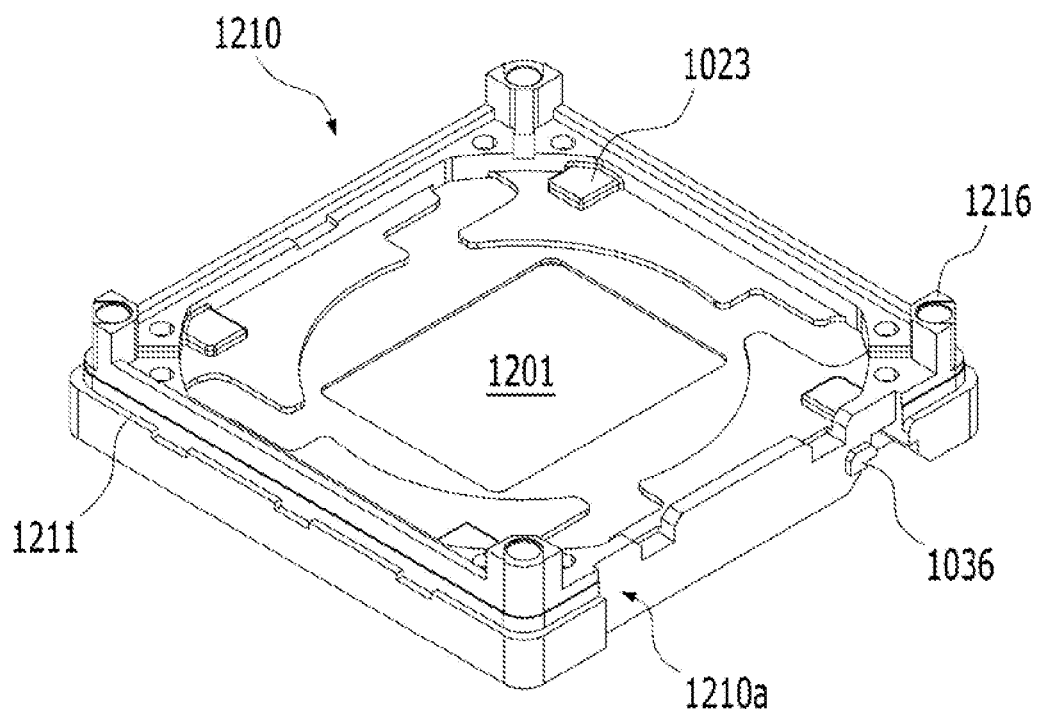
FIG. 37 is a perspective view of the base.
Figure 38:
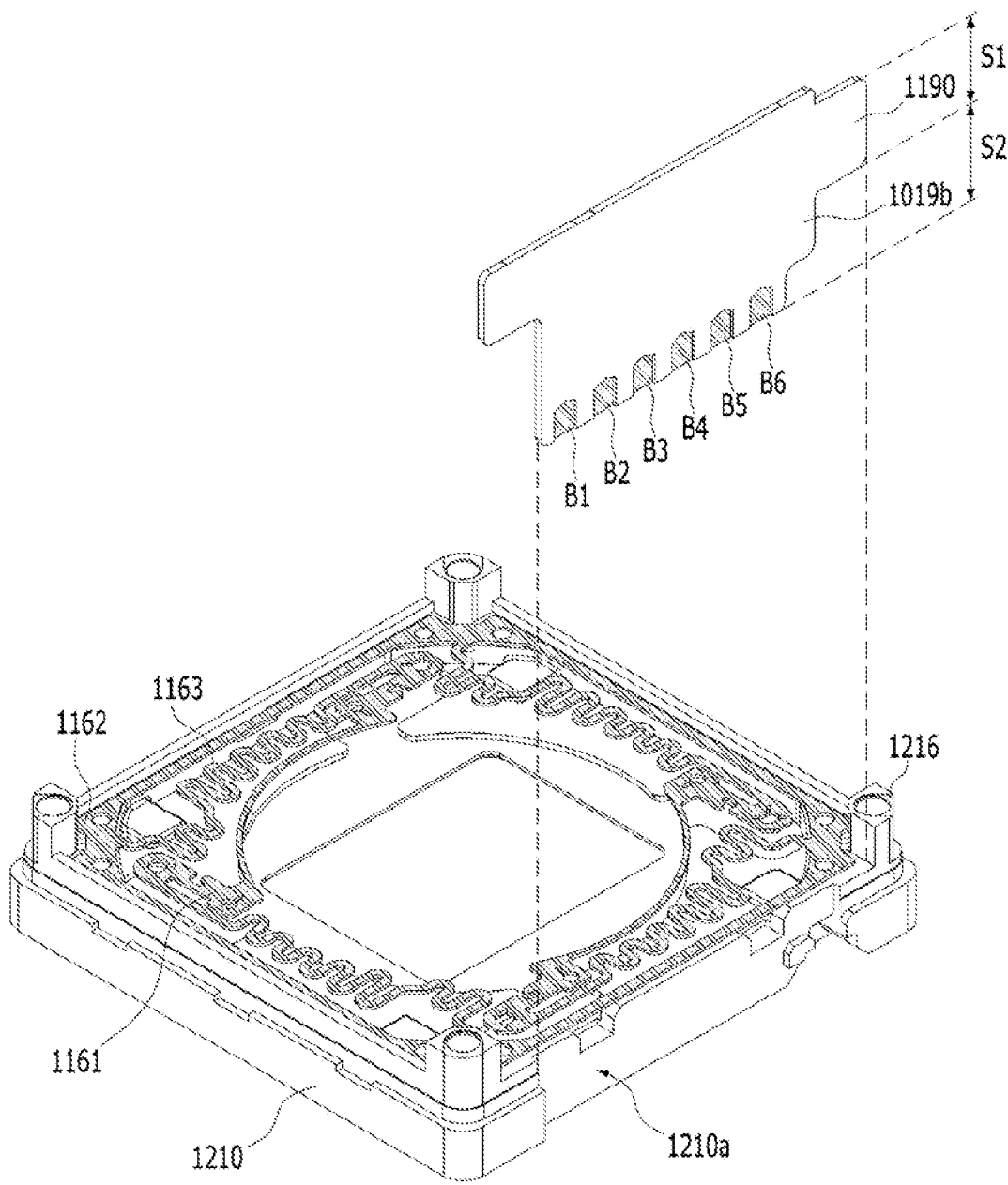
FIG. 38 is a perspective view of the base, the lower elastic member, and the circuit board.
Figure 39A:
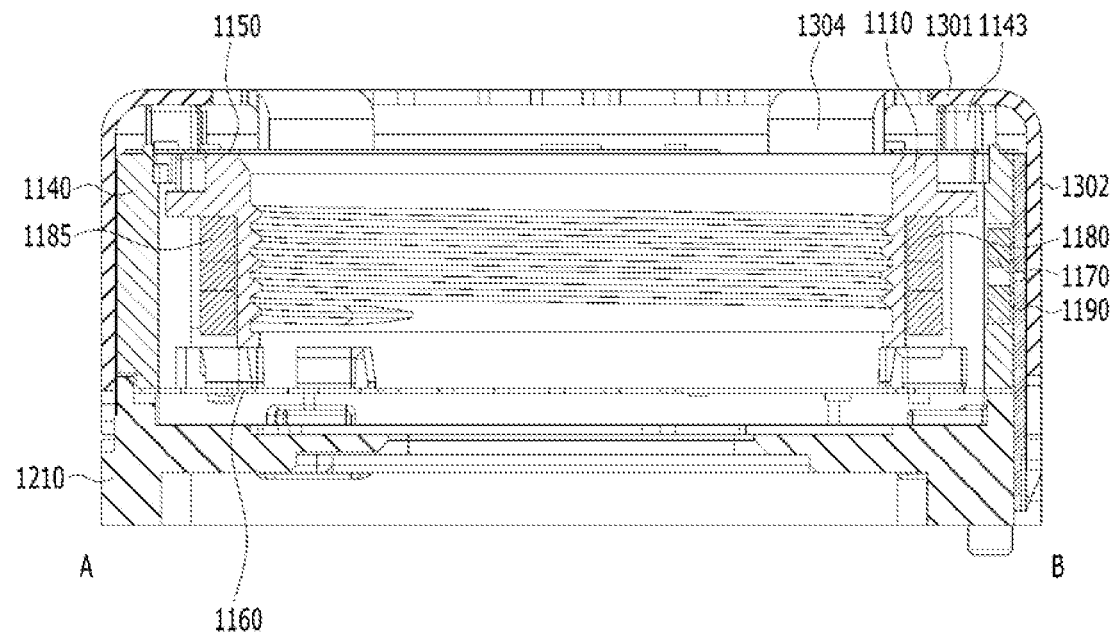
FIG. 39A is a cross-sectional view of the lens moving apparatus in FIG. 32, taken along line AB in FIG. 33.
Figure 39B:
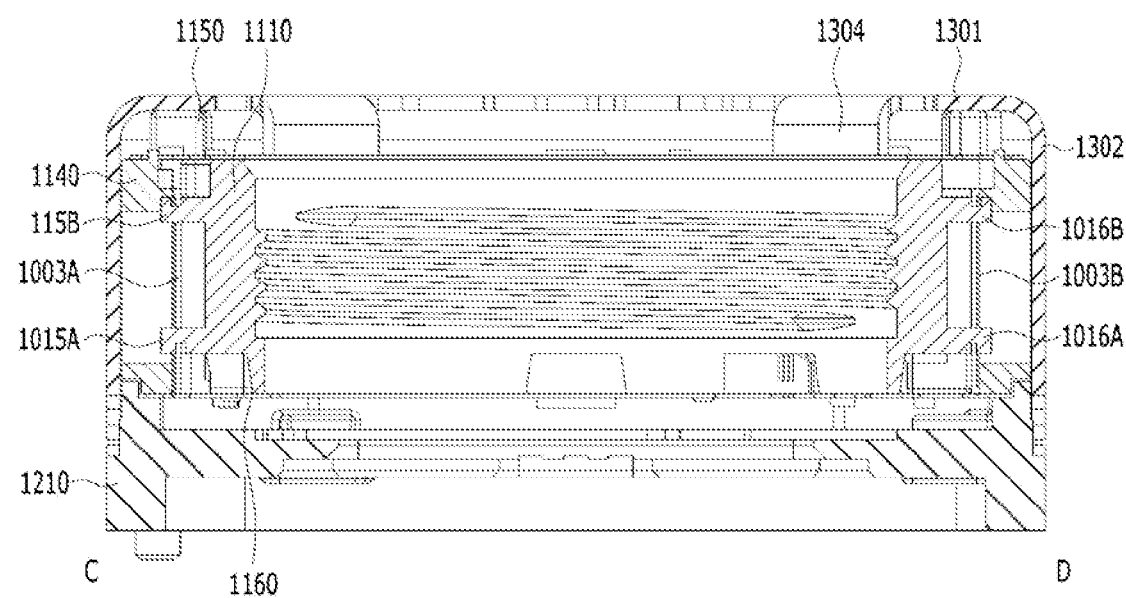
FIG. 39B is a cross-sectional view of the lens moving apparatus in FIG. 32, taken along line CD in FIG. 33.
Figure 40:
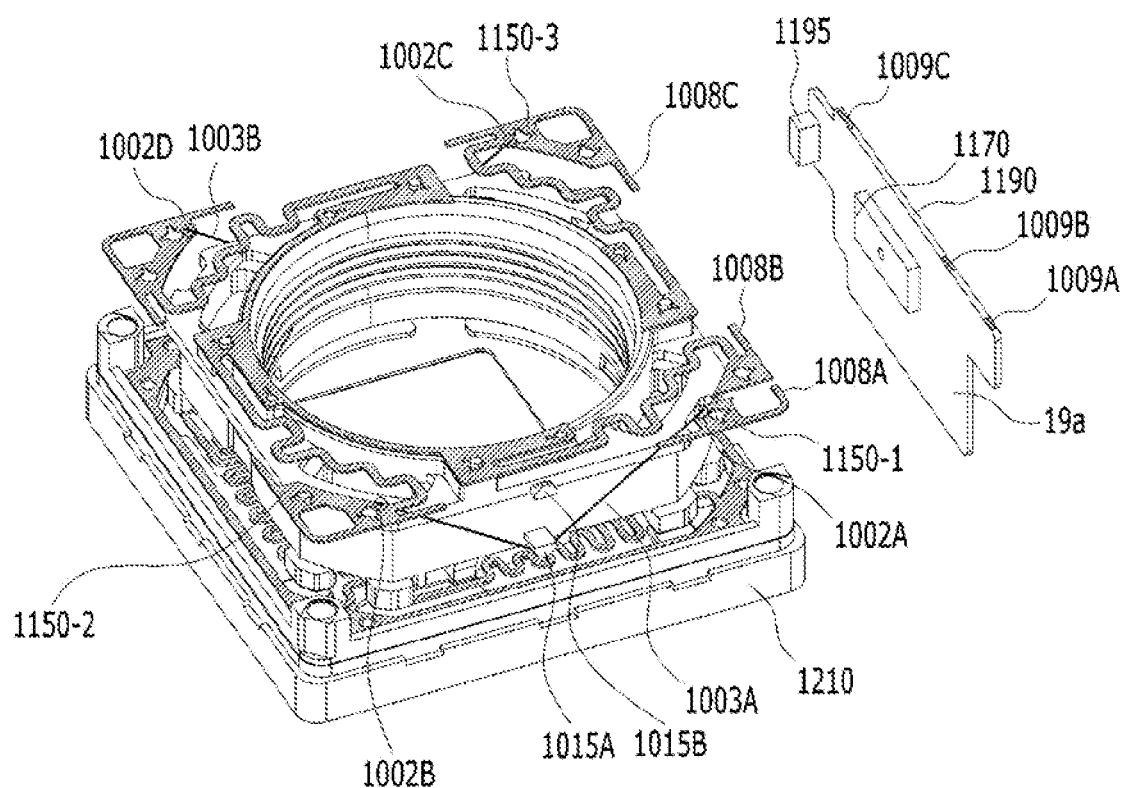
FIG. 40 shows a conductive connection relationship between the upper elastic member, the shape memory alloy member, and the circuit board.

FIG. 35A is a perspective view of the housing 1140, the position sensor 1170, and the capacitor 1195 shown in FIG. 32, FIG. 35B is a perspective view of the housing 1140 to which the circuit board 1190 and the position sensor 1170 are coupled, FIG. 36 is a perspective view of the upper elastic member 1150, FIG. 37 is a perspective view of the base 1210, FIG. 38 is a perspective view of the base 1210, the lower elastic member 1160, and the circuit board 1190, FIG. 39A is a cross-sectional view of the lens moving apparatus 1100 in FIG. 32, taken along line AB in FIG. 33, FIG. 39B is a cross-sectional view of the lens moving apparatus 1100 in FIG. 32, taken along line CD in FIG. 33, and FIG. 40 shows a conductive connection relationship between the upper elastic member 1150, the shape memory alloy member 1310, and the circuit board 1190.

Referring to FIGS. 35A and 35B, the housing 1140 accommodates therein the bobbin 1110 so that the AF moving unit, e.g. the bobbin 1110, is capable of moving in the optical-axis direction.

The housing 1140 may have a bore 1140A formed therein to allow the bobbin 1110 to be accommodated or disposed therein. The bore 1140A may be a hole or a through-hole formed through the housing 1140 in the optical-axis direction. For example, the housing 1140 may have a pillar shape having the bore 1140A.

The housing 1140 may include a side portion 1141 and a corner portion 1142 to form the bore 1140A. In FIG. 35A, one side portion 1141 and one corner portion 1142 of the housing 1140 are denoted by reference numerals. For example, the housing 1140 may include a plurality of side portions and a plurality of corner portions. Here, the corner portions of the housing 1140 may alternatively be referred to as "pillar portions" of the housing 1140.

In an example, the housing 1140 may include side portions and corner portions to form the bore 1140A having a polygonal (e.g. quadrangular or octagonal) shape or a circular (or elliptical) shape. In an example, each of the side portions of the housing 1140 may be disposed parallel to a corresponding one of the side plates 320 of the cover member 1300.

Each of the side portions of the housing 1140 may correspond to any one of the side portions of the bobbin 1110, and each of the corner portions of the housing 1140 may correspond to any one of the corner portions of the bobbin 1110. The inner side surface of each of the corner portions of the housing 1140 may be a flat surface, a chamfered surface, or a curved surface.

In order to prevent the upper surface of the housing 1140 from directly colliding with the inner surface of the upper plate 1301 of the cover member 1300, the housing 1140 may include a stopper 1143 protruding from the upper portion, the upper surface, or the upper end thereof. Here, the stopper 1143 may alternatively be referred to as a "boss" or a "protrusion."

In an example, at the initial position of the AF moving unit, the stopper 1143 of the housing 1140 may be in contact with the inner surface of the upper plate 1301 of the cover member 1300, but the disclosure is not limited thereto. In another embodiment, the two elements may not be in contact with each other.

The housing 1140 may include at least one first coupling portion 1144 formed on the upper portion, the upper surface, or the upper end thereof to be coupled to the first outer frame 1152 of the upper elastic member 1150. Although the first coupling portion 1144 of the housing 1140 is illustrated in FIG. 35A as having a protrusion shape, the disclosure is not limited thereto. In another embodiment, the first coupling portion of the housing may have a recessed shape or a flat surface shape.

In addition, the housing 1140 may include at least one second coupling portion 1147 formed on the lower portion, the lower surface, or the lower end thereof to be coupled to the second outer frame 1162 of the lower elastic member 1160. Although the second coupling portion 1147 is illustrated in FIG. 35B as having a protrusion shape, the disclosure is not limited thereto. In another embodiment, the second coupling portion may have a recessed shape or a flat surface shape.

Although the first and second coupling portions 1144 and 1147 are illustrated in FIGS. 35A and 35B as being disposed on at least one of the corner portions of the housing 1140, the disclosure is not limited thereto. In another embodiment, the first and second coupling portions may be disposed on at least one of the side portions or the corner portions of the housing 1140.

In order to prevent the lower surface or the bottom of the housing 1140 from colliding with the base 1210 to be described later, the housing 1140 may include at least one stopper (not shown) protruding from the lower portion, the lower surface, or the lower end thereof.

A guide recess 1148 corresponding to a protruding portion 1216 of the base 1210 may be formed in the lower portion, the lower surface, or the lower end of at least one of the corner portions of the housing 1140.

In an example, the guide recess 1148 in the housing 1140 and the protruding portion 1216 of the base 1210 may be coupled to each other by means of an adhesive member, whereby the housing 1140 may be coupled to the base 1210.

The housing 1140 may include at least one escape recess 1005A formed in the upper portion, the upper surface, or the upper end of at least one of the side portions of the housing 1140 in order to avoid spatial interference with a connection portion between the first frame connection portion 1153 and the first outer frame 1151 of the upper elastic member 1150.

In addition, the housing 1140 may include at least one escape recess 1005B formed in the lower portion, the lower surface, or the lower end of at least one of the corner portions of the housing 1140 in order to avoid spatial interference with a connection portion between the second frame connection portion 1163 and the second outer frame 1161 of the lower elastic member 1160.

In another embodiment, one or more escape recesses 1005A and/or one or more escape recesses 1005B in the housing 1140 may be disposed in at least one of the side portions or the corner portions of the housing 1140.

The housing 1140 may have a structure (e.g. a recess or a protrusion) formed on the side portion thereof to be coupled to the circuit board 1190. In an example, the housing 1140 may include a recess 1025a formed in the outer side surface of any one side portion thereof to allow the circuit board 1190 to be disposed therein, and the recess 1025a may have a shape identical to or coinciding with that of the circuit board 1190.

In an example, the circuit board 1190 may be attached to any one side portion (e.g. the recess 1025a) of the housing 1140 by means of an adhesive or the like.

In addition, the housing 1140 may include a first seating portion 1017a formed in any one side portion thereof to allow the position sensor 1170 to be seated therein. In addition, the housing 1140 may include a second seating portion 1017b formed in any one corner portion thereof (or a first pillar portion) to allow the capacitor 1195 to be seated therein.

In an example, the first seating portion 1017a and the second seating portion 1017b of the housing 1140 may be formed in the recess 1025a in the housing 1140 so as to be spaced apart from each other.

In an example, the first seating portion 1017a formed in any one side portion of the housing 1140 may be located between two corner portions of the housing 1140, which are located at both ends of the side portion of the housing 1140, and the second seating portion 1017b may be formed in any one of two corner portions of the housing 1140.

As shown in FIG. 35A, the first seating portion 1017a may have a shape of an opening or a through-hole penetrating the side portion of the housing 1140 in order to avoid interposition of the housing 1140 between the sensing magnet 1180 and the position sensor 1170, thereby increasing the output of the position sensor 1170, thus improving the sensitivity of the position sensor 1170. In another embodiment, the first seating portion may have a recessed shape.

In addition, the second seating portion 1017b may have a shape of a recess depressed in the outer side surface of the corner portion of the housing 1140, rather than a through-hole shape. In another embodiment, the second seating portion 1017b may have an opening shape or a through-hole shape.

Next, the sensing magnet 1180 and the balancing magnet 1185 will be described.

The sensing magnet 1180 may be disposed on the side portion or the outer side surface of the bobbin 1110 that faces or opposes the position sensor 1170, and the balancing magnet 1185 may be disposed on another outer side surface of the bobbin 1110 that is located opposite the side portion or the outer side surface of the bobbin 1110 on which the sensing magnet 1180 is disposed.

For example, the sensing magnet 1180 may have a polyhedral shape, e.g. a hexahedral shape.

In an example, the sensing magnet 1180 may include an upper surface, a lower surface, a first surface facing the bobbin 1110, a second surface formed opposite the first surface, a first side surface interconnecting the first surface and the second surface, and a second side surface formed opposite the first side surface.

A portion of any one surface of the sensing magnet 1180 mounted in the recess 1180a in the bobbin 1110 may be exposed to the outer side surface of the bobbin 1110, but the disclosure is not limited thereto. In another embodiment, the portion of the sensing magnet may not be exposed to the outer side surface of the bobbin 1110.

In an example, the sensing magnet 1180 may be inserted into the recess 1180a through an opening of the recess 1180a that is open in the lower surface of the bobbin 1110. In addition, in an example, the sensing magnet 1180 may be secured or attached to the recess 1180a in the bobbin 1110 by means of an adhesive such as epoxy. The description of the sensing magnet 1180 may be applied to mounting of the balancing magnet 1185 to the bobbin 1110.

Each of the sensing magnet 1180 and the balancing magnet 1185 may be a monopolar-magnetized magnet that is disposed such that the upper surface thereof is an N pole and the lower surface thereof is an S pole, but the disclosure is not limited thereto. The positions of the two poles may be interchanged.

In an example, each of the sensing magnet 1180 and the balancing magnet 1185 may be disposed such that an interface between the N pole and the S pole is parallel to a direction perpendicular to the optical axis, but the disclosure is not limited thereto. Alternatively, in another embodiment, the interface between the N pole and the S pole may be parallel to the optical axis.

Alternatively, in another embodiment, each of the sensing magnet 1180 and the balancing magnet 1185 may be a bipolar-magnetized magnet. In this case, the bipolar-magnetized magnet may include a first magnet portion including an N pole and an S pole, a second magnet portion including an S pole and an N pole, and a non-magnetic partition wall disposed between the first magnet portion and the second magnet portion.

When AF operation is performed, the sensing magnet 1180 may be moved together with the bobbin 1110 in the optical-axis (OA) direction, and the position sensor 1170 may detect the intensity of the magnetic field of the sensing magnet 1180 moving in the optical-axis direction, and may output an output signal corresponding to the result of detection.

In an example, the controller 1830 of the camera device 1200 or the controller 780 of the terminal 200A may detect displacement of the bobbin 1110 in the optical-axis direction based on the output signal output from the position sensor 1170.

The balancing magnet 1185 may be disposed on the bobbin 1110 in order to balance the weight of the AF moving unit.

When the moving unit (e.g. the bobbin 1110) is located at the initial position, at least a portion of the position sensor 1170 and at least a portion of the sensing magnet 1180 may overlap each other in a direction parallel to a line that passes through the optical axis and is perpendicular to the optical axis. In another embodiment, the two components may not overlap each other.

Next, the position sensor 1170, the circuit board 1190, and the capacitor 1195 will be described.

Referring to FIGS. 38 and 39, the circuit board 1190 and the position sensor 1170 may be disposed on or coupled to any one side portion of the housing 1140. In an example, the circuit board 1190 may be disposed on the outer side surface of the side portion of the housing 1140.

In an example, the circuit board 1190 may be disposed in the recess 1025*a* in the housing 1140. At least a portion of the first surface 1019*a* of the circuit board 1190 may be in contact with the recess 1025*a* in the housing 1140.

The circuit board 1190 may include at least one terminal 1095 in order to be conductively connected to the outside. In an example, the circuit board 1190 may include a plurality of terminals B1 to B6. Although six terminals are illustrated in FIG. 38, the disclosure is not limited thereto, and the number of terminals may be two or greater.

In addition, the circuit board 1190 may include pads 1009A to 1009C conductively connected to the shape memory alloy member 1310.

For example, the circuit board 1190 may be a printed circuit board or an FPCB.

In an example, the pads 1009A to 1009C may be formed on the upper surface of the circuit board 1190, which interconnects the first surface 1019*a* and the second surface 1019*b*. In another embodiment, the first to third pads may be formed on the first surface 1019*a* of the circuit board 1190.

In still another embodiment, the first to third pads may be formed on the second surface 1019*b* of the circuit board 1190. In this case, the first to third upper elastic members may pass through at least a portion of the circuit board to be respectively connected or coupled to the first to third pads.

In an example, the circuit board 1190 may include recesses formed in the upper surface thereof so as to correspond to the first to third upper elastic members. Each of the first to third upper elastic members may include an extended portion that passes through a corresponding recess in the circuit board 1190 to be coupled to a corresponding pad.

The plurality of terminals B1 to B6 may be formed on the second surface 1019*b* of the circuit board 1190.

In an example, the plurality of terminals B1 to B6 may be arranged in a line on the lower end of the second surface 1019*b* of the circuit board 1190, but the disclosure is not limited thereto. In this case, the second surface 1019*b* of the circuit board 1190 may be a surface opposite the first surface 1019*a* of the circuit board 1190.

In the embodiment shown in FIG. 38, the circuit board 1190 includes six terminals B1 to B6, but the disclosure is not limited thereto. In another embodiment, the number of terminals may be two or greater or may be four.

The circuit board 1190 may include circuit patterns or wirings to conductively connect the position sensor 1170 to at least one of the terminals B1 to B6 or to conductively connect the pads 1009A to 1009C to at least one of the terminals B1 to B6.

In an example, the position sensor 1170 may be mounted or disposed on the first surface 1019*a* of the circuit board 1190. The position sensor 1170 may be disposed in the first seating portion 1017*a* of the housing 1140.

The position sensor 1170 may detect the intensity of the magnetic field of the sensing magnet 1180 mounted on the bobbin 1110 during movement of the bobbin 1110, and may output an output signal (e.g. output voltage) corresponding to the result of detection.

The position sensor 1170 may be implemented as a Hall sensor alone or a driver IC including a Hall sensor.

Figure 42A:
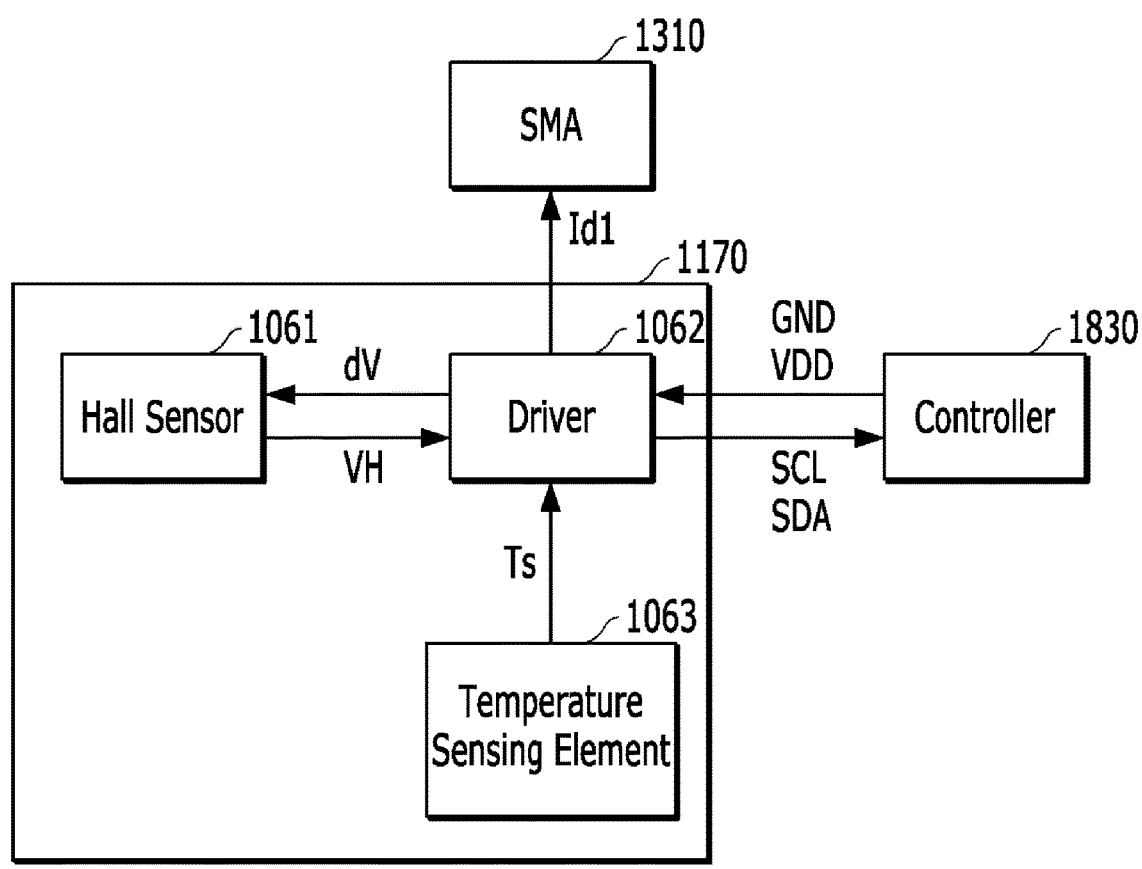
FIG. 42A is a diagram showing the configuration of an embodiment of the position sensor in FIG. 32.

FIG. 42A is a diagram showing the configuration of an embodiment of the position sensor 1170 in FIG. 32.

Referring to FIG. 42A, the position sensor 1170 may include a Hall sensor 1061 and a driver 1062.

The Hall sensor 1061 may generate an output VH corresponding to a result of detection of the intensity of the magnetic field of the sensing magnet 1180.

For example, the Hall sensor 1061 may be made of a silicone-based material, and the output VH of the Hall sensor 1061 may increase as ambient temperature increases. For example, the ambient temperature is the temperature of the lens moving apparatus 1100 or the camera device 1200, e.g. the temperature of the circuit board 1190 or 1800, the temperature of the image sensor 1810, the temperature of the Hall sensor 1061, or the temperature of the driver 1062.

In addition, in another embodiment, the Hall sensor 1061 may be made of GaAs, and the output VH of the Hall sensor 1061 may have a slope of about-0.06%/° C. with respect to the ambient temperature.

The position sensor 1170 may further include a temperature sensing element 1063 capable of detecting ambient temperature. The temperature sensing element 1063 may output a temperature detection signal Ts correspond to the result of measurement of ambient temperature of the position sensor 1170 to the driver 1062. For example, the temperature sensing element 1063 may be a thermistor.

Although the temperature sensing element 1063 is illustrated in FIG. 42A as being included in the position sensor 1170, the disclosure is not limited thereto. In another embodiment, the temperature sensing element may be provided separately from the position sensor 1170, may be disposed or mounted on the circuit board 1190 of the lens moving apparatus 1100 or the circuit board 1800 of the camera device 1200, and may be conductively connected to the circuit board 1190 or 1800.

The driver 1062 may output a driving signal dV for driving the Hall sensor 1061 and a driving signal Id1 for driving the shape memory alloy member 1310.

In an example, the driver 1062 may receive a clock signal SCL, a data signal SDA, and power signals VDD and GND from the controller 1830 or 780 through data communication using a protocol, for example, I2C communication.

The driver 1062 may generate a driving signal dV for driving the Hall sensor 1061 and a driving signal Id1 for driving the shape memory alloy member 1310.

In an example, the position sensor 1170 may include first and second terminals for receiving power signals VDD and VSS, third and fourth terminals for transmitting and receiving the clock signal SCL and the data signal SDA, and fifth to seventh terminals for providing driving signals to the shape memory alloy member 1310 or 1320.

In addition, the circuit board 1190 may be conductively connected to the first to seventh terminals (not shown) of the position sensor 1170. The circuit board 1190 may include first to third pads 1009A to 1009C conductively connected to the fifth to seventh terminals of the position sensor 1170.

In addition, the driver 1062 may receive the output VH of the Hall sensor 1061, and may transmit the data signal SDA related to the output VH of the Hall sensor 1061 to the controller 1830 or 780 through data communication using a protocol, for example, I2C communication.

In addition, the driver 1062 may receive the temperature detection signal Ts measured by the temperature sensing element 1063, and may transmit the temperature detection signal Ts to the controller 1830 or 780 through data communication using a protocol, for example, I2C communication.

The controller 1830 or 780 may perform temperature compensation on the output VH of the Hall sensor 1061 based on change in the ambient temperature measured by the temperature sensing element 1063 of the position sensor 1170.

Figure 42B:
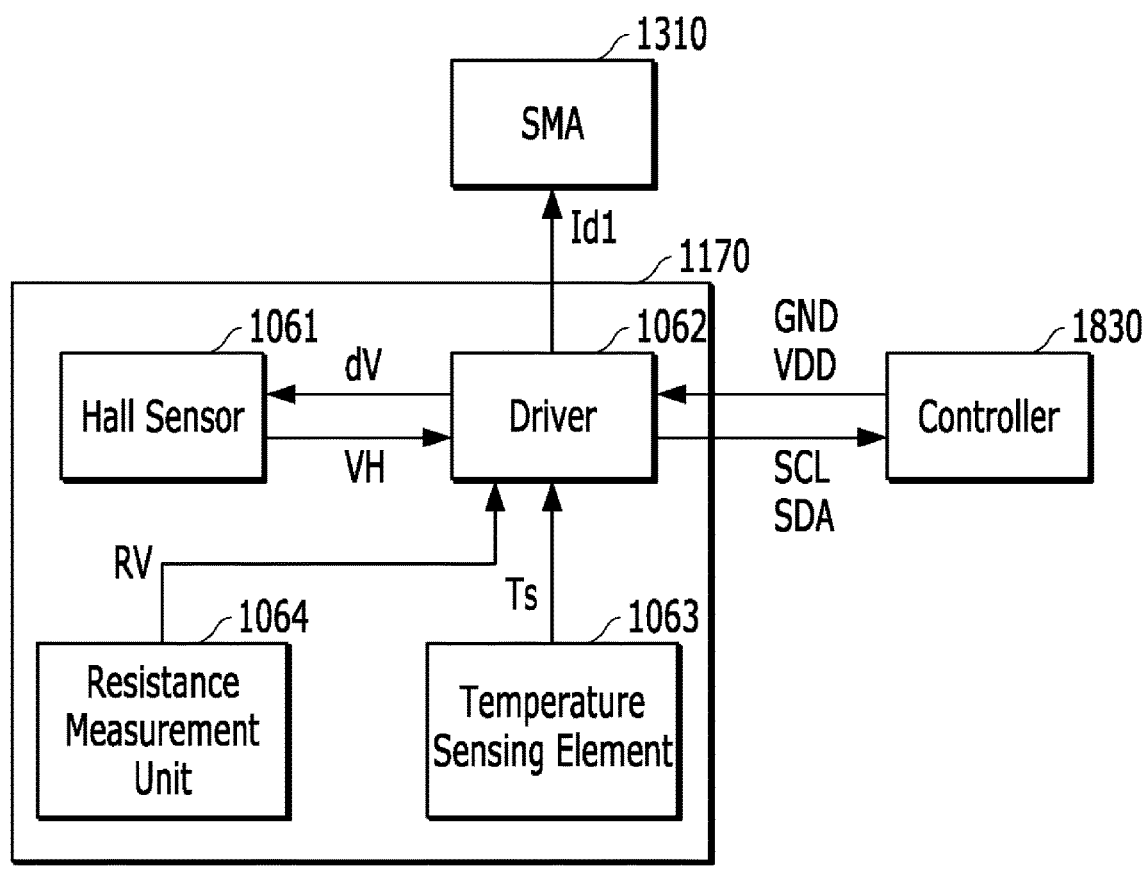
FIG. 42B is a diagram showing the configuration of a position sensor according to another embodiment.

FIG. 42B is a diagram showing the configuration of a position sensor 1170A according to another embodiment.

The position sensor 1170A in FIG. 42B is a modified example of the position sensor 1170 in FIG. 42A, and may further include a resistance measurement unit 1064.

The resistance measurement unit 1064 may measure the resistance of the shape memory alloy member 1310, and may transmit a result RV of measurement to the driver 1062. In an example, the resistance measurement unit 1064 may detect voltage across both ends of the shape memory alloy member 1310 or current flowing through the shape memory alloy member 1310, and may output a result of detection (e.g. detected current or detected voltage).

Alternatively, in another embodiment, the resistance measurement unit 1064 may convert the result of detection into a resistance value, and may output the resistance value to the driver 1062.

The driver 1062 may receive the output RV of the resistance measurement unit 1064, and may transmit the data signal SDA related to the output RV of the resistance measurement unit 1064 to the controller 1830 or 780 through data communication using a protocol, for example, I2C communication.

The controller 1830 or 780 may generate, acquire, or calculate the resistance value of the shape memory alloy member 1310 using data on the output RV of the resistance measurement unit 1064 received from the position sensor 1170A.

Although the resistance measurement unit 1064 is illustrated in FIG. 42B as being mounted in the position sensor 1170A or included in the position sensor 1170A, the disclosure is not limited thereto. In another embodiment, the resistance measurement unit 1064 may be provided separately from the position sensor 1170A, and may be disposed or mounted on the circuit board 1190 of the lens moving apparatus 1100 or the circuit board 1800 of the camera device 1200.

The capacitor 1195 may be disposed on a corner portion of the housing 1140. For example, the capacitor 1195 may be disposed in the second seating portion 1017b of the housing 1140. The capacitor 1195 may be disposed or mounted on the first surface 1019a of the circuit board 1190, and may be conductively connected to the circuit board 1190.

The capacitor 1195 may be of a chip type, and the chip may include a first terminal corresponding to one end of the capacitor 1195 and a second terminal corresponding to the other end of the capacitor 1195. The capacitor 1195 may alternatively be referred to as a "capacitive element" or a condenser.

In another embodiment, the capacitor 1195 may be implemented so as to be included in the circuit board 1190. For example, the circuit board 1190 may be provided with a capacitor, which includes a first conductive layer, a second conductive layer, and an insulating layer (e.g. a dielectric layer) disposed between the first conductive layer and the second conductive layer.

In an example, the capacitor 1195 may be conductively connected in parallel to the first and second terminals of the position sensor 1170 to receive power voltages VDD and VSS.

In an example, the capacitor 1195 may be conductively connected in parallel to two terminals of the circuit board 1190 for providing power voltages VDD and VSS to the first and second terminals of the position sensor 1170. For example, VSS may be ground voltage GND.

The capacitor 1195 may serve as a smoothing circuit for removing ripple components included in the power voltages (e.g. VDD and VSS) provided to the position sensor 1170 from the outside, and thus may provide a stable and consistent power signal to the position sensor 1170.

In addition, the capacitor 1195 may prevent overcurrent, which is caused by high-frequency noise, ESD, or the like introduced from the outside, from being applied to the position sensor 1170, and may prevent a calibration value regarding displacement of the bobbin 1110 from being reset due to the overcurrent.

For example, the capacitance of the capacitor 1195 may be 0.1 µF to 2.5 µF. For example, the capacitance of the capacitor 1195 may be 2.2 µF.

Alternatively, in another embodiment, the capacitance of the capacitor 1195 may be 0.5 µF to 2 µF. Alternatively, in another embodiment, the capacitance of the capacitor 1195 may be 1 µF or greater.

When the capacitance of the capacitor 1195 is less than 0.1 µF, it may be difficult to supply stable power voltage to the position sensor 1170 because the effect of removing ripple components by the smoothing circuit is reduced. When the capacitance of the capacitor 1195 exceeds 2.5 µF, the size of the capacitor 1195 may increase, and a large amount of heat may be generated.

In the embodiment shown in FIG. 32, the sensing magnet 1180 is disposed on the bobbin 1110, and the position sensor 1170 and the circuit board 1190 are disposed in the housing 1140, but the disclosure is not limited thereto.

In another embodiment, the sensing magnet may be disposed in the housing, the position sensor may be disposed on the bobbin so as to correspond to or face the sensing magnet, and the bobbin may be provided with a circuit pattern, a conductive pattern, or a wiring conductively connected to the position sensor and the upper elastic member. Alternatively, a circuit board, which is conductively connected to the position sensor and the upper elastic member, may be disposed on the bobbin.

In still another embodiment, the sensing magnet may be disposed on the bobbin, and the position sensor may be disposed on the base so as to correspond to or face the sensing magnet in the optical-axis direction. In this case, a circuit pattern, a conductive pattern, a terminal, a wiring, or a circuit board, which is conductively connected to the position sensor, may be disposed on the base.

The elastic member may be coupled to the housing 1140 and the bobbin 1110. For example, the elastic member may include at least one of an upper elastic member 1150 or a lower elastic member 1160.

Next, the upper elastic member 1150 and the lower elastic member 1160 will be described.

Referring to FIGS. 36 to 38, the upper elastic member 1150 may be coupled to the bobbin 1110. In addition, the lower elastic member 1160 may be coupled to the bobbin 1110. In an example, the upper elastic member 1150 and the lower elastic member 1160 may be coupled to the bobbin 1110 and the housing 1140, and may support the bobbin 1110. The embodiment may include at least one of the upper elastic member 1150 or the lower elastic member 1160.

In an example, the upper elastic member 1150 may be coupled to the upper portion, the upper surface, or the upper end of the bobbin 1110 and to the upper portion, the upper surface, or the upper end of the housing 1140. The lower elastic member 1160 may be coupled to the lower portion, the lower surface, or the lower end of the bobbin 1110 and to the lower portion, the lower surface, or the lower end of the housing 1140.

The upper elastic member 1150 and the lower elastic member 1160 may be implemented as leaf springs, but the disclosure is not limited thereto. The elastic members may be implemented as coil springs, suspension wires, or the like.

The upper elastic member 1150 may include a first inner frame 1151, which is coupled to the upper portion, the upper surface, or the upper end of the bobbin 1110, a first outer frame 1152, which is coupled to the upper portion, the upper surface, or the upper end of the housing 1140, and a first frame connection portion 1153, which connects the first inner frame 1151 to the first outer frame 1152. Here, the "inner frame" may be referred to as an "inner portion," and the "outer frame" may alternatively be referred to as an "outer portion."

The lower elastic member 1160 may include a second inner frame 1161, which is coupled to the lower portion, the lower surface, or the lower end of the bobbin 1110, a second outer frame 1162, which is coupled to the lower portion, the lower surface, or the lower end of the housing 1140, and a second frame connection portion 1163, which connects the second inner frame 1161 to the second outer frame 1162.

At least one of the upper elastic member 1150 or the lower elastic member 1160 may be divided or separated into two or more unit members. At least one of the upper elastic unit members (or the lower elastic unit members) may include at least one of a first inner frame (or a second inner frame) or a first outer frame (or a second outer frame). Alternatively, at least one of the upper elastic unit members (or the lower elastic unit members) may include a first inner frame (or a second inner frame), a first outer frame (or a second outer frame), and a first frame connection portion (or a second frame connection portion).

In an example, the upper elastic member 1150 may include a first upper elastic member 1150-1, a second upper elastic member 1150-2, and a third upper elastic member 1150-3, which are spaced apart from each other.

In another embodiment, the upper elastic member 1150 may include four upper elastic members, and the circuit board 1190 may include four pads respectively connected to the four upper elastic members. One end of the first member 1003A may be connected to a first upper elastic member among the four upper elastic members, and the other end of the first member 1003A may be connected to a second upper elastic member among the four upper elastic members. One end of the second member 1003B may be connected to a third upper elastic member among the four upper elastic members, and the other end of the second member 1003B may be connected to a fourth upper elastic member among the four upper elastic members.

Although one lower elastic member 1160 that is not divided into unit members is illustrated in FIG. 38, the disclosure is not limited thereto. In another embodiment, the lower elastic member may include a plurality of lower elastic members (e.g. lower springs).

In another embodiment, the lower elastic member 1160 may include four lower elastic members, and the circuit board 1190 may include four other pads respectively connected to the four lower elastic members. One end of the third member 1004A in FIG. 41A may be connected to a first lower elastic member among the four lower elastic members, and the other end of the third member 1004A may be connected to a second lower elastic member among the four lower elastic members. One end of the fourth member 1004B may be connected to a third lower elastic member among the four lower elastic members, and the other end of the fourth member 1004B may be connected to a fourth lower elastic member among the four lower elastic members.

In addition, referring to FIG. 40, the first shape memory alloy member 1310 is conductively connected to the upper elastic member 1150, but the disclosure is not limited thereto. In another embodiment, the first shape memory alloy member 1310 may be conductively connected to three lower elastic members, or may be conductively connected to the circuit board 1190 via three lower elastic members.

Figure 41A:
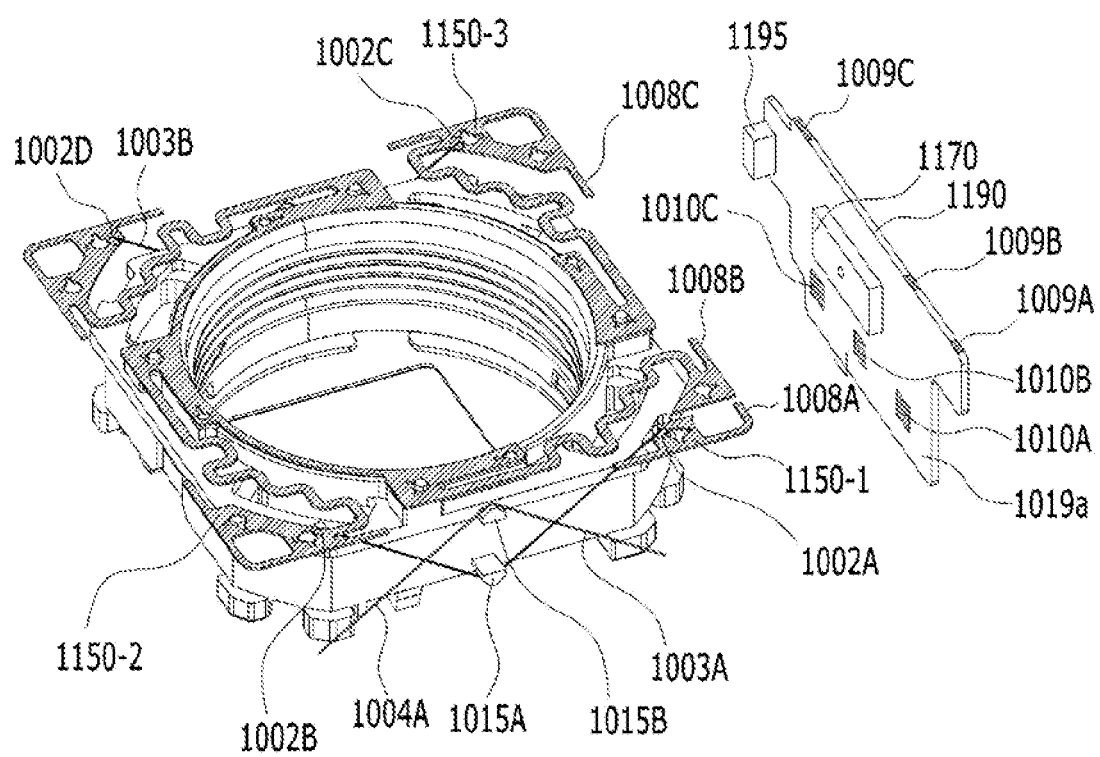
FIG. 41A is a perspective view of some components of a lens moving apparatus according to another embodiment.

In addition, referring to FIG. 41A, the first shape memory alloy member 1310 is conductively connected to the upper elastic member 1150, and the second shape memory alloy member 1320 is conductively connected to the lower elastic member 1160A, but the disclosure is not limited thereto. In another embodiment, the second shape memory alloy member 1320 may be conductively connected to the upper elastic member 1150, and the first shape memory alloy member 1310 may be conductively connected to the lower elastic member 1160A.

In an example, each of the first to third upper elastic members 1150-1 to 1150-3 may include a first outer frame 1152, and each of the second and third upper elastic members 1150-2 and 1150-3 may include a first inner frame 1151 and a first frame connection portion 1153.

In an example, the first upper elastic member 1150-1 may include a first extended portion 1008A extending from the first outer frame 1151 of the first upper elastic member 1150-1 toward the circuit board 1190. The first extended portion 1008A may be coupled to the first pad 1009A of the circuit board 1190 by means of a conductive adhesive or a solder, and may be conductively connected to the first pad 1009A.

The second upper elastic member 1150-2 may include a second extended portion 1008B extending from the first outer frame 1151 of the second upper elastic member 1150-2 toward the circuit board 1190. The second extended portion 1008B may be coupled to the second pad 1009B of the circuit board 1190 by means of a conductive adhesive or a solder, and may be conductively connected to the second pad 1009B.

The third upper elastic member 1150-3 may include a third extended portion 1008C extending from the first outer frame 1151 of the third upper elastic member 1150-3 toward the circuit board 1190. The third extended portion 1008C may be coupled to the third pad 1009C of the circuit board 1190 by means of a conductive adhesive or a solder, and may be conductively connected to the third pad 1009C.

The first inner frame 1151 of the upper elastic member 1150 may have formed therein a recess 1151a or a hole, which is coupled to the first coupling portion 113 of the bobbin 1110, and the first outer frame 1152 may have formed therein a hole 1152a or a recess, which is coupled to the first coupling portion 1144 of the housing 1140. A slit may be formed in each of the recesses 1151a and 1152a. In another embodiment, the slit may not be formed.

In an example, the second inner frame 1161 of the lower elastic member 1160 may have formed therein a hole in order to be coupled to the second coupling portion 117 of the bobbin 1110, and the second outer frame 1162 of the lower elastic member 1160 may have formed therein a hole in order to be coupled to the second coupling portion 1147 of the housing 1140.

Each of the first frame connection portion 1153 and the second frame connection portion 1163 of the upper elastic member 1150 and the lower elastic member 1160 may be bent or curved at least once so as to form a predetermined pattern. The upward and/or downward movement of the bobbin 1110 in the first direction may be resiliently (or elastically) supported by positional change and fine deformation of the first and second frame connection portions 1153 and 1163.

In order to absorb and dampen vibration of the bobbin 1110, the lens moving apparatus 1100 may further include a damper (not shown) disposed between the upper elastic member 1150 and the housing 1140.

In an example, the damper (not shown) may be disposed in the space between the first frame connection portion 1153 of the upper elastic member 1150 and the bobbin 1110 (and/or the housing 1140).

In addition, in an example, the lens moving apparatus 1100 may further include a damper (not shown) disposed between the second frame connection portion 1163 of the lower elastic member 1160 and the bobbin 1110 (and/or the housing 1140).

In addition, in an example, an additional damper (not shown) may be disposed between the inner side surface of the housing 1140 and the outer side surface of the bobbin 1110.

Next, the base 1210 will be described.

Referring to FIG. 37, the base 1210 may have therein a bore 1201 corresponding to the bore 1101 in the bobbin 1110 and/or the bore 1140A in the housing 1140, and may have a shape coinciding with or corresponding to the shape of the cover member 1300, for example a quadrangular shape.

The base 1210 may have a step 1211 formed on the lower end of the outer side surface thereof, to which an adhesive may be applied when the cover member 1300 is fixedly adhered thereto. In this case, the step 1211 may guide the cover member 1300 that is coupled to the upper side thereof, and may face the lower end of the side plate 1302 of the cover member 1300. An adhesive member and/or a sealing member may be disposed or applied between the lower end of the side plate 1302 of the cover member 1300 and the step 1211 of the base 1210.

The base 1210 may be disposed under the bobbin 1110 and the housing 1140.

In an example, the base 1210 may be disposed under the lower elastic member 1160.

The base 1210 may have a protruding portion 1216 formed on a corner of the upper surface thereof so as to correspond to the guide recess 1148 in the housing 1140. In an example, the protruding portion 1216 may have a shape of a polygonal pillar protruding from the upper surface of the base 1210 so as to be perpendicular to the upper surface of the base 1210, but the disclosure is not limited thereto. The protruding portion 1216 may alternatively be referred to as a "pillar portion."

The protruding portion 1216 may be inserted into the guide recess 1148 in the housing 1140, and may be fastened or coupled to the guide recess 1148 by means of an adhesive member (not shown), such as epoxy or silicone.

In order to prevent the lower surface or the lower end of the bobbin 1110 from directly colliding with the upper surface of the base 1210 due to external impact, the base 1210 may have a stopper 1023 protruding from the upper surface thereof. The stopper 1023 of the base 1210 may be disposed corresponding to the protruding portion 1216 of the base 1210, but the disclosure is not limited thereto.

The base 1210 may include a seating recess 1210a formed in the outer side surface thereof that corresponds to or faces the side portion of the housing 1140, on which the circuit board 1190 is disposed, to allow the lower end of the circuit board 1190 to be seated therein. The seating recess 1210a in the base 1210 may be depressed in the outer side surface of the base 1210.

In an example, the terminals B1 to B6 of the circuit board 1190 may be disposed on the lower end of the second surface 1019b of the circuit board 1190, and may be located in the seating recess 1210a in the base 1210.

In an example, a protrusion 1036 for supporting the circuit board 1190 may be formed in the seating recess 1210a in the base 1210. In another embodiment, this protrusion may be omitted.

The protrusion 1036 of the base 1210 may protrude from the bottom of the seating recess 1210a, and may support an extended portion S2 (e.g. the lower end of the extended portion S2) of the circuit board 1190, but the disclosure is not limited thereto.

Referring to FIG. 38, the circuit board 1190 may include a body portion S1 and an extended portion S2 located under the body portion S1. The body portion S1 may alternatively be referred to as an "upper end portion," and the extended portion S2 may alternatively be referred to as a "lower end portion." The extended portion S2 may extend from the body portion S1 in the downward direction.

In an example, the terminals B1 to B6 of the circuit board 1190 may be disposed on the extended portion S2, but the disclosure is not limited thereto. The body portion S1 may protrude from a side surface of the extended portion S2.

Next, the cover member 1300 will be described.

The cover member 1300 may accommodate the bobbin 1110 and the housing 1140 in an accommodation space defined by the cover member 1300 and the base 1210.

The cover member 1300 may be formed in the shape of a box having an open lower portion and including an upper plate 1301 and side plates 302, and the lower ends of the side plates 302 of the cover member 1300 may be coupled to the upper portion of the base 1210. The upper plate of the cover member 1300 may have a polygonal shape, e.g. a quadrangular shape or an octagonal shape, and a bore 1303 may be formed in the upper plate 1301 to expose a lens (not shown) to external light. The bore 1303 may be a through-hole formed through the upper plate 1301.

The shape memory alloy member 1310 may include a shape memory alloy (SMA). A shape memory alloy is an alloy that returns to its remembered original shape at a specific temperature when deformed.

The shape memory alloy member 1310 may be an alloy including at least one of Ti, Ni, Cu, Fe, Au, Zn, Mn, Ag, or Cd.

The shape memory alloy member 1310 may change in resistance and length in accordance with energization or de-energization thereof.

Figure 43:
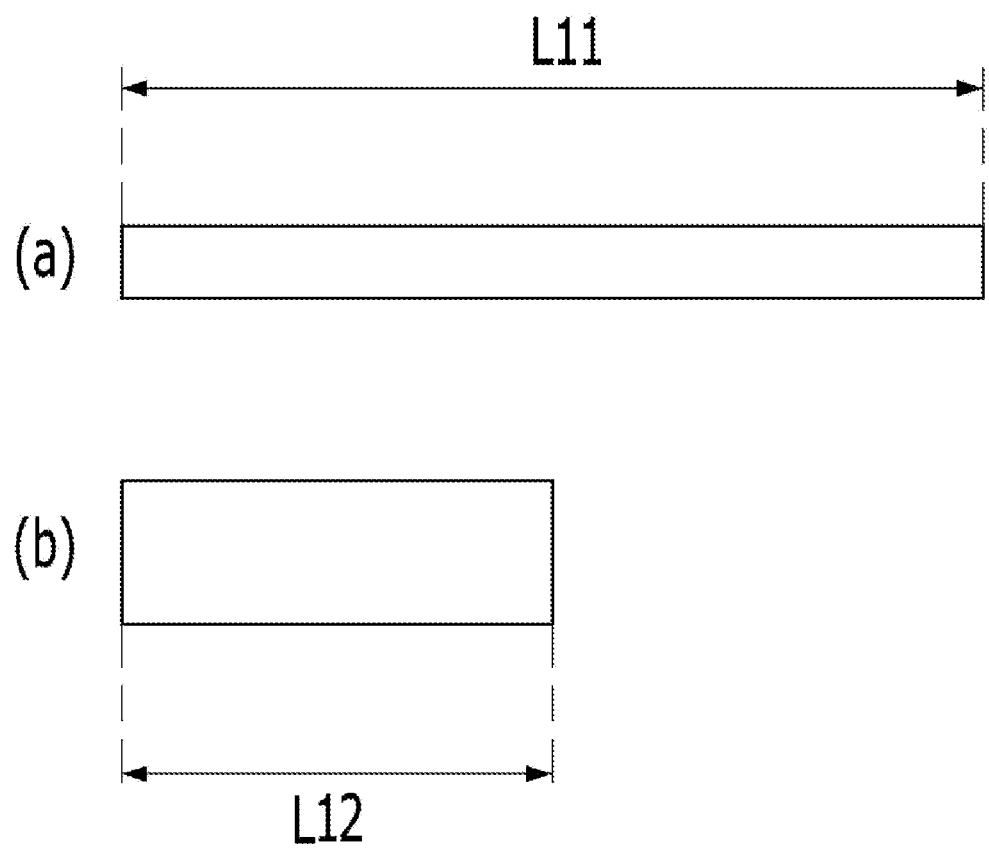
FIG. 43 is a view for explaining a relationship between the temperature, the resistance, and the length of the shape memory alloy member.

FIG. 43 is a view for explaining the relationship between the temperature, the resistance, and the length of the shape memory alloy member 1310.

Referring to FIG. 43(*a*), the shape memory alloy member 1310 may have a high resistance value at a low temperature (e.g. room temperature). In this case, the shape memory alloy member 1310 may have a first length L11.

Referring to FIG. 43(*b*), when a driving signal (e.g. driving current or driving voltage) is applied to the shape memory alloy member 1310, the temperature of the shape memory alloy member 1310 may rise, and the length of the shape memory alloy member 1310 may decrease at a driving temperature (e.g. 100° C. to 110° C.). In this case, the shape memory alloy member 1310 may have a second length L12, which is shorter than the first length L11.

In this way, the shape memory alloy member 1310 may expand or contract in response to a driving signal, and the AF moving unit (e.g. the bobbin 1110) coupled to the shape memory alloy member 1310 may move in the first direction. The intensity of the driving signal applied to the shape memory alloy member 1310 may be controlled to adjust the degree of expansion or the degree of contraction of the shape memory alloy member 1310, whereby the autofocus function may be performed.

For example, the shape memory alloy member 1310 has strong hysteresis characteristics, and thus the driving signal provided to the shape memory alloy member 1310 may be a pulse width modulation (PWM) signal in order to minimize the hysteresis characteristics. Thereby, current consumption may be reduced, and a response speed may be increased.

The shape memory alloy member 1310 may connect the AF moving unit (e.g. the bobbin 1110) to the fixed unit. In an example, one end of the shape memory alloy member 1310 may be coupled to the bobbin 1110, and the other end of the shape memory alloy member 1310 may be coupled to the fixed unit. In this case, the fixed unit may be at least one of the housing 1140, the portion of the upper elastic member 1150 that is coupled to the housing 1140 (e.g. the first outer frame 1152), the circuit board 1190 coupled to the housing 1140, or the base 1210.

In an example, the shape memory alloy member 1310 may be a conductive member made of a conductive material.

For example, the shape memory alloy member 1310 may be formed in the shape of a wire or a plate. The shape memory alloy member 1310 may include a first member 1003A and a second member 1003B.

Referring to FIG. 40, at least a portion of the first member 1003A may be supported or caught by the first protrusion 1015A of the bobbin 1110. For example, an intermediate region or an intermediate portion of the first member 1003A may be in contact with, attached to, or secured to the lower portion of the first protrusion 1015A of the bobbin 1110.

At least a portion of the second member 1003B may be supported by, coupled to, or caught by the second protrusion 1016A of the bobbin 1110. For example, an intermediate region or an intermediate portion of the second member 1003B may be in contact with, attached to, or secured to the lower portion of the second protrusion 1016A of the bobbin 1110.

One end 1002A (or a "first portion") of the first member 1003A may be coupled to the first upper elastic member 1150-1, and the other end 1002B (or a "second portion") of the first member 1003A may be coupled to the second upper elastic member 1150-2. One end 1002C (or a "first portion") of the second member 1003B may be coupled to the third upper elastic member 1150-3, and the other end 1002D (or a "second portion") of the second member 1003B may be coupled to the second upper elastic member 1150-2.

In an example, at least a portion of each of the first member 1003A and the second portion 1002B may be coupled or secured to the housing 1140.

The shape memory alloy member 1310 may be conductively connected to the upper elastic member 1150.

In an example, one end 1002A of the first member 1003A may be coupled to the first outer frame 1152 of the first upper elastic member 1150-1 by means of a conductive adhesive or a solder. The other end 1002B of the first member 1003A may be coupled to one region of the first outer frame 1152 of the second upper elastic member 1150-2 by means of a conductive adhesive or a solder.

In an example, one end 1002C of the second member 1003B may be coupled to the first outer frame 1152 of the third upper elastic member 1150-3 by means of a conductive adhesive or a solder. The other end 1002D of the second member 1003B may be coupled to another region of the first outer frame 1152 of the second upper elastic member 1150-2 by means of a conductive adhesive or a solder.

The first driving signal may be provided to the first member 1003A from the position sensor 1170 through the first and second pads 1009A and 1009B of the circuit board 1190 and the first and second upper elastic members 1150-1 and 1150-2, and the second driving signal may be provided to the second member 1003B from the position sensor 1170 through the second and third pads 1009B and 1009C of the circuit board 1190 and the second and third upper elastic members 1150-2 and 1150-3. In this case, the first driving signal and the second driving signal may be the same signal, but the disclosure is not limited thereto. In another embodiment, the first driving signal and the second driving signal may be separate independent signals in order to adjust a tilt value (or the degree of tilt) of the lens.

In the embodiment, since the shape memory alloy member 1310 is conductively connected to the circuit board 1190 via the first to third upper elastic members 1150-1 to 1150-3, reliability in conductive connection between the shape memory alloy member 1310 and the first to third upper elastic members 1150-1 to 1150-3 may be improved, disconnection and defective coupling may be prevented, and reliability in conductive connection between the shape memory alloy member 1310 and the circuit board 1190 may be improved.

In an example, the first member 1003A and the second member 1003B may be connected in parallel to the first to third pads 1009A to 1009C of the circuit board 1190 via the first to third upper elastic members 1150-1 to 1150-3. In an example, the second pad 1009B may correspond to a common terminal or a ground terminal.

The AF moving unit according to the embodiment shown in FIG. 40 may perform unidirectional driving. Here, unidirectional driving refers to movement of the AF moving unit in one direction, for example the upward direction (e.g. the +Z-axis direction), based on the initial position of the AF moving unit.

For example, the initial position of the AF moving unit (e.g. the bobbin 1110) may be the original position of the AF moving unit (e.g. the bobbin) in the state in which no driving signal is applied to the shape memory alloy member 1310 or the position at which the AF moving unit is located as the result of the upper elastic member 1150 and the lower elastic member 1160 being elastically deformed due only to the weight of the AF moving unit.

In addition, the initial position of the AF moving unit (e.g. the bobbin 1110) may be the position at which the AF moving unit is located when gravity acts in a direction from the bobbin 1110 toward the base 1210 or when gravity acts in a direction from the base 1210 toward the bobbin 1110.

In an example, the AF moving unit may include the bobbin 1110, which is elastically supported by the upper elastic member 1150 and the lower elastic member 1160, and components mounted to the bobbin 1110 so as to move together with the bobbin 1110. In an example, the AF moving unit may include at least one of the bobbin 1110, the sensing magnet 1180, or the balancing magnet 1185. In the case in which the lens module 1400 is mounted, the AF moving unit may include the lens module 1400.

Alternatively, for example, the initial position may be the position of the AF moving unit when the driving force of the shape memory alloy member 1310, which is generated by driving signals applied to the shape memory alloy member 1310, does not exceed the pressing force of the upper elastic member 1150 and the lower elastic member 1160 and thus the AF moving unit is in a stationary state.

Since the shape memory alloy member 1310 does not apply constant tension or pressing force to the AF moving unit in the initial state thereof, vibration or noise may occur due to shaking of the AF moving unit. However, in the embodiment shown in FIG. 40, the pressing force of the upper elastic member 1150 and the lower elastic member 1160 may be set such that the bobbin 1110 is in contact with the base 1210 at the initial position of the AF moving unit. Accordingly, the embodiment has high resistance to vibration and noise and improved reliability in AF operation.

At the time of unidirectional driving, the bobbin 1110 may be driven from when force of the shape memory alloy member 1310 to which driving signals are supplied becomes greater than pressing force of the elastic members 1150 and 1160. At the initial position, the lower portion, the lower surface, or the lower end of the bobbin 1110 (e.g. the lower stopper) may be in contact with the upper surface of the base 1210.

For example, the diameter of the shape memory alloy member 1310 (1003A and 1003B) may be 10 μm to 150 μm. Alternatively, for example, the diameter of the shape memory alloy member 1310 (1003A and 1003B) may be 20 μm to 90 μm.

When the diameter of the shape memory alloy member 1310 (1003A and 1003B) exceeds 150 μm, a time required for contraction and expansion thereof may be so long that the driving speed and the fixing time of the lens moving apparatus are increased. In addition, when the diameter of the shape memory alloy member 1310 (1003A and 1003B) is less than 10 μm, the shape memory alloy member may be vulnerable to impact, and thus the reliability thereof may deteriorate. The description of the diameter of the shape memory alloy member 1310 may be applied to a shape memory alloy member 1320 to be described later.

The shape memory alloy member 1310 may include two or more members. In the embodiment shown in FIG. 9, the two members 1003A and 1003B are in contact with the protrusions formed on two opposite outer side surfaces of the bobbin 1110, but the disclosure is not limited thereto. In another embodiment, additional protrusions may be formed on two other opposite outer side surfaces of the bobbin 1110, and two additional members that respectively contact the additional protrusions of the bobbin may be further included.

For example, the primary resonant frequency of the AF moving unit may be 30 Hz to 400 Hz. Alternatively, for example, the primary resonant frequency of the AF moving unit may be 30 Hz to 200 Hz.

In this case, the primary resonant frequency may be a primary resonant frequency related to mechanical vibration of the AF moving unit caused by AF operation. Alternatively, for example, the primary resonant frequency may be a primary resonant frequency in accordance with response characteristics of the driving signals supplied to the shape memory alloy member 1310 and the output of the position sensor 1170. In this case, the AF moving unit may have a configuration in which the lens module 1400 is coupled to the bobbin.

In an SMA actuator according to a comparative example, the resistance value of the shape memory alloy is measured to detect the position or displacement of the AF moving unit (e.g. the bobbin). To this end, in the comparative example, calibration is performed on the position (or displacement) of the bobbin and the resistance value of the shape memory alloy. For example, a driving signal having a driving frequency of several tens of kHz may be supplied to the shape memory alloy, the value of current flowing through the shape memory alloy may be measured, and the resistance value of the shape memory alloy may be measured using the measured current value.

However, because the shape memory alloy contracts or expands when the temperature thereof reaches about 100° C. to 110° C., a large amount of heat may be generated from the shape memory alloy when the SMA actuator is driven. The resistance value of the shape memory alloy may change or vary due to the heat generated therefrom, and an error may occur in the detected resistance value of the shape memory alloy, which may deteriorate the accuracy or reliability of detection of the position of the AF moving unit.

In addition, in the comparative example, there is no accurately measured reference temperature. Therefore, it is not possible to determine how much offset occurs in the displacement of the AF moving unit measured using the detected resistance value. In addition, in the comparative example, it may be necessary to measure the resistance value of the shape memory alloy in real time in order to detect the displacement of the AF moving unit, and the resistance value of the shape memory alloy may change with change in ambient temperature. In addition, since a driving signal having a driving frequency of several tens of kHz is used, the resistance value of the shape memory alloy may change due to the skin effect, which may cause an error in the detected resistance value of the shape memory alloy.

In order to eliminate the above problems and to improve accuracy of temperature compensation in accordance with change in ambient temperature, the embodiment may have the following configuration.

In the embodiment, the AF moving unit may be driven using the shape memory alloy member 310 or 320, and the position sensor 1170 and the sensing magnet 1180 may be used to detect the displacement or position of the AF moving unit. The position sensor 1170 shown in FIG. 11A may generate an output corresponding to a result of detection of the intensity of the magnetic field of the sensing magnet 1180 when the AF moving unit is moved.

The position sensor 1170 in FIG. 42A may include a temperature sensing element 1063, and the temperature sensing element 1063 may measure the temperature of the position sensor 1170, the temperature of the lens moving apparatus, or ambient temperature, and may output a temperature detection signal Ts.

As described above, the controller 1830 or 780 may compensate for the output value (or output-related code value) of the position sensor 1170 based on the ambient temperature measured by the temperature sensing element 1063.

In an example, the controller 1830 or 780 may have a compensation algorithm for temperature compensation. For example, the controller 1830 or 780 may have a memory storing a temperature compensation algorithm. For example, the temperature compensation algorithm may include a quadratic or cubic equation. For example, the temperature compensation algorithm may compensate for at least one of the displacement of the bobbin 1110 or the slope and offset of the equation related to the output of the position sensor 1170.

Figure 45:
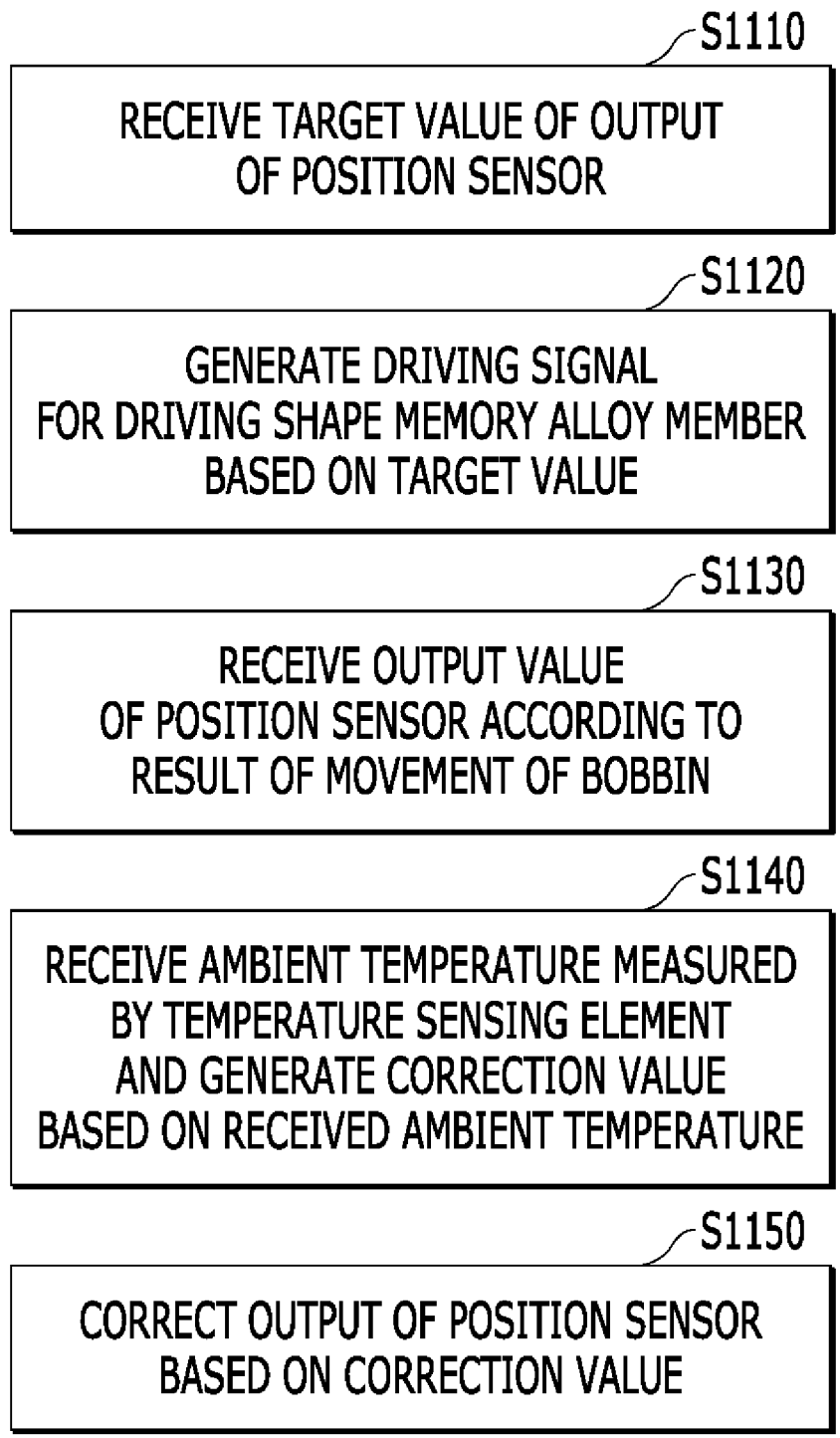
FIG. 45 shows a temperature compensation method according to an embodiment.

FIG. 45 shows a temperature compensation method according to an embodiment.

Referring to FIG. 45, the controller 1830 or 780 may generate a correlation between the displacement of the AF moving unit and the output of the position sensor 1170 matched thereto through calibration, and may store the correlation.

For example, the controller 1830 or 780 may include a look-up table for storing a code value related to an output of the position sensor 1170 that corresponds to or matches the target position (or displacement) of the AF moving unit.

The controller 1830 or 780 receives, from the look-up table, the target value (code value) of the output of the position sensor 1170 that corresponds to or matches the target position of the AF moving unit (e.g. the bobbin 1110) (S1110).

The controller 1830 or 780 may generate, based on the target value, a driving signal for driving the shape memory alloy 1310 or 1320 or a control signal for generating the driving signal (S1120).

The shape memory alloy 1310 or 1320 may be driven in response to the driving signal (or control signal) generated by the controller 1830 or 780, whereby the AF moving unit may be moved in the optical-axis direction.

The controller 1830 or 780 receives the output of the position sensor 1170 according to the movement result of the AF moving unit or data on the output of the position sensor 1170 (S1130).

In addition, the controller 1830 or 780 receives the ambient temperature measured by the temperature sensing element 1063, and generates a correction value (or compensation value) based on the received ambient temperature (S1140).

Subsequently, the controller 1830 or 780 corrects the output of the position sensor 1170 or data (or code value) related to the output of the position sensor 1170 based on the correction value.

Figure 46:
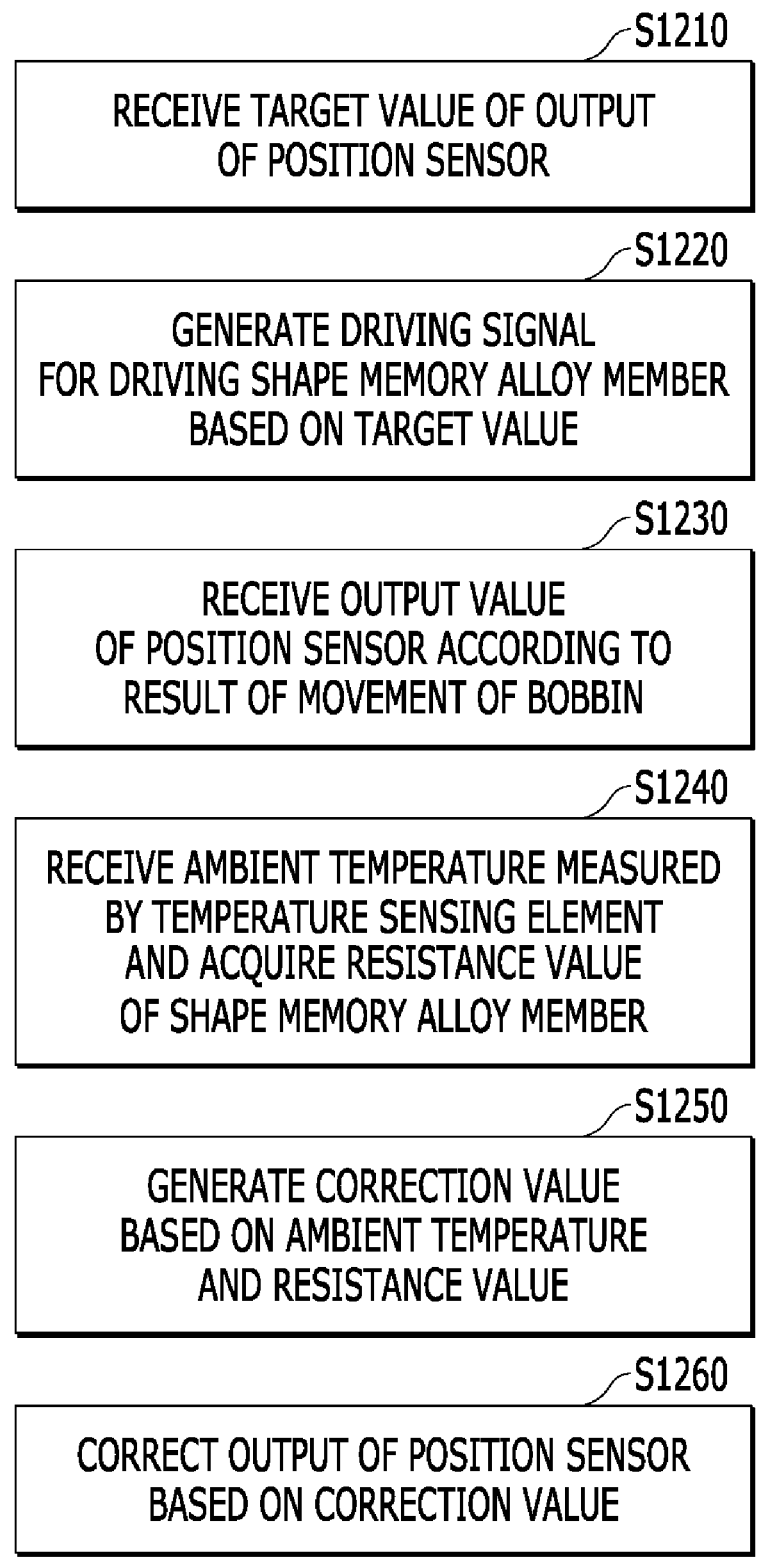
FIG. 46 shows a temperature compensation method according to another embodiment.

FIG. 46 shows a temperature compensation method according to another embodiment.

Referring to FIG. 46, the description of steps S1110 to S1130 in FIG. 45 is applied to steps S1210 to S1230. The position sensor 1170A shown in FIG. 42B may be applied to the embodiment in FIG. 46.

The controller 1830 or 780 receives the ambient temperature measured by the temperature sensing element 1063. Then, the controller 1830 or 780 receives data on the output RV of the resistance measurement unit 1064, and acquires a resistance value of the shape memory alloy member using the received data (S1240).

Subsequently, a correction value is generated based on the ambient temperature measured by the temperature sensing element 1063 and the resistance value (S1250). The resistance value may be one metric for measuring ambient temperature, and ambient temperature may be measured using the resistance value.

The controller 1830 or 780 may store a correlation between the resistance value of the shape memory alloy member 1310 (or the detected current or detected voltage of the resistance measurement unit 1064) and the temperature corresponding thereto.

In an example, the controller 1830 or 780 may compensate for the resistance value of the shape memory alloy member 1310 using the ambient temperature measured by the temperature sensing element 1063, and may generate the correction value for correcting the target value using the compensated resistance value.

Alternatively, in an example, the controller 1830 or 780 may compensate for or correct the ambient temperature measured by the temperature sensing element 1063 using the resistance value of the shape memory alloy member 1310, and may generate the correction value for correcting the target value using the compensated or corrected ambient temperature.

Subsequently, the controller 1830 or 780 may correct the output of the position sensor 1170A or data (code value) related to the output based on the correction value.

FIGS. 45 and 46 illustrate that the output value of the position sensor 1170 is corrected using the correction value, but, in another embodiment, the target value (or code value) of the output of the position sensor 1170 stored in the look-up table may be corrected using the correction value.

Figure 41B:
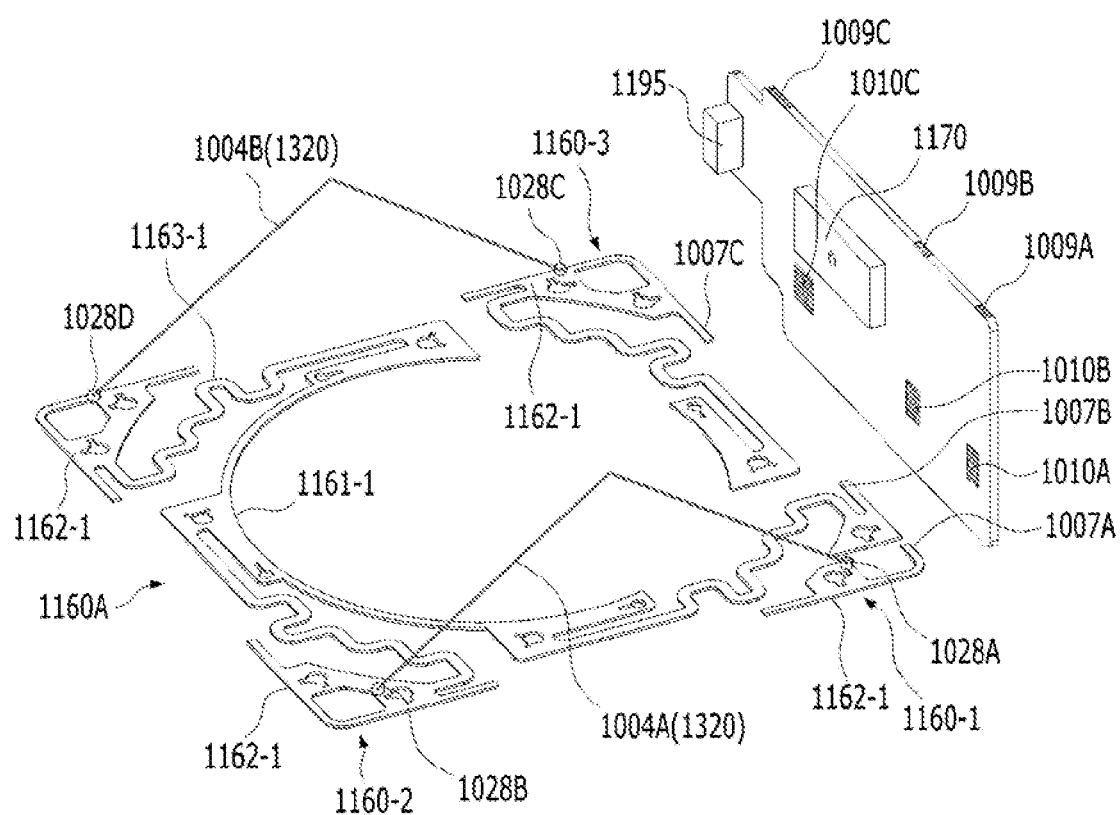
FIG. 41B shows conductive connection between the shape memory alloy member, the lower elastic member, and the circuit board in FIG. 41A.

FIG. 41A is a perspective view of some components of a lens moving apparatus according to another embodiment, and FIG. 41B shows conductive connection between a shape memory alloy member 1320 (1004A and 1004B), a lower elastic member 1160A, and a circuit board 1190-1 in FIG. 41A.

Referring to FIGS. 41A and 41B, a lens moving apparatus according to another embodiment may further include a shape memory alloy member 1320 (1004A and 1004B). Hereinafter, the shape memory alloy member 1310 in FIG. 32 will be referred to as a "first shape memory alloy member," and the shape memory alloy member 1320 in FIGS. 41A and 41B will be referred to as a "second shape memory alloy member."

The lower elastic member 1160A may include first to third lower elastic members 1160-1 to 1160-3. The first to third lower elastic members 1160-1 to 1160-3 may have shapes identical or similar to those of the first to third upper elastic members 1150-1 to 1150-3, but the disclosure is not limited thereto.

In another embodiment, the two components may have different shapes from each other. In an example, the lengths of extended portions 1007A to 1007C of the first to third lower elastic members 1160-1 to 1160-3 may be shorter than those of the extended portions 1008A to 1008C of the first to third upper elastic members 1150-1 to 1150-3.

The description of the first to third upper elastic members 1150-1 to 1150-3 may be applied to the first to third lower elastic members 1160-1 to 1160-3.

The circuit board 1190-1 may further include fourth to sixth pads 1010A to 1010C.

In addition, in an example, the bobbin 1110 may include a third protrusion 1015B protruding from the first outer side surface thereof in the horizontal direction and spaced apart from the first protrusion 1015A. In addition, the bobbin 1110 may include a fourth protrusion 1016B (refer to FIG. 34A) protruding from the second outer side surface thereof in the horizontal direction and spaced apart from the second protrusion 1016A.

In an example, the third protrusion 1015B and the fourth protrusion 1016B may be disposed closer to the upper surface of the bobbin 1110 than to the lower surface of the bobbin 1110. In an example, the third protrusion 1015B and the fourth protrusion 1016B may correspond to, face, or overlap each other in the horizontal direction. The reason for this is to enable the shape memory alloy member 1310 to support the bobbin 1110 in a balanced manner.

In addition, the third protrusion 1015B may be located higher first protrusion 1015A, and the fourth protrusion 1016B may be located higher than the second protrusion 1016A. The third protrusion 1015B may correspond to, face, or overlap the first protrusion 1015A in the optical-axis direction, and the fourth protrusion 1016B may correspond to, face, or overlap the second protrusion 1016A in the optical-axis direction.

In addition, each of the third protrusion 1015B and the fourth protrusion 1016B may include a curved surface that is convex in the upward direction. For example, each of the third protrusion 1015B and the fourth protrusion 1016B may have a hemispherical shape, a semi-elliptical shape, or a dome shape that is convex in a direction from the lower surface of the bobbin 1110 toward the upper surface of the bobbin 1110. Accordingly, the curved surfaces or the convex surfaces of the third protrusion 1015B and the fourth protrusion 1016B are in contact with the shape memory alloy member 1320 (1004A and 1004B), whereby friction between the protrusions 1015B and 1016B and the shape memory alloy member 1320 (1004A and 1004B) may be reduced, and accordingly, disconnection of the shape memory alloy member 1320 (1004A and 1004B) may be prevented.

In addition, each of the third protrusion 1015B and the fourth protrusion 1016B may have a recess 1108 formed in the convex curved surface thereof to allow at least a portion (e.g. an intermediate portion) of the shape memory alloy member 1320 (1004A and 1004B) to be disposed therein. The recess 1108 may serve to prevent the shape memory alloy member 1320 (1004A and 1004B) from escaping from the protrusions 1015B and 1016B, whereby coupling force between the shape memory alloy member 1320 (1004A and 1004B) and the bobbin 1110 may be increased.

Alternatively, for example, the lower portion of each of the third protrusion 1015B and the fourth protrusion 1016B may be flat, but the disclosure is not limited thereto.

In an example, the spacing distance between the first protrusion 1015A (or the second protrusion 1016A) and the third protrusion 1015B (or the fourth protrusion 1016B) may be longer than the spacing distance between the first protrusion 1015A (or the second protrusion 1016A) and the lower surface of the bobbin 1110.

Alternatively, in an example, the spacing distance between the first protrusion 1015A (or the second protrusion 1016A) and the third protrusion 1015B (or the fourth protrusion 1016B) may be longer than the spacing distance between the third protrusion 1015B (or the fourth protrusion 1016B) and the upper surface of the bobbin 1110.

The second shape memory alloy member 1320 may include a third member 1004A and a fourth member 1004B.

Referring to FIGS. 41A and 41B, at least a portion of the third member 1004A may be supported by, coupled to, or caught by the third protrusion 1015B of the bobbin 1110. For example, an intermediate region or an intermediate portion of the third member 1004A may be in contact with, attached to, or secured to the upper portion of the third protrusion 1015B of the bobbin 1110.

At least a portion of the fourth member 1004B may be supported by, coupled to, or caught by the fourth protrusion 1016B of the bobbin 1110. For example, an intermediate region or an intermediate portion of the fourth member 1004B may be in contact with, attached to, or secured to the upper portion of the fourth protrusion 1016B of the bobbin 1110.

One end 1028A of the third member 1004A may be coupled to the first lower elastic member 1160-1, and the other end 1028B of the third member 1004A may be coupled to the second lower elastic member 1160-2. One end 1028C of the fourth member 1004B may be coupled to the third lower elastic member 1160-3, and the other end 1028D of the fourth member 1004B may be coupled to the second lower elastic member 1160-2.

In an example, at least a portion of each of the third and fourth members 1004A and 1004B may be coupled or secured to the base 1210.

The second shape memory alloy member 1320 may be conductively connected to the lower elastic member 1160A.

In an example, one end 1028A of the third member 1004A may be coupled to the second outer frame 1162-1 of the first lower elastic member 1160-1 by means of a conductive adhesive or a solder. The other end 1028B of the third member 1004A may be coupled to one region of the second outer frame 1162-1 of the second lower elastic member 1160-2 by means of a conductive adhesive or a solder.

In an example, one end 1028C of the fourth member 1004B may be coupled to the second outer frame 1162-1 of the third lower elastic member 1160-3 by means of a conductive adhesive or a solder. The other end 1028D of the fourth member 1004B may be coupled to another region of the second outer frame 1162-1 of the second lower elastic member 1160-2 by means of a conductive adhesive or a solder.

The third driving signal may be provided to the third member 1004A from the position sensor 1170 through the fourth and fifth pads 1010A and 1010B of the circuit board 1190 and the first and second lower elastic members 1160-1 and 1160-2, and the fourth driving signal may be provided to the fourth member 1004B from the position sensor 1170 through the fifth and sixth pads 1010B and 1010C of the circuit board 1190 and the second and third lower elastic members 1160-2 and 1160-3. The third driving signal and the fourth driving signal may be the same signal, but the disclosure is not limited thereto. In another embodiment, the two driving signals may be separate independent signals.

In the embodiment, since the shape memory alloy member 1320 is conductively connected to the circuit board 1190 via the first to third lower elastic members 1160-1 to 1160-3, reliability in conductive connection between the shape memory alloy member 1320 and the first to third lower elastic members 1160-1 to 1160-3 may be improved, disconnection and defective coupling may be prevented, and reliability in conductive connection between the shape memory alloy member 1320 and the circuit board 1190 may be improved.

In an example, the third member 1004A and the fourth member 1004B may be connected in parallel to the fourth to sixth pads 1010A to 1010C of the circuit board 1190 via the first to third lower elastic members 1160-1 to 1160-3. In an example, the fifth pad 1010B may correspond to a common terminal or a ground terminal.

The AF moving unit according to the embodiment shown in FIGS. 41A and 41B may perform bidirectional driving. Here, bidirectional driving refers to movement of the AF moving unit in two directions (e.g. the upward direction or the downward direction) based on the initial position of the AF moving unit.

In order to realize bidirectional driving, in the state in which no driving signals are supplied to the first and second shape memory alloy members 1310 and 1320, the AF moving unit may be spaced apart from the base 1210 by a predetermined distance in the optical-axis direction due to the elastic force or the pressing force of the upper elastic member 1150 and the lower elastic member 1160, which support the AF moving unit. In this case, the spacing distance between the base 1210 and the lower end of the bobbin 1110 may be greater than or equal to the maximum moving distance (or the maximum stroke) of the AF moving unit in the downward direction.

Figure 44:
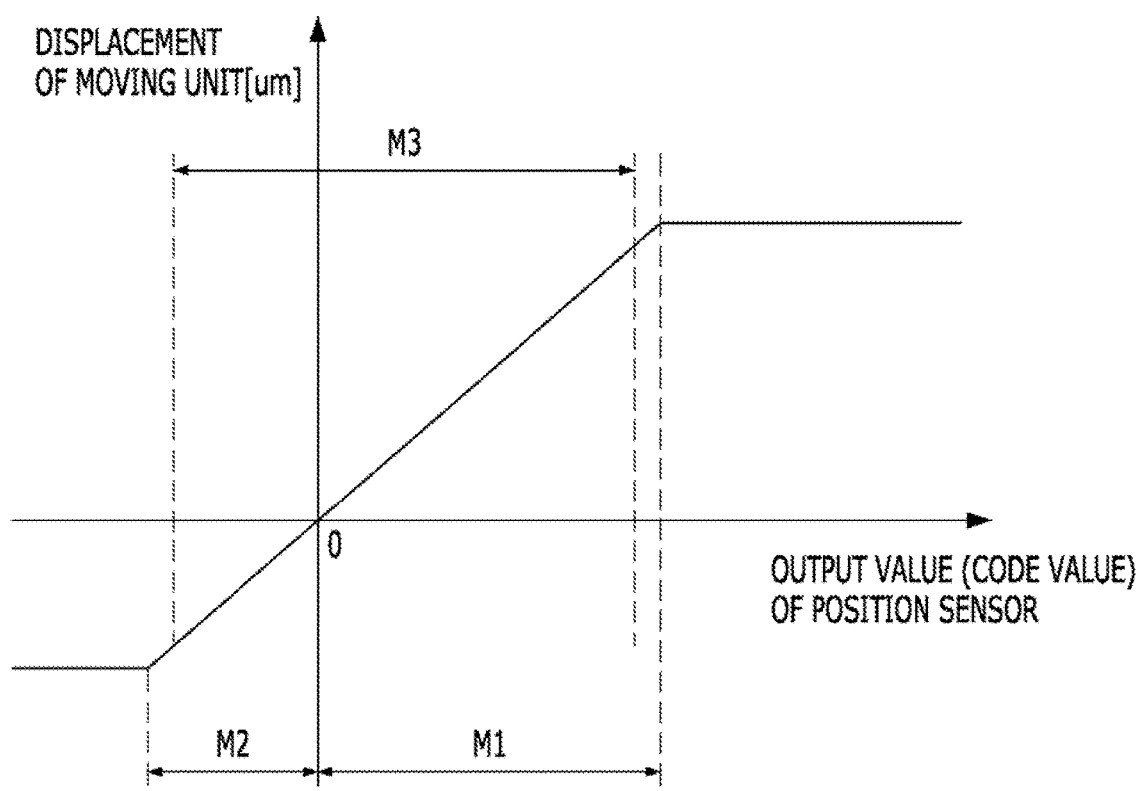
FIG. 44 shows operation sections of first and second shape memory alloy members for bidirectional driving.

FIG. 44 shows operation sections of the first and second shape memory alloy members 1310 and 1320 for bidirectional driving. In the graph in FIG. 44, the X-axis represents a code value related to the output of the position sensor or resistance values of the first and second shape memory alloy members 1310 and 1320. The Y-axis represents displacement of the AF moving unit. For example, the origin (0,0) in the graph may be the initial position of the AF moving unit.

Referring to FIG. 44, the displacement (or movement position) of the AF moving unit may include a first section M1 and a second section M2 based on the initial position thereof.

The first section M1 may be a movement section of the bobbin 1110 in the upward direction (or forward direction) based on the initial position thereof. The first section M1 may correspond to the first quadrant in the graph in FIG. 44.

In addition, the second section M2 may be a movement section of the bobbin 1110 in the downward direction (or backward direction) based on the initial position thereof. The second section M2 may correspond to the third quadrant in the graph in FIG. 44.

For example, the distance (or length) of the first section M1 may be longer than the distance (or length) of the second section M2.

The AF moving unit may be moved in the first section M1 by driving the first shape memory alloy member 1310. In addition, the AF moving unit may be moved in the second section M2 by driving the second shape memory alloy member 1320.

In an example, only the first shape memory alloy member 1310 may be driven in the first section M1, and only the second shape memory alloy member 1320 may be driven in the second section M2.

In an example, in the first section M1, the first driving signal may be supplied to the first member 1003A, and the second driving signal may be supplied to the second member 1003B. In addition, in the first section M1, no driving signal may be supplied to the third member 1004A or the fourth member 1004B.

On the other hand, in an example, in the second section M2, the third driving signal may be supplied to the third member 1004A, and the fourth driving signal may be supplied to the fourth member 1004B. In addition, in the second section M2, no driving signal may be supplied to the first member 1003A or the second member 1003B.

The response characteristics (e.g. response speed) are slow when lowering the temperature of the shape memory alloy member (e.g. increasing the length of the shape memory alloy), compared to when increasing the temperature of the shape memory alloy member (e.g. reducing the length of the shape memory alloy).

In another embodiment, in order to increase the AF driving speed, a driving signal may be supplied to the second shape memory alloy member 1320 such that the length of the second shape memory alloy member 1320 is reduced when moving the AF moving unit (e.g. the bobbin 1110) downwards.

In an example, when the AF moving unit (e.g. the bobbin 1110) is moved downwards in the first section M1 and the second section M2, the length of the first shape memory alloy member 1310 may be increased, and the length of the second shape memory alloy member 1320 may be reduced, whereby the response speed may be increased. In an example, when the AF moving unit (e.g. the bobbin 1110) is moved downwards in the first section M1 and the second section M2, driving signals may be supplied to the first member 1003A, the second member 1003B, the third member 1004A, and the fourth member 1004B, and the driving signals may be controlled, whereby the response speed of movement of the AF moving unit in response to the driving signals may be increased.

During AF operation, when the AF moving unit (e.g. the bobbin 1110) collides with or comes into contact with the base 1210 or the cover member 1300, oscillation may occur, which deteriorates the reliability of the AF operation.

Therefore, in order to prevent the occurrence of oscillation, in the embodiment, change in the length of the shape memory alloy member 1310 or 1320 may be limited during the AF operation.

For example, change in the length of the shape memory alloy member 1310 or 1320 may be limited to 2% or less of the entire length of the shape memory alloy member 1310 or 1320 within the entire stroke range (or movement range) of the AF moving unit.

For example, the entire length of the shape memory alloy member 1310 or 1320 may be a length from one end of the first member 1003A, which is coupled to the first upper elastic member 1150-1, to the other end of the first member 1003A, which is coupled to the second upper elastic member 1150-2. The entire length may also be defined by applying the above-described definition of the first member 1003A to the other members 1003B, 1004A, and 1004B.

For example, a difference between the entire length of the shape memory alloy member 1310 or 1320 at the initial position and the entire length of the shape memory alloy member 1310 or 1320 at the maximum stroke point of the AF moving unit may be 2% or less of the entire length of the shape memory alloy member 1310 or 1320.

The stroke of the AF moving unit may be limited in a software manner. For example, when the target output (target code) of the position sensor 1170 matched to the displacement of the AF moving unit acquired through calibration for AF operation ranges from −1023 to +1023, the controller 1830 or 780 may limit some codes of the target output in order to prevent the bobbin 1110 from coming into contact with the base 1210 or the cover member 1300 during AF operation.

For example, the controller 1830 or 780 may use only some codes (e.g. −950 to +950) within −1023 to +1023. For example, a section M3 may be an actual movement section of the AF moving unit for preventing oscillation. Accordingly, the linearity of the correlation between the displacement of the AF moving unit and the output of the position sensor 1170 may be improved, whereby the accuracy of AF may be improved.

For example, a reference spacing distance between the stopper of the bobbin 1110 and the base 1210 (or the cover member 1300) in accordance with the above-described limitation on the stroke of the AF moving unit may be 10 μm or greater. Alternatively, for example, the reference spacing distance may be 10 μm to 100 μm. Alternatively, for example, the reference spacing distance may be 10 μm to 30 μm.

In this case, the reference spacing distance may be a distance between the upper stopper (or the upper end of the bobbin) and the cover member 1300 at the highest position of the bobbin 1110, the stroke of which is limited, or a distance between the lower stopper (or the lower end of the bobbin) and the base 1210 at the lowest position of the bobbin 1110, the stroke of which is limited.

The lens moving apparatus 1100 described with reference to FIGS. 32 to 46 may be applied to the camera device 200 shown in FIG. 1. For example, a camera device 200 according to another embodiment may include the lens moving apparatus 1100 shown in FIGS. 32 to 46 in place of the AF moving unit 100 shown in FIG. 1 in order to implement autofocus. In this case, the base 1210 of the lens moving apparatus 1100 may be coupled to the base 210 shown in FIG. 9A, which is the fixed unit. Alternatively, in another embodiment, the base 1210 of the lens moving apparatus 1100 may be omitted, and the housing 1140 of the lens moving apparatus 1100 may be coupled or secured to the base 210 shown in FIG. 9A.

Figure 47:
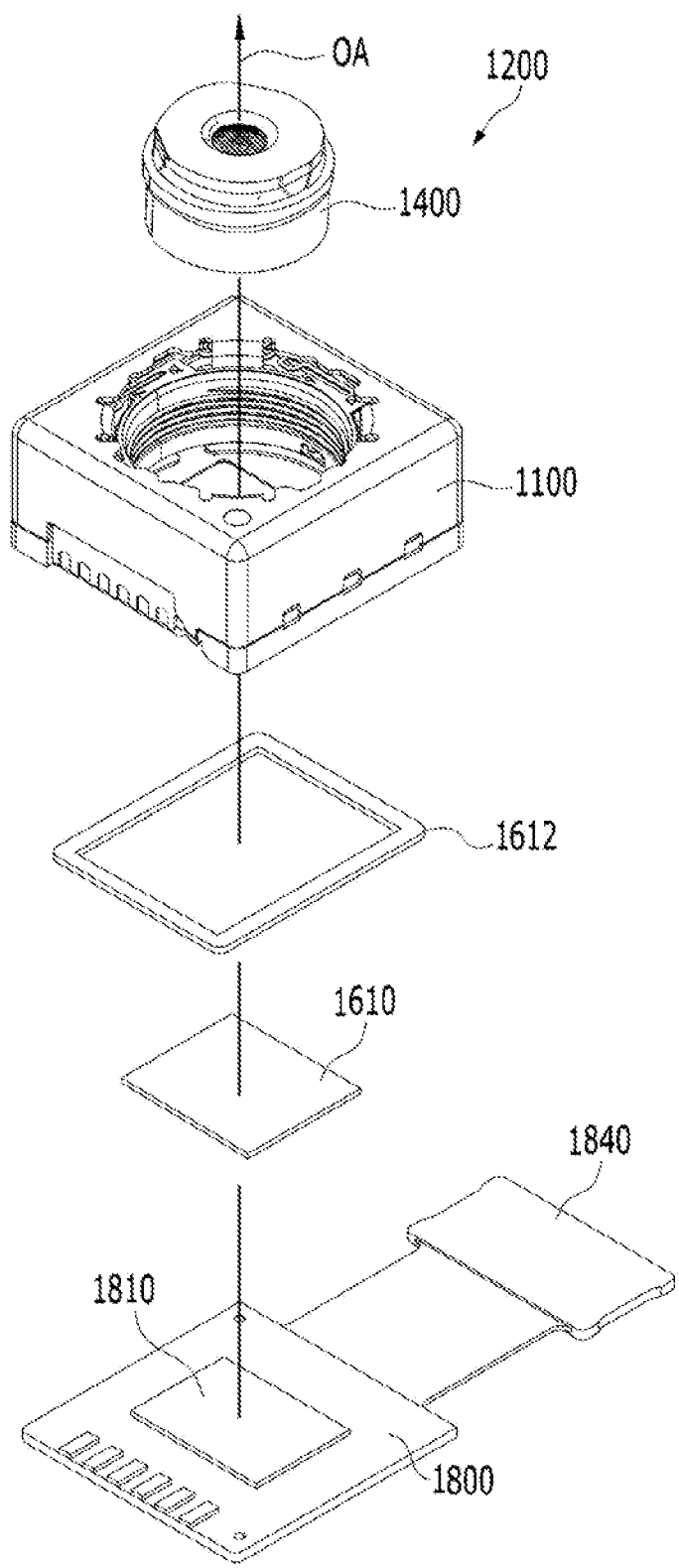
FIG. 47 is an exploded perspective view of an embodiment of the camera device including the lens moving apparatus in FIG. 32.

FIG. 47 is an exploded perspective view of an embodiment of the camera device 1200 including the lens moving apparatus 1100 in FIG. 32.

Referring to FIG. 47, the camera device 1200 may include a lens module 1400, a lens moving apparatus 1100, an adhesive member 1612, a filter 1610, a circuit board 1800, an image sensor 1810, and a connector 1840.

The lens module 1400 may include a lens and/or a lens barrel, and may be mounted on the bobbin 1110 of the lens moving apparatus 1100.

For example, the lens module 1400 may include one or more lenses and a lens barrel accommodating the one or more lenses. However, the disclosure is not limited thereto. Any of various holding structures may be used in place of the lens barrel, so long as the same is capable of supporting one or more lenses. The lens module may be coupled to the lens moving apparatus 1100, and may move together with the lens moving apparatus 1100.

In an example, the lens module 1400 may be screwed to the lens moving apparatus 1110. Alternatively, the lens module 1400 may be coupled to the lens moving apparatus 1110 by means of an adhesive (not shown). The light that has passed through the lens module 1400 may pass through the filter 1610, and may be introduced into the image sensor 1810.

The adhesive member 1612 may couple or attach the base 1210 of the lens moving apparatus 1100 to the circuit board 1800. For example, the adhesive member 1612 may be an epoxy, a thermosetting adhesive, an ultraviolet curable adhesive, or the like.

The filter 1610 may serve to block introduction of light within a specific frequency band, among the light that has passed through the lens module 1400, into the image sensor 1810. The filter 1610 may be an infrared cut filter, but the disclosure is not limited thereto. In this case, the filter 1610 may be disposed parallel to the xy-plane.

In this case, the infrared cut filter may be formed of a film material or a glass material. For example, the infrared cut filter may be formed by coating an infrared cut coating material on a plate-type optical filter, such as photographing-surface protecting cover glass or cover glass.

The filter 1610 may be disposed under the base 1210 of the lens moving apparatus 1100.

In an example, the base 1210 may have a seating portion formed in the lower surface thereof to allow the filter 1610 to be seated therein. In another embodiment, a separate sensor base, on which the filter 1610 is seated, may be provided.

The circuit board 1800 may be disposed under the lens moving apparatus 1100, and the image sensor 1810 may be mounted on the circuit board 1800. The image sensor 1810 may receive an image contained in the light introduced thereinto through the lens moving apparatus 1100, and may convert the received image into an electrical signal.

The image sensor 1810 may be located so as to allow the lens module 1400 to be aligned with the optical axis. Thereby, the image sensor may obtain light that has passed through the lens module 1400. The image sensor 1810 may output an image using light emitted thereto. For example, the image sensor 1810 may be a charge coupled device (CCD), a metal oxide semiconductor (MOS), a CPD, or a CID. However, the type of image sensor is not limited thereto.

The filter 1610 and the image sensor 1810 may be spaced apart from each other so as to face each other in the first direction.

The connector 840 may be conductively connected to the circuit board 1800, and may be provided with a port in order to be conductively connected to an external device.

In addition, the camera device 1200 may include a controller 1830 (refer to FIGS. 42A and 42B). In an example, the controller 1830 may be disposed or mounted on the circuit board 1800, and may be conductively connected to the circuit board 1800. In another embodiment, the camera device 1200 may not include the controller 1830, and the role or function of the controller 1830 may be performed by the controller 780 of the optical instrument 200A.

In addition, the camera device 200 according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image using a lens, or for the purpose of optical measurement or image propagation or transmission. For example, the optical instrument according to the embodiment may be a cellular phone, a mobile phone, a smartphone, a portable smart device, a digital camera, a laptop computer, a digital broadcasting terminal, a personal digital assistant (PDA), a portable multimedia player (PMP), a navigation device, etc., without being limited thereto, and may also be any of devices for capturing images or pictures.

Figure 48:
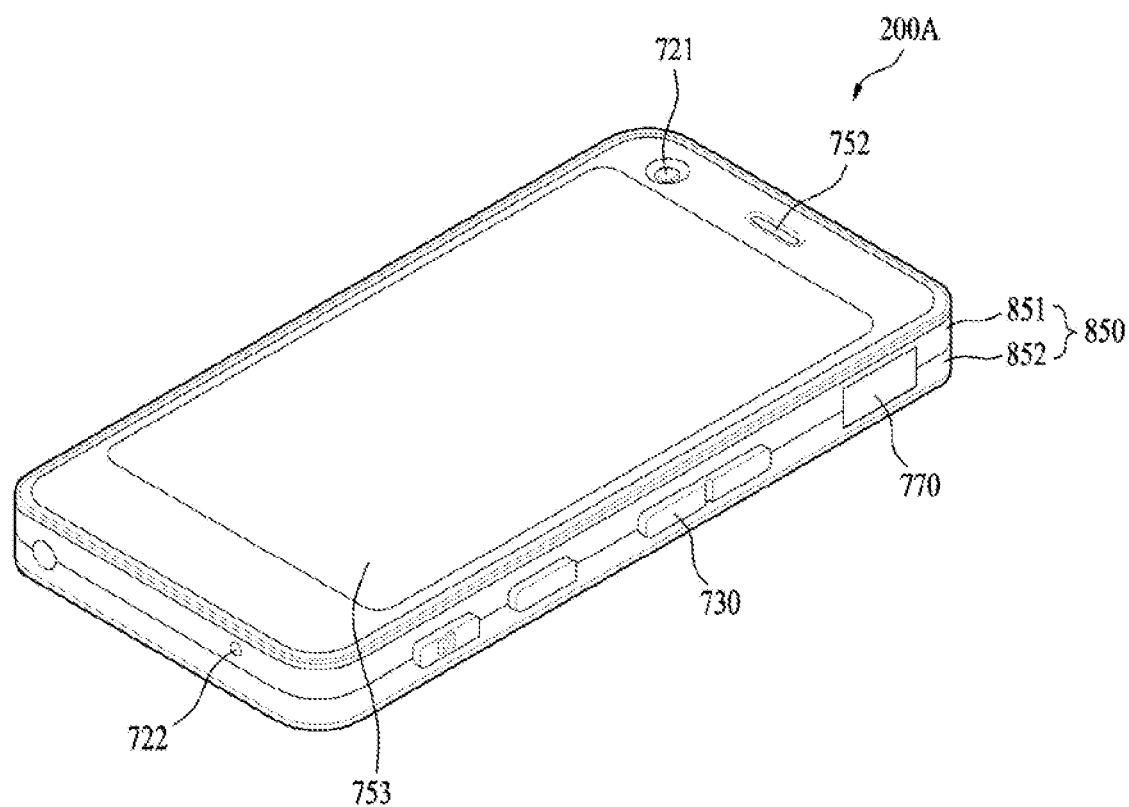
FIG. 48 is a perspective view of a portable terminal according to an embodiment.
Figure 49:
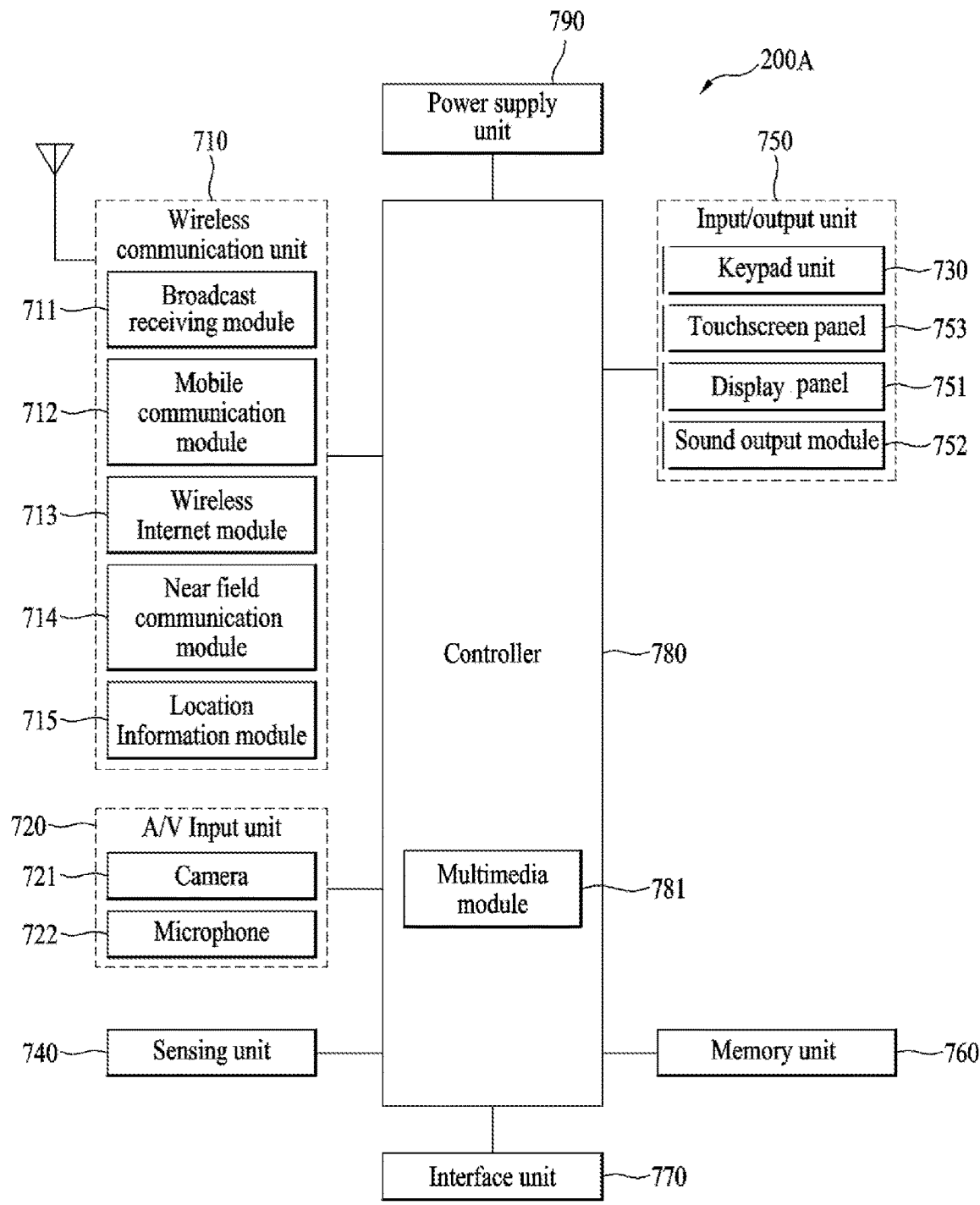
FIG. 49 is a configuration diagram of the portable terminal shown in FIG. 48.

FIG. 48 is a perspective view of the optical instrument 200A according to the embodiment, and FIG. 49 is a configuration diagram of the optical instrument 200A shown in FIG. 48.

Referring to FIGS. 48 and 49, the optical instrument 200A (hereinafter referred to as a "terminal") may include a body 850, a wireless communication unit 710, an A/V input unit 720, a sensor 740, an input/output unit 750, a memory 760, an interface 770, a controller 780, and a power supply 790.

The body 850 shown in FIG. 48 may have a bar shape, without being limited thereto, and may be any of various types such as, for example, a slide type, a folder type, a swing type, or a swivel type, in which two or more sub-bodies are coupled so as to be movable relative to each other.

The body 850 may include a case (a casing, a housing, a cover, or the like) defining the external appearance thereof. In an example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the optical instrument 200A and a wireless communication system or between the optical instrument 200A and a network in which the optical instrument 200A is located. In an example, the wireless communication unit 710 may include a broadcast reception module 711, a mobile communication module 712, a wireless Internet module 713, a nearfield communication module 714, and a position information module 715.

The audio/video (A/V) input unit 720 serves to input audio signals or video signals, and may include a camera 721 and a microphone 722.

The camera 721 may include the camera device 200 or 1200 according to the embodiment.

The sensor 740 may sense the current state of the optical instrument 200A, such as the open or closed state of the optical instrument 200A, the position of the optical instrument 200A, the presence or absence of a user's touch, the orientation of the optical instrument 200A, or the acceleration/deceleration of the optical instrument 200A, and may generate a sensing signal to control the operation of the optical instrument 200A. For example, when the optical instrument 200A is a slide-type phone, whether the slide-type phone is open or closed may be detected. In addition, the sensor 740 serves to sense whether power is supplied from the power supply 790 or whether the interface 770 is coupled to an external device.

The input/output unit 750 serves to generate visual, audible, or tactile input or output. The input/output unit 750 may generate input data to control the operation of the optical instrument 200A, and may display information processed in the optical instrument 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. In an example, the display module 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal reception mode, a call mode, a recording mode, a voice recognition mode, or a broadcast reception mode, or may output audio data stored in the memory 760.

The touchscreen panel 753 may convert variation in capacitance, caused by a user's touch on a specific region of a touchscreen, into electrical input signals.

The memory 760 may store programs for the processing and control of the controller 780, and may temporarily store input/output data (e.g. a phone book, messages, audio, still images, pictures, and moving images). For example, the memory 760 may store images captured by the camera 721, for example, pictures or moving images.

The interface 770 serves as a passage for connection between the optical instrument 200A and an external device. The interface 770 may receive data or power from the external device, and may transmit the same to respective components in the optical instrument 200A, or may transmit data inside the optical instrument 200A to the external device. For example, the interface 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the overall operation of the optical instrument 200A. For example, the controller 780 may perform control and processing related to voice calls, data communication, and video calls.

The controller 780 may include a multimedia module 781 for multimedia playback. The multimedia module 781 may be provided in the controller 780, or may be provided separately from the controller 780.

The controller 780 may perform pattern recognition processing, by which writing or drawing input to the touchscreen is perceived as characters or images.

The power supply 790 may supply power required to operate the respective components upon receiving external power or internal power under the control of the controller 780.

The features, structures, effects, and the like described above in the embodiments are included in at least one embodiment of the present disclosure, but are not necessarily limited to only one embodiment. Furthermore, the features, structures, effects, and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

Embodiments may be used for a camera device, which has a simple structure and is capable of reducing power consumption and accurately detecting the amounts of movement of an OIS moving unit in an X-axis direction and a Y-axis direction and a rolling angle thereof, and an optical instrument including the same.

In addition, embodiments may be used for a lens moving apparatus, which is capable of improving accuracy of temperature compensation in accordance with change in ambient temperature and improving reliability in conductive connection between a shape memory alloy member and a circuit board, a camera module including the same, and an optical instrument.

The invention claimed is:

1. A camera device comprising:
   a fixed unit;
   a moving unit comprising:
      a board unit disposed so as to be spaced apart from the fixed unit; and
      an image sensor disposed on the board unit;
   a shape memory alloy member coupled to the fixed unit and the moving unit and conductively connected to the board unit;
   a position sensing unit comprising:
      a first sensor;
      a second sensor; and
      a third sensor,
      wherein the first sensor, the second sensor, and the third sensor are disposed on the board unit; and
   a controller configured to supply a driving signal to the shape memory alloy member and to move the moving unit in a direction perpendicular to an optical axis or rotate the moving unit about the optical axis using the shape memory alloy member.

2. The camera device according to claim 1, wherein the controller is configured to control movement of the moving unit and rotation of the moving unit using a first sensing voltage of the first sensor, a second sensing voltage of the second sensor, and a third sensing voltage of the third sensor.

3. The camera device according to claim 2, wherein the controller is configured to generate a first data value corresponding to the first sensing voltage, a second data value corresponding to the second sensing voltage, and a third data value corresponding to the third sensing voltage, and is configured to control movement of the moving unit and rotation of the moving unit using the first to third data values.

4. The camera device according to claim 1, wherein each of the first sensor and the third sensor is configured to detect movement of the moving unit in an x-axis direction in a plane perpendicular to the optical axis, and the second sensor detects movement of the moving unit in a y-axis direction in the plane perpendicular to the optical axis.

5. The camera device according to claim 4, wherein the controller is configured to generate an x-axis target code value for an x-axis movement amount, a y-axis target code value for a y-axis movement amount, and a rotation target code value for a rotation amount in order to implement hand-shake compensation for an optical image stabilization upon movement of the camera device, and is configured to convert the rotation target code value using the first and third sensing voltages.

6. The camera device according to claim 5, wherein the controller is configured to convert the x-axis target code value and the y-axis target code value using the first to third sensing voltages.

7. The camera device according to claim 6, wherein the controller is configured to control the driving signal supplied to the shape memory alloy member based on the converted rotation target code value, the converted x-axis target code value, and the converted y-axis target code value.

8. The camera device according to claim 5, wherein the controller is configured to receives position information about the x-axis movement amount, the y-axis movement amount, and the rotation amount according to movement of the camera device, and is configured to generate the x-axis target code value, the y-axis target code value, and the rotation target code value based on the position information.

9. The camera device according to claim 1, wherein the fixed unit comprises:
a first magnet facing the first sensor in a direction parallel to the optical axis;
a second magnet facing the second sensor in the direction parallel to the optical axis; and
a third magnet facing the third sensor in the direction parallel to the optical axis, and
wherein a magnetization direction of the first magnet and a magnetization direction of the third magnet are identical to each other, and
wherein a magnetization direction of the second magnet is perpendicular to the magnetization direction of the first magnet.

10. The camera device according to claim 1, wherein each of the first to third sensors is a Hall sensor.

11. The camera device according to claim 1, wherein each of the first and second sensors is a Hall sensor, and
wherein the third sensor is a tunnel magnetoresistance (TMR) sensor.

12. A camera device comprising:
a fixed unit;
a moving unit comprising:
a board unit disposed so as to be spaced apart from the fixed unit; and
an image sensor disposed on the board unit;
a shape memory alloy member coupled to the fixed unit and the moving unit and conductively connected to the board unit;
a position sensing unit disposed on the board unit and comprising:
a first sensor;
a second sensor; and
a third sensor; and
a controller configured to supply a driving signal to the shape memory alloy member and to move the moving unit in a direction perpendicular to an optical axis or rotate the moving unit about the optical axis using the shape memory alloy member,
wherein the controller is configured to generate a first data value corresponding to sensing voltage of the first sensor, a second data value corresponding to sensing voltage of the second sensor, and a third data value corresponding to third sensing voltage of the third sensor,
wherein the controller is configured to generate an x-axis target code value for the x-axis movement amount, a y-axis target code value for the y-axis movement amount, and a rotation target code value for the rotation amount in order to implement hand-shake compensation for optical image stabilization upon movement of the camera device, and
wherein the controller is configured to convert the rotation target code value using the first data value and the third data value.

13. The camera device according to claim 12, wherein each of the first and third sensors is configured to detect movement of the moving unit in an x-axis direction in a plane perpendicular to the optical axis, and the third sensor is configured to detect movement of the moving unit in a y-axis direction in the plane perpendicular to the optical axis.

14. The camera device according to claim 13, wherein the x-axis target code value and the y-axis target code value are converted using the first data value, the second data value, and the third data value.

15. The camera device according to claim 14, wherein the controller is configured to control the driving signal supplied to the shape memory alloy member based on the converted rotation target code value, the converted x-axis target code value, and the converted y-axis target code value.

16. A camera device comprising:
a fixed unit;
a moving unit comprising:
a first board unit disposed so as to be spaced apart from the fixed unit; and
an image sensor disposed on the first board unit;
a shape memory alloy member coupled to the fixed unit and the moving unit and conductively connected to the first board unit;
wherein the shape memory alloy member is configured to move the moving unit in a direction perpendicular to an optical axis or rotate the moving unit about the optical axis.

17. The camera device according to claim 16, comprising:
- a first elastic member coupled to the fixed unit and the moving unit and configured to support the first board unit;
- a second board unit disposed so as to be spaced apart from the first board unit; and
- a second elastic member coupled to the first board unit and the second board unit and configured to support the first board unit.

18. The camera device according to claim 17, wherein the fixed unit comprises:
- a base disposed on the first board unit and comprising a coupling portion coupled to the first elastic member;
- first and second sensing magnets disposed on the base;
- a first sensor disposed on the first board unit so as to face the first sensing magnet in an optical axis direction; and
- a second sensor disposed on the first board unit so as to face the second sensing magnet in the optical axis direction.

19. The camera device according to claim 18, wherein the second board unit is disposed under the first board unit, and the second elastic member conductively connects the first board unit and the second board unit.

20. The camera device according to claim 18, wherein the first elastic member comprises:
- a first coupling portion coupled to the coupling portion of the base;
- a second coupling portion coupled to a pad which is formed in the first board unit; and
- a connection portion connecting the first coupling portion and the second coupling portion.

\* \* \* \* \*